(12) United States Patent
Lee et al.

(10) Patent No.: US 9,396,272 B2
(45) Date of Patent: *Jul. 19, 2016

(54) PERSONALIZED STRUCTURED SEARCH QUERIES FOR ONLINE SOCIAL NETWORKS

(71) Applicant: Facebook, Inc., Menlo Park, CA (US)

(72) Inventors: Yofay Kari Lee, Palo Alto, CA (US); Michael Benjamin Cohen, Cambridge, MA (US); Maxime Boucher, Mountain View, CA (US); Alisson Gusatti Azzolini, San Francisco, CA (US); Xiao Li, Sunnyvale, CA (US); Lars Eilstrup Rasmussen, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/251,026

(22) Filed: Apr. 11, 2014

(65) Prior Publication Data

US 2014/0222854 A1    Aug. 7, 2014

Related U.S. Application Data

(63) Continuation of application No. 13/556,046, filed on Jul. 23, 2012, now Pat. No. 8,751,521, which is a continuation-in-part of application No. 12/763,162, filed on Apr. 19, 2010, now Pat. No. 8,572,129.

(51) Int. Cl.
*G06F 17/30* (2006.01)
*G06Q 10/10* (2012.01)
*G06Q 50/00* (2012.01)

(52) U.S. Cl.
CPC ...... *G06F 17/30867* (2013.01); *G06F 17/3097* (2013.01); *G06F 17/30958* (2013.01); *G06Q 10/10* (2013.01); *G06Q 50/01* (2013.01)

(58) Field of Classification Search
CPC ............... G06F 17/30864; G06F 17/30867; G06Q 30/02
USPC ............... 707/769, 798, 723, 802; 715/751
See application file for complete search history.

(56) References Cited

U.S. PATENT DOCUMENTS

| 6,539,232 B2 | 3/2003 | Hendrey |
| 6,957,184 B2 | 10/2005 | Schmid |
| 7,539,697 B1 | 5/2009 | Akella |
| 7,752,326 B2 | 7/2010 | Smit |
| 7,836,044 B2 | 11/2010 | Kamvar |

(Continued)

FOREIGN PATENT DOCUMENTS

| JP | 2010-277322 | 12/2010 |
| JP | 2012-064151 A | 3/2012 |

(Continued)

OTHER PUBLICATIONS

U.S. Appl. No. 14/489,917, filed Sep. 18, 2014, Lee.

(Continued)

*Primary Examiner* — Mariela Reyes
*Assistant Examiner* — Thong Vu
(74) *Attorney, Agent, or Firm* — Baker Botts L.L.P.

(57) ABSTRACT

In particular embodiments, a method includes receiving an text query, identifying nodes and edges from a social graph that correspond to character strings from the text query, and then generating recommended queries that include references to the identified nodes and edges.

18 Claims, 24 Drawing Sheets

(56) References Cited

U.S. PATENT DOCUMENTS

| | | | |
|---|---|---|---|
| 8,027,990 B1 | 9/2011 | Mysen | |
| 8,060,639 B2 | 11/2011 | Smit | |
| 8,082,278 B2* | 12/2011 | Agrawal et al. | 707/802 |
| 8,112,529 B2 | 2/2012 | Smit | |
| 8,145,636 B1* | 3/2012 | Jeh | G06F 17/30707 707/736 |
| 8,180,804 B1 | 5/2012 | Narayanan | |
| 8,185,558 B1 | 5/2012 | Narayanan | |
| 8,239,364 B2 | 8/2012 | Wable | |
| 8,244,848 B1 | 8/2012 | Narayanan | |
| 8,271,471 B1 | 9/2012 | Kamvar | |
| 8,271,546 B2 | 9/2012 | Gibbs | |
| 8,321,364 B1 | 11/2012 | Gharpure | |
| 8,364,709 B1 | 1/2013 | Das | |
| 8,386,465 B2 | 2/2013 | Ansari | |
| 8,407,200 B2 | 3/2013 | Wable | |
| 8,412,749 B2 | 4/2013 | Fortuna | |
| 8,538,960 B2 | 9/2013 | Wong | |
| 8,572,129 B1 | 10/2013 | Lee | |
| 8,595,297 B2 | 11/2013 | Marcucci | |
| 8,601,027 B2 | 12/2013 | Behforooz | |
| 8,606,792 B1* | 12/2013 | Jackson et al. | 707/748 |
| 8,626,835 B1* | 1/2014 | Gyongyi | G06F 17/30598 709/204 |
| 8,732,208 B2 | 5/2014 | Lee | |
| 8,751,521 B2 | 6/2014 | Lee | |
| 8,782,080 B2 | 7/2014 | Lee | |
| 9,002,898 B2* | 4/2015 | Narayanan et al. | 707/798 |
| 2002/0196273 A1 | 12/2002 | Krause | |
| 2003/0154194 A1 | 8/2003 | Jonas | |
| 2003/0208474 A1 | 11/2003 | Soulanille | |
| 2004/0088325 A1 | 5/2004 | Elder | |
| 2004/0255237 A1 | 12/2004 | Tong | |
| 2005/0131872 A1 | 6/2005 | Calbucci | |
| 2005/0171955 A1 | 8/2005 | Hull | |
| 2006/0136419 A1 | 6/2006 | Brydon | |
| 2007/0174304 A1 | 7/2007 | Shrufi | |
| 2007/0277100 A1 | 11/2007 | Sheha | |
| 2008/0005064 A1* | 1/2008 | Sarukkai | G06F 17/30899 |
| 2008/0183694 A1 | 7/2008 | Cane | |
| 2008/0270615 A1 | 10/2008 | Centola | |
| 2009/0006543 A1 | 1/2009 | Smit | |
| 2009/0106822 A1 | 4/2009 | Obasanjo | |
| 2009/0164929 A1 | 6/2009 | Chen | |
| 2009/0197681 A1 | 8/2009 | Krishnamoorthy | |
| 2009/0228296 A1 | 9/2009 | Ismalon | |
| 2009/0259646 A1* | 10/2009 | Fujita et al. | 707/5 |
| 2009/0265326 A1 | 10/2009 | Lehrman | |
| 2009/0281988 A1 | 11/2009 | Yoo | |
| 2009/0287682 A1 | 11/2009 | Fujioka | |
| 2009/0299963 A1 | 12/2009 | Pippori | |
| 2010/0235354 A1 | 9/2010 | Gargaro | |
| 2011/0078166 A1 | 3/2011 | Oliver | |
| 2011/0087534 A1 | 4/2011 | Strebinger | |
| 2011/0087968 A1* | 4/2011 | Lakshmanan et al. | 715/751 |
| 2011/0196855 A1 | 8/2011 | Wable | |
| 2011/0289063 A1 | 11/2011 | Radlinski | |
| 2012/0047129 A1* | 2/2012 | Redstone et al. | 707/723 |
| 2012/0059708 A1* | 3/2012 | Galas et al. | 705/14.43 |
| 2012/0136852 A1 | 5/2012 | Geller | |
| 2012/0143880 A1* | 6/2012 | Sweeney et al. | 707/749 |
| 2012/0143921 A1 | 6/2012 | Wilson | |
| 2012/0166432 A1 | 6/2012 | Tseng | |
| 2012/0179637 A1 | 7/2012 | Juan | |
| 2012/0185486 A1 | 7/2012 | Voigt | |
| 2012/0221581 A1 | 8/2012 | Narayanan | |
| 2012/0271831 A1 | 10/2012 | Narayanan | |
| 2012/0278127 A1 | 11/2012 | Kirakosyan | |
| 2012/0284329 A1 | 11/2012 | van den Oord | |
| 2012/0290562 A1 | 11/2012 | Wable | |
| 2012/0311034 A1 | 12/2012 | Goldband | |
| 2013/0007124 A1* | 1/2013 | Sweeney et al. | 709/204 |
| 2013/0031106 A1 | 1/2013 | Schechter | |
| 2013/0041876 A1 | 2/2013 | Dow | |
| 2013/0066876 A1 | 3/2013 | Raskino | |
| 2013/0086057 A1 | 4/2013 | Harrington | |
| 2013/0124538 A1 | 5/2013 | Lee | |
| 2013/0124542 A1 | 5/2013 | Lee | |
| 2013/0144899 A1 | 6/2013 | Lee | |
| 2013/0166601 A1* | 6/2013 | Chrapko et al. | 707/798 |
| 2013/0191372 A1 | 7/2013 | Lee | |
| 2013/0191416 A1 | 7/2013 | Lee | |
| 2013/0226918 A1 | 8/2013 | Berkhim | |
| 2013/0227011 A1* | 8/2013 | Sharma et al. | 709/204 |
| 2013/0246404 A1 | 9/2013 | Annau | |
| 2014/0025702 A1 | 1/2014 | Curtiss | |
| 2014/0040300 A1 | 2/2014 | Narayanan | |
| 2014/0222807 A1 | 8/2014 | Lee | |
| 2014/0222835 A1 | 8/2014 | Lee | |
| 2014/0222854 A1 | 8/2014 | Lee | |

FOREIGN PATENT DOCUMENTS

| | | |
|---|---|---|
| JP | 2012-133735 A | 7/2012 |
| KR | 10-0459832 | 6/2005 |
| KR | 2007-0049426 | 5/2007 |
| KR | 2009-0072575 | 7/2009 |
| WO | 2012-058690 | 5/2012 |
| WO | WO 2012/094531 A1 | 7/2012 |

OTHER PUBLICATIONS

Sebastian Marius Kirsch, et al., "Beyond the Web: Retrieval in Social Information Spaces," Advances in Information Retrieval Lecture Notes in Computer Science; Springer, Berlin, DE, pp. 84-95, Jan. 1, 2006.

Renaud Delbru, et al., "Searching web data: An entity retrieval and high-performance indexing model," Web Semantics: Science, Services and Agents on the World Wide Web, vol. 10, pp. 33-58. May 13, 2011.

U.S. Appl. No. 14/538,692, filed Nov. 10, 2014, Lee.
U.S. Appl. No. 14/251,069, filed Apr. 11, 2014, Lee.
U.S. Appl. No. 14/251,114, filed Apr. 11, 2014, Lee.

Zhdanova, AV, et al., "A Social Networking Model of a Web Community", In: Proceedings of 10th international symposium on social communication, pp. 1-5, 2007.

Xin, Xin et al., "A Social Recommendation Framework Based on Multi-scale Continuous Conditional Random Fields," CIKM'09, 2009.

IEEE Xplore Search Results for: "social network document node recommend" Listed by examiner in U.S. Appl. No. 12/763,145, Dec. 8, 2012.

ACM Digital Library: Search Results for: "social network document node recommend" Listed by examiner in U.S. Appl. No. 12/763,145, Dec. 8, 2012.

Sankar, et al., "Under the Hood: Building out the infrastructure for Graph Search's infrastructure"; https://www.facebook.com/notes/facebook-engineering/under-the-hood-building-out-the-i . . . ; 8 pgs, Mar. 6, 2013.

Sankar, et al., "Under the Hood: Indexing and ranking in Graph Search," https://www.facebook.com/notes/facebook-engineering/under-the-hood-indexing-and-rank . . . ; 11 pgs, Mar. 14, 2013.

Li, et al., "Under the Hood: The natural language interface of Graph Search," Available online at FTP: https://www.facebook.com/notes/facebook-engineering/under-the-hood-the-natural-language-interface-of-graph-search/10151432733048920; pp. 1-8. [downloaded Nov. 5, 2013], Apr. 29, 2013.

U.S. Appl. No. 14/627,082, filed Feb. 20, 2015, Narayanan.

Patent Examination Report No. 1 of the Australian Government for Application No. 2013293332, Mar. 5, 2015.

IL Office Action for Application No. 236754, Mar. 16, 2015.

Israeli Patent Authority Office Action for Israeli Patent Application No. 236810 (with translation), Apr. 29, 2015.

Notice of Preliminary Rejection for Korean Application No. 10-2015-7004265 (with English translation), Apr. 30, 2015.

Japanese Office Action for Application 2015-524319 (with translation), Aug. 4, 2015.

Japanese Office Action for Application 2015-524322 (with translation), Aug. 4, 2015.

European Patent Office Communication for Application 13 197 982. 5-1952, Dec. 18, 2015.

* cited by examiner

US 9,396,272 B2

PERSONALIZED STRUCTURED SEARCH QUERIES FOR ONLINE SOCIAL NETWORKS

RELATED APPLICATIONS

This application is a continuation under 35 U.S.C. §120 of U.S. patent application Ser. No. 13/556,046, filed 23 Jul. 2012, which is a continuation-in-part under 35 U.S.C. §120 of U.S. patent application Ser. No. 12/763,162, filed 19 Apr. 2010, now U.S. Pat. No. 8,572,129, each of which is incorporated by reference.

TECHNICAL FIELD

This disclosure generally relates to social graphs and performing searches for objects within a social-networking environment.

BACKGROUND

A social-networking system, such as a social-networking website, enables its users to interact with it and with each other through the system. The social-networking system may create and store a record, often referred to as a user profile, in connection with the user. The user profile may include a user's contact information, background information, employment information, demographic information, communication channel information, personal interests, or other suitable information. The social-networking system may also create and store a record of a user's relationship with other users in the social-networking system (e.g., social graph), as well as provide services (e.g., wall-posts, photo-sharing, event organization, messaging, games, or advertisements) to facilitate social interaction between users in the social-networking system. The social-networking system may store a social graph, where individuals, groups, entities, or organizations are represented as nodes in the graph, and where the nodes are connected by edges that may represent one or more specific types of interdependency. The social-networking system may transmit content and messages related to its services to a user's client device over a network.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

DESCRIPTION OF EXAMPLE EMBODIMENTS

System Overview

Figure 1:
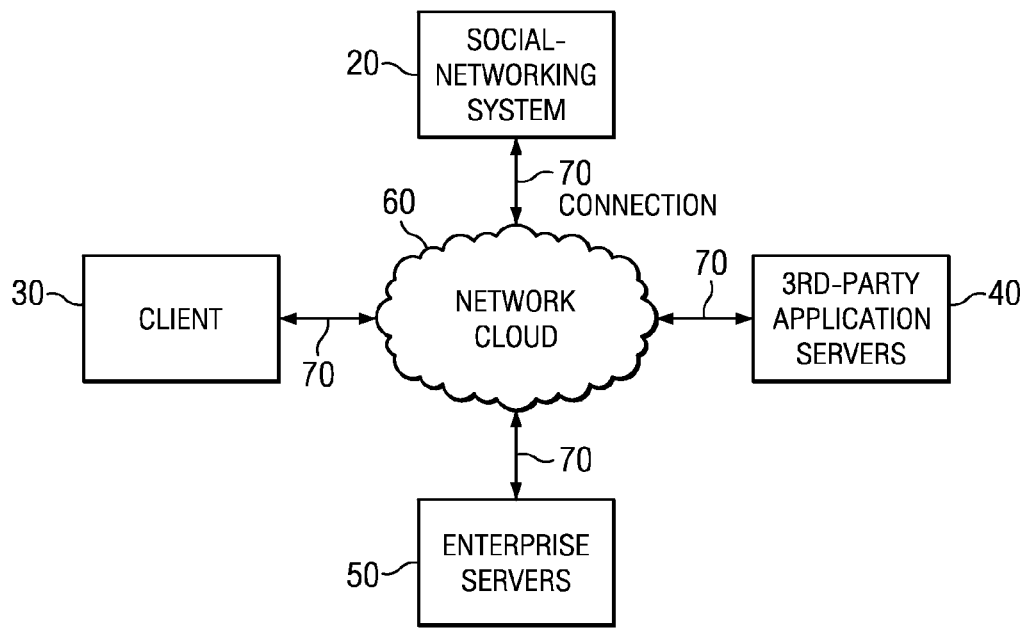
FIG. 1 illustrates an example network environment network environment 100 for implementing a social-networking system.

FIG. 1 illustrates an example network environment 100 for implementing a social-networking system. The various example embodiments described herein may operate in network environment 100. Particular embodiments may operate in, or in conjunction with, a wide-area network environment, such as the Internet, including multiple network addressable systems. Network environment 100 may include a social-networking system 20, a client device 30, a web-application server 40, and an enterprise server 50 connected to each other by a network cloud 60. Although FIG. 1 illustrates a particular arrangement of social-networking system 20, client device 30, web-application server 40, enterprise server 50, and network cloud 60, this disclosure contemplates any suitable arrangement of social-networking system 20, client device 30, web-application server 40, enterprise server 50, and network cloud 60. As an example and not by way of limitation, two or more of social-networking system 20, client device 30, web-application server 40, and enterprise server 50 may be connected to each other directly, bypassing network cloud 60. As another example, two or more of social-networking system 20, client device 30, web-application server 40, and enterprise server 50 may be physically or logically co-located with each other in whole or in part. Moreover, although FIG. 1 illustrates a particular number of social-networking systems 20, client devices 30, web-application servers 40, enterprise servers 50, and network clouds 60, this disclosure contemplates any suitable number of social-networking systems 20, client devices 30, web-application servers 40, enterprise servers 50, and network clouds 60. As an example and not by way of limitation, network environment 100 may include multiple social-networking systems 20, client device 30, web-application servers 40, enterprise servers 50, and network clouds 60.

In particular embodiments, web-application server 40 may be a network-addressable computing system that can host third-party websites (e.g., http://www.espn.com, http://www.youtube.com). Web-application server 40 may generate, store, receive, and transmit, for example, user data and webpage information. Web-application server 40 may be accessed by the other components of network environment 100 either directly or via network cloud 60. In particular embodiments, enterprise server 50 may be a network-addressable computing system that can host one or more enterprise systems. Enterprise server 50 may generate, store, receive, and transmit any suitable enterprise data. Enterprise server 50 may be accessed by the other components of network environment 100 either directly or via network cloud 60.

In particular embodiments, a user may use one or more client devices 30 to access, send data to, and receive data from social-networking system 20 or web-application server 40. Client device 30 may access social-networking system 20 or web-application server 40 directly, via network cloud 60, or via a third-party system. As an example and not by way of limitation, client device 30 may access web-application server 40 or enterprise server 50 via social-networking system 20. Client device 30 may be any suitable computing device, such as, for example, a personal computer, a laptop, a cellular phone, a smart phone or other cellular or mobile device, a personal digital assistant, an in- or out-of-car navigation system, a mobile gaming device, or a computing tablet.

In particular embodiments, network cloud 60 may include one or more interconnected networks over which various systems and hosts described herein may communicate. This disclosure contemplates any suitable network cloud 60. As an example and not by way of limitation, one or more portions of network cloud 60 may include an ad hoc network, an intranet, a private network, an extranet, a virtual private network (VPN), a local area network (LAN), a wireless network, a wireless LAN (WLAN), a wide area network (WAN), a wireless WAN (WWAN), a metropolitan area network (MAN), a portion of the Internet, a packet-based wide-area network, a portion of the Public Switched Telephone Network (PSTN), a cellular telephone network, a satellite network, a paging network, or a combination of two or more of these. Network cloud 60 may include one or more network clouds 60.

In particular embodiments, connections 70 may connect social-networking system 20, client device 30, web-application server 40, and enterprise servers 50 to communication network cloud 60 or to each other. This disclosure contemplates any suitable connections 70. In particular embodiments, one or more connections 70 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)) or optical (such as for example Synchronous Optical Network (SONET) or Synchronous Digital Hierarchy (SDH)) connections. In particular embodiments, one or more connections 70 each include an ad hoc network, an intranet, an extranet, a VPN, a LAN, a WLAN, a WAN, a WWAN, a MAN, a portion of the Internet, a portion of the PSTN, a cellular telephone network, another connection 70, or a combination of two or more such connections 70. Connections 70 need not necessarily be the same throughout network environment 100. One or more first connections 70 may differ in one or more respects from one or more second connections 70.

In particular embodiments, client device 30 may execute one or more client applications, such as a web browser (e.g., MICROSOFT WINDOWS INTERNET EXPLORER, MOZILLA FIREFOX, APPLE SAFARI, GOOGLE CHROME, and OPERA, etc.) or special-purpose client application (e.g., Facebook for iPhone, etc.), to access and view content over network cloud 60. In particular embodiments, the client applications may allow a user of client device 30 to enter addresses of specific network resources to be retrieved, such as resources hosted by social-networking system 20, web-application servers 40, enterprise servers 50, or another suitable host. These addresses may be Uniform Resource Locators (URLs) or other suitable address types. Once a webpage or other resource has been retrieved, the client applications may provide access to other webpages or resources when the user "clicks" on hyperlinks to other resources. As an example and not by way of limitation, such hyperlinks may be located within the webpages and provide an automated way for the user to enter the URL of another page and to retrieve that page.

More particularly, when a user at a client device 30 desires to view a particular webpage (hereinafter also referred to as a target structured document) hosted by social-networking system 20, or a web application hosted by a web-application server 40 (and possibly made available in conjunction with social-networking system 20), the user's web browser, or another client-side structured document rendering engine or suitable client application, formulates and transmits a request to social-networking system 20. The request may include a URL or other document identifier as well as metadata or other information. As an example and not by way of limitation, the request may include information identifying the user, such as a user ID, as well as information identifying or characterizing the web browser or operating system running on the user's client device 30. The request may also include location information identifying a geographic location of the user's client device 30 or a logical network location of the user's client device 30, as well as timestamp identifying when the request was transmitted.

Figure 2A:
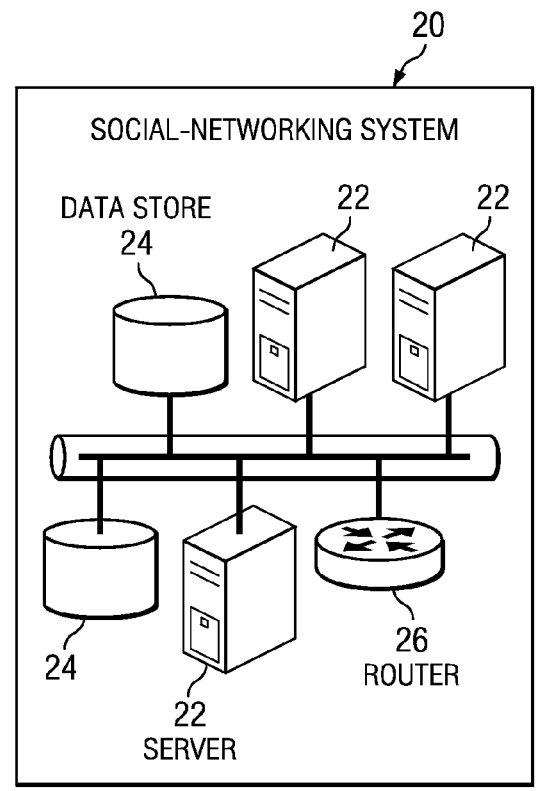
FIG. 2A illustrates example components of an example social-networking system.

FIG. 2A illustrates example components of an example social-networking system 20. In particular embodiments, social-networking system 20 may be a network-addressable computing system that can host an online social network. Social-networking system 20 may generate, store, receive, and transmit social-networking data, such as, for example, user-profile data, concept-profile data, social-graph information, or other suitable data related to the online social network. In particular embodiments, one or more webpages or web applications, such as those described herein, may be associated with social-networking system 20 or the online social network. Social-networking system 20 may be accessed by the other components of network environment 100 either directly or via network cloud 60. As an example and not by way of limitation, social-networking system 20 may comprise computing systems that allow users at client devices 30 to communicate or otherwise interact with each other and access content, such as user profiles, as described herein. In particular embodiments, social-networking system 20 may include a network-addressable computing system that, in various example embodiments, comprises one or more physical servers 22, as well as one or more data stores collectively referred to herein as data store 24 (which may be implemented in or by one or more of a variety of consolidated or distributed computing systems, databases, or data servers). The physical servers 22 may be operably connected to computer network 60 via, for example, a set of routers or networking switches 26. In particular embodiments, the functionality hosted by the one or more physical servers 22 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), and the like.

In particular embodiments, physical servers 22 may host functionality directed to the operations of social-networking system 20. As an example and not by way of limitation, social-networking system 20 may host a website that allows one or more users, at one or more client devices 30, to view and post information, as well as communicate with one another via the website. Hereinafter, servers 22 may be referred to as server 22, although, as just described, server 22 may include numerous servers hosting, for example, social-networking system 20, as well as other content distribution servers, data stores, or databases. Data store 24 may store content and data relating to, and enabling, operation of the social-networking system 20 as digital data objects including content objects. In particular embodiments, a data object may be an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 24 corresponds to one or more of a variety of separate or integrated databases, such as relational databases or object-oriented databases, that maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In particular embodiments, data store 24 may include one or more servers, databases (e.g., MySQL), and/or data warehouses. Data store 24 may include data associated with different social-networking system 20 users, client devices 30, web-application servers 40, or enterprise servers 50, as well as, in particular embodiments, data associated with various concepts.

Figure 2B:
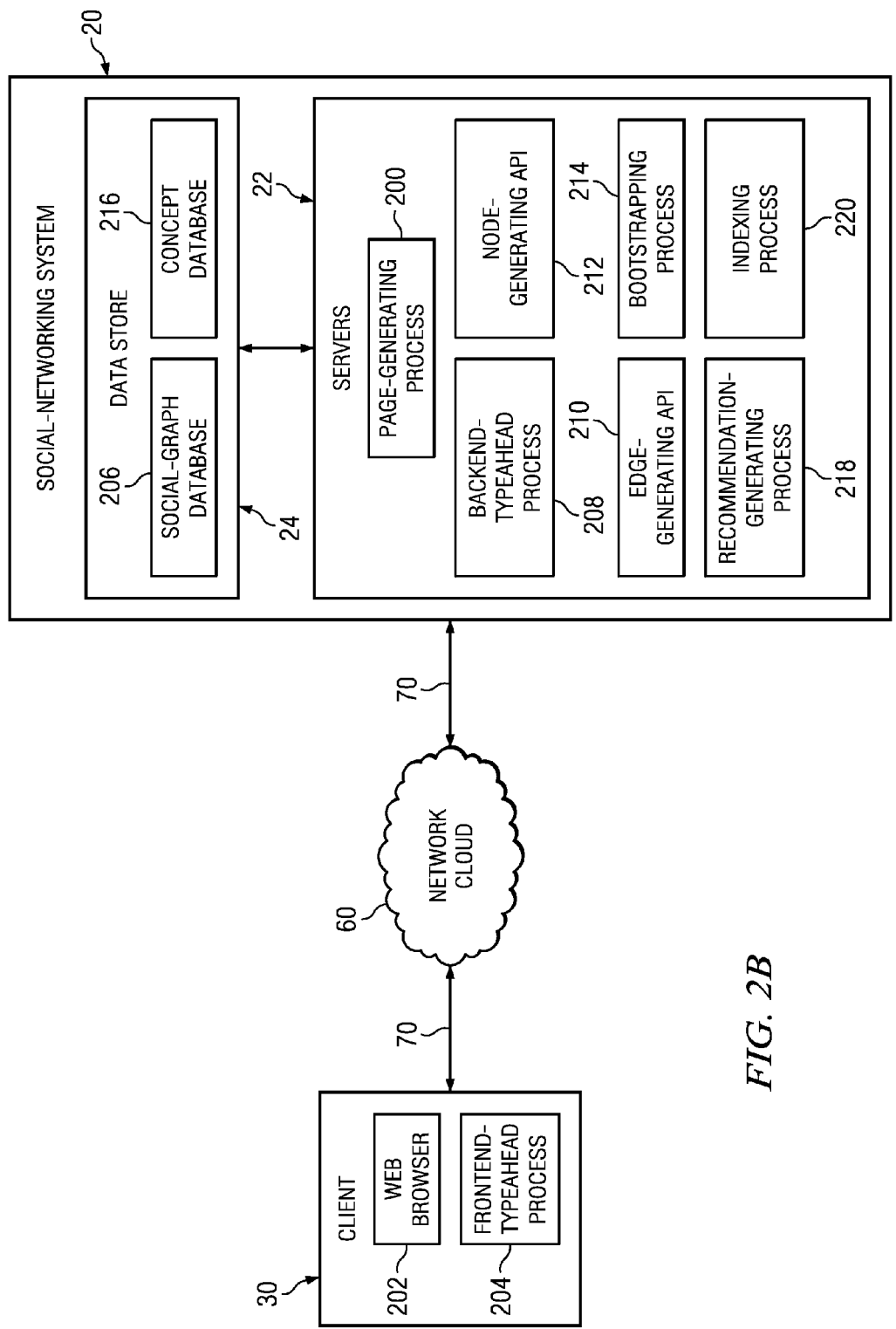
FIG. 2B illustrates an example architecture of the example social-networking system and an example architecture of an example client device.

FIG. 2B illustrates an example architecture of the example social-networking system 20 and an example architecture of an example client device 30. In particular embodiments, a client device 30 may include a web browser 202 and a frontend-typeahead process 204. In particular embodiments, a social-networking system 20 may include a data store 24 that includes a social-graph database 206 and a concept database 216. In particular embodiments, a social-networking system 20 may include a physical server 22 that includes a page-generating process 200, a backend-typeahead process 208, an edge-generating API 210, a node-generating API 212, a bootstrapping process 214, a recommendation generating process 218, and an indexing process 220.

In particular embodiments, the social-networking system 20 may be described or implemented in terms of a social graph including social-graph information. In particular embodiments, data store 24 may include a social-graph database 206 in which the social-graph information for use in implementing the social-networking system 20 described herein is stored. In particular embodiments, the social-graph information stored by social-networking system 20 in data store 24, and particularly in social-graph database 206, may include a plurality of nodes and a plurality of edges that define connections between corresponding nodes. In particular embodiments, the nodes or edges themselves are data objects that include the identifiers, attributes, and information (including the information for their corresponding profile pages) for their corresponding users or concepts, some of which is actually rendered on corresponding profile or other pages. The nodes may also include pointers or references to other objects, data structures, or resources for use in rendering content in conjunction with the rendering of the profile pages corresponding to the respective nodes.

In particular embodiments, when a request for a webpage or structured document hosted by social-networking system 20 is received by the social-networking system 20, one or more page-generating processes 200 executing within the social-networking system 20 may generate a base webpage in the form of a Hyper Text Markup Language (HTML), Extensible Markup Language (XML), or other web-browser-supported structured document. The generated structured document may then be transmitted in a response, which may comprise one or more portions or partial responses, to the requesting client 30 via a Hypertext Transfer Protocol (HTTP) or other suitable connection for rendering by the web browser 202 at the client device 30. The structured document may include one or more resources (e.g. JavaScript scripts, code segments, or resources, Cascading Style Sheet (CSS) code segments or resources, image data or resources, video data or resources, etc.), or references to such resources, embedded within the transmitted document. As an example and not by way of limitation, a resource embedded in an HTML document may generally be included or specified within a script element, image element, or object element, among others, depending on the type of resource. The element referencing or specifying the resource may include a source attribute (e.g., src) identifying a location of the resource, which may be located within a server 22 or data store 24 within social-networking system 20 or at one or more external locations, to the client device 30 requesting the webpage. Upon receipt of the response, the web browser 202 or other client document rendering application running at the client device 30 may then construct a document object model (DOM) representation of the received structured document and requests the resource(s) (which may be at one or more other external locations) embedded in the document.

In particular embodiments, when a registered user of social-networking system 20 first requests a webpage from social-networking system 20 in a given user session, the response transmitted to the user's client device 30 from social-networking system 20 may include a structured document generated by page-generating process 200 for rendering a login page at the client device. The user may then enter his user login credentials (e.g., user ID and password), which may then be transmitted from the user's client device 30 to social-networking system 20. Upon successful authentication of the user, social-networking system 20 may then transmit a response to the user's web browser 202 at the user's client device 30 that includes a structured document generated by page-generating process 200 for rendering a user homepage, user-profile page, or another landing page at the user's client device 30. Furthermore, in particular embodiments, which are further described herein, this or a subsequent response may further include one or more executable code segments (e.g., JavaScript) that, when received by the user's client device 30, implement a frontend (client-side) typeahead process 204 that executes in conjunction with the user's web browser 202.

Social Graphs

Figure 3:
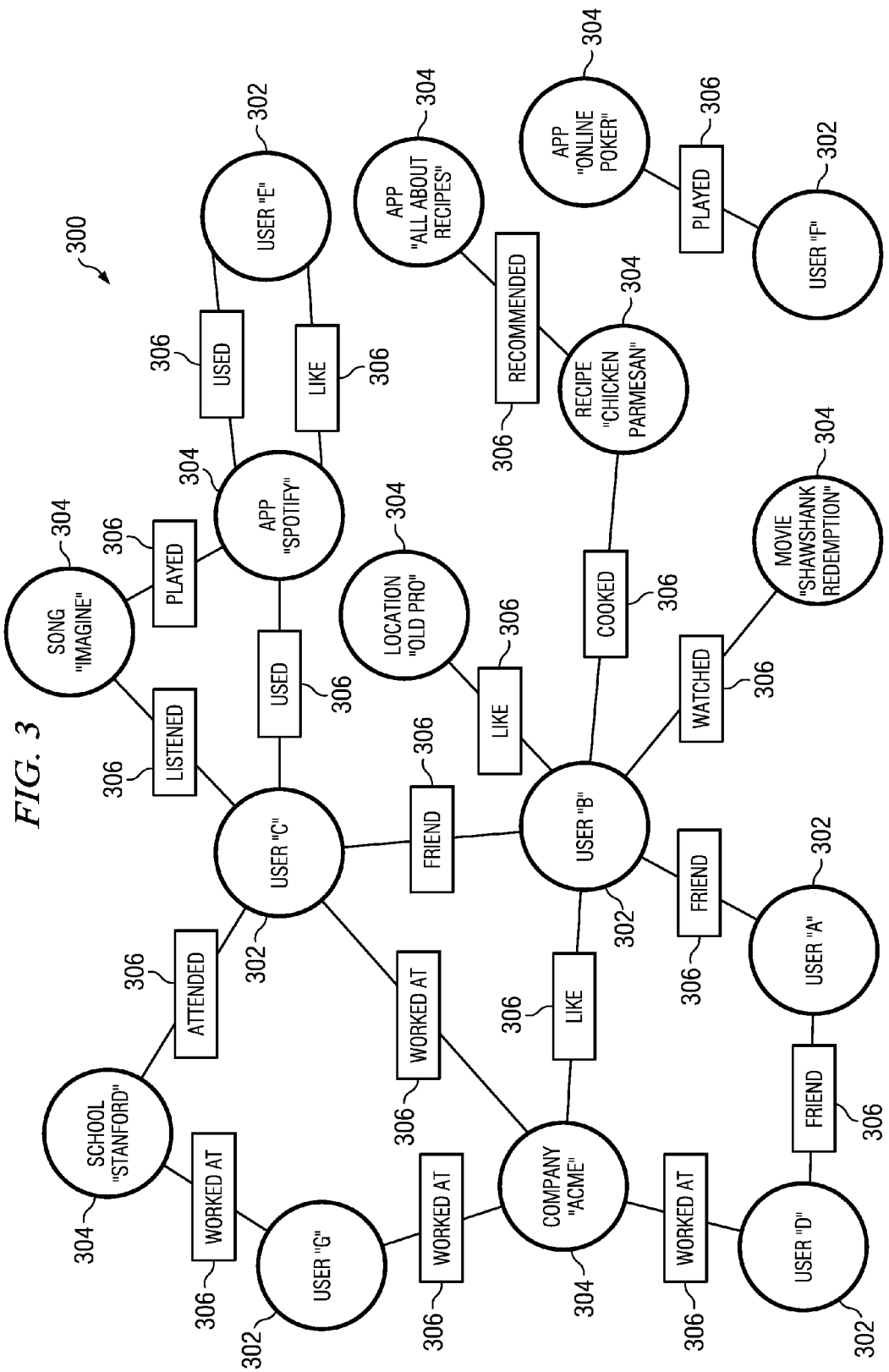
FIG. 3 illustrates an example social graph.

FIG. 3 illustrates example social graph 300. In particular embodiments, the social-networking system 20 may store one or more social graphs 300 in one or more data stores 24. In particular embodiments, social graph 300 may comprise a plurality of nodes, which may include a plurality of user nodes 302 and/or a plurality of concept nodes 304, and may also include a plurality of edges 306 connecting the nodes. The example social graph 300 illustrated in FIG. 3 is shown, for didactic purposes, in a two-dimensional visual map representation. In particular embodiments, the social-networking system 20, client devices 30, or web-application servers 40 may access the social graph 300 and related social-graph information for a variety of applications, including some applications described herein. The plurality of nodes and edges of social graph 300 may be stored as data objects, for example, in data store 24, and particularly social-graph database 206. Additionally, as described herein, data store 24 may further include one or more searchable or queryable indexes of nodes or edges generated by indexing social-graph database 206.

In particular embodiments, each user node 302 may correspond to a user of the social-networking system 20. As an example and not by way of limitation, a user may be an individual (human user), an entity (e.g., an enterprise, business, or third-party application), or a group (e.g., of individuals or entities) that interacts or communicates with or over a social-networking system 20. As used herein, a "registered user" refers to a user that has officially registered within the social-networking system 20. In particular embodiments, when a user registers for an account with the social-networking system 20, the social-networking system 20 may create a user node 302 corresponding to the user, and store the user node 302 in one or more data stores 24. Generally, the users and user nodes 302 described herein refer to registered users and the user nodes 302 associated with the users, although this is not necessarily a requirement in other embodiments; that is, in particular embodiments, the users and user nodes 302 described herein may refer to users that have not registered with the social-networking system 20. As used herein, an "authenticated user" refers to a user who has been authenticated by the social-networking system 20 as being the user claimed in a corresponding profile page to which the user has administrative rights or, alternately, a suitable trusted representative of the claimed user. In particular embodiments, the user node 302 may be associated with information provided by the user and information gathered by various systems, including the social-networking system 20. As an example and not by way of limitation, the user may provide his name, profile picture, contact information, birth date, sex, marital status, family status, employment, education background, preferences, interests, or other demographic information. In particular embodiments, each user node 302 may be associated with one or more data objects corresponding to information associated with a user. In particular embodiments, each user node 302 may correspond to one or more webpages or one or more user-profile pages. As an example and not by way of limitation, in response to a request including a user identifier of a particular user, social-networking system 20 may access a corresponding user node 302 based on the user identifier, and construct a user-profile page comprising a name, a profile picture, and interests of the particular user.

In particular embodiments, each concept node 304 may correspond to a concept. As an example and not by way of limitation, a concept may correspond to a place (such as, for example, a movie theater, a restaurant, a landmark, or a city), a website (such as, for example, a website associated with the social-network system 20 or a third-party website associated with a web-application server 40), an entity (such as, for example, a person, a business, a group, a sports team, or a celebrity), a resource (such as, for example, an audio file, a video file, a digital photo, a text file, a structured document, or an application; the resource may be located on the social-networking system 20 or on an external server, such as web-application server 40), real or intellectual property (such as, for example, a sculpture, a painting, a movie, a game, a song, an idea, a photograph, or a written work), a game, an activity, an idea or theory, another suitable concept, or two or more such concepts. An administrative user of a concept (such as, for example, the owner or administrator of the concept) may create a concept node 304 by providing information relating to the concept (e.g., by filling out an online form), causing social-networking system 20 to create a corresponding concept node 304, which may then be stored in one or more of data stores 24. A concept node 304 may be associated with information of a concept provided by an administrative user of the concept and information gathered by various systems, including the social-networking system 20. As an example and not by way of limitation, information of a concept may include as a name or a title, one or more images (e.g., an image of the cover page of a book), a location (e.g., an address, a geographical location), a website (e.g., an URL address), contact information (e.g., a phone number, an email address), other suitable concept information, or any combination of such information. In particular embodiments, each concept node 304 may be associated with one or more data objects corresponding to information associated with the concept node 304. In particular embodiments, each concept node 304 may correspond to a webpage. As an example and not by way of limitation, in response to a request including a name (or an URL address), the social-networking system may access a corresponding concept node (stored in one or more of data stores 24) based on the name, and construct a webpage comprising the name, one or more images, and contact information of the concept.

In particular embodiments, each node in the social graph 300 may, represents, or be represented by, a corresponding webpage ("profile page"). Profile pages may be hosted by or accessible by the social-networking system 20. Profile pages may also be hosted on third-party websites associated with a web-application server 40. As an example and not by way of limitation, a profile page corresponding to a particular external webpage may simply be the particular external webpage, and this profile page may correspond to a particular concept node 304. Profile pages may be viewable by all or a selected subset of other users. As an example and not by way of limitation, a user node 302 may have a corresponding user-profile page in which the corresponding user may add content, make declarations, or otherwise express himself or herself. Generally, a user has administrative rights to all or a portion of his or her own respective user-profile page as well as, potentially, to other pages created by or for the particular user including, for example, home pages, pages hosting web applications, among other possibilities. As another example and not by way of limitation, a concept node 304 may have a corresponding concept-profile page ("hub") in which one or more users may add content, make declarations, or express themselves, particularly in relation to the concept. Although this disclosure generally describes nodes being connected, this disclosure also describes profile pages being connected. References to profile pages being connected generally refer to the nodes corresponding to those profile pages being connected in the social graph 300 by one or more edges 306, unless context suggests otherwise.

In particular embodiments, a concept node 304 may represent a third-party webpage or resource hosted by web-application server 40. The third-party webpage or resource may include a selectable icon (e.g., implemented in JavaScript, AJAX, or PHP codes) representing an action or activity. As an example and not by way of limitation, a third-party webpage for the "Old Pro" about The Old Pro Sports Bar in Palo Alto, Calif., may include a selectable icon such as "like" or "check in," like the webpage 520 illustrated in FIG. 5B, or may include selectable icons such as, for example, "eat," "recommend," or any other suitable action or activity. A user viewing the third-party webpage may perform an action by selecting one of the icons (e.g., "eat"), causing client device 30 to transmit to the social-networking system 20 a message indicating the user's action (e.g., eating at "Old Pro"). If a concept node 304 corresponding to the third-party webpage or resource exists in social graph 300, in response to the message, the social-networking system 20 may create an edge (e.g., an "eat" edge) between a user node 302 corresponding to the user and the concept node 304 corresponding to the third-party webpage or resource, and store the edge 306 in one or more of data store 24. If a concept node 306 corresponding to the third-party webpage or resource does not exist in social graph 300, in response to the message, the social-networking system 20 may create a concept node 304 corresponding to the third-party webpage or resource, create an edge 306 (e.g., an "eat" edge) between the newly-created concept node and a user node corresponding to the user, and store the concept node 304 and the edge 306 in one or more of data stores 24.

In particular embodiments, a particular concept may correspond to one or more concept nodes 304. A social graph 300 may comprise a plurality of concept nodes 304 corresponding to a same concept (e.g., a same real-world entity). That is, each concept node 304 of the several concept nodes 304 may correspond to a different webpage that is about the same concept. As an example and not by way of limitation, a popular celebrity or restaurant may have several webpages, such as, for example, a "fan page," an "official page," or a "review page," authored by various users.

In particular embodiments, the plurality of user nodes 302 and concept nodes 304 may represent administered nodes and un-administered nodes, respectively. The administered nodes (i.e., user nodes 302) may be user-administered nodes that each correspond to a respective user and a respective user-profile page of that user. In particular embodiments, user-profile pages corresponding to user nodes 302 may be modified, written to, or otherwise administered by, and only by, their respective owner (registered) users (unless an official administrator of social-networking system 20 in general desires or requires access to modify or delete a user's profile page, e.g., as a result of scrupulous or otherwise inappropriate action on the part of the registered user). The un-administered nodes (i.e., concept nodes 304) may be non-user-administered nodes that each correspond to a respective concept and a respective concept-profile page (also referred to hereinafter as a "hub") devoted to the respective concept. In particular embodiments, un-administered nodes are nodes having respective concept-profile pages (hubs) that are generally not administered by any one user; rather, in particular embodiments, hubs may generally be administered, created, and written and contributed to or modified by, at least in part, by any registered user of social-networking system 20, including, in particular embodiments, users not having connections with the concept nodes 304 (that is, users whose user nodes 302 are not necessarily connected with the concept nodes 304 with edges in the social graph 300 in social-graph database 206). In a sense, hubs may be administered, or contributed to, by the community of registered users of social-networking system 20.

In particular embodiments, a pair of nodes in the social graph 300 may be connected by one or more edges 306. An edge 306 connecting a pair of nodes may represent a relationship between the pair of nodes. In particular embodiments, each edge 306 may comprise or represent one or more data objects or attributes corresponding to the relationship between a pair of nodes. As an example and not by way of limitation, a first user may indicate that a second user is a "friend" of the first user. In response to this indication, the social-networking system 20 may transmit a "friend request" to the second user. If the second user confirms the "friend request," the social-networking system 20 may create an edge 306 connecting the first user's user node 302 and the second user's user node 302 in social graph 300, and store the edge 306 as social-graph information in one or more of data stores 24. In the example of FIG. 3, social graph 300 includes an edge 306 indicating a friend relation between the user nodes 302 of user "A" and user "B," and an edge indicating a friend relation between the user nodes 302 of user "C" and user "B." Although this disclosure describes and FIG. 3 illustrates edges 306 with particular attributes connecting user nodes 302, this disclosure contemplates edges 306 with any suitable attributes connecting user nodes 302. As an example and not by way of limitation, an edge 306 may represent a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships. Moreover, although this disclosure generally describes nodes being connected, this disclosure also describes users and/or concepts being connected. References to users and/or concepts being connected generally refer to the nodes corresponding to those users or concepts being connected in the social graph 300 by one or more edges 306, unless context suggests otherwise.

In particular embodiments, each edge type may include one or more edge sub-types that add more detail or metadata describing the specific type of connection between corresponding pairs of nodes. Each edge 306 may be one of a plurality of edge types based at least in part on the types of nodes that the edge connects in the social graph 300. Furthermore, in some embodiments, new edge types may be defined or generated automatically or dynamically. As an example and not by way of limitation, information entered into, or in relation to, third party web applications may cause new edge types to be defined and generated. As an example and not by way of limitation, a web application for NETFLIX may result in an edge type that signifies "movies I want to see." In such embodiments in which edges 306 have or are assigned associated edge types, the edge 306 itself may store, or be stored with, data that defines a type of connection between the pair of nodes the edge 306 connects, such as, for example, data describing the types of the nodes the edge connects (e.g., user, hub, category or classification of hub), privacy settings defining a visibility of the edge 306 to various users, access privileges of an administrator of one of the pair of nodes connected by the edge 306 with respect to the other node the edge 306 connects to (e.g., read or write access of an administrator of one node with respect to the other node connected by the edge 306), or data describing how or why the edge 306 was first initialized or created (e.g., in response to an explicit user action or declaration, or automatically without an explicit user action), the strength of the connection as determined by various factors or criteria related to or shared by the nodes (or more particularly the users or concepts associated with the respective connected nodes) connected by the edge 306, or other suitable or relevant data.

In particular embodiments, each edge 306 may simply define or represent a connection between nodes regardless of the types of nodes the edge connects. The edge itself may store, or be stored with, identifiers of the nodes the edge 306 connects but may not store, or be stored with, data that describes a type of connection between the pair of nodes the edge connects. Furthermore, in any of these or other embodiments, data that may indicate the type of connection or relationship between nodes connected by an edge may be stored with the nodes themselves. In particular embodiments, the edges, as well as attributes (e.g., edge type and node identifiers corresponding to the nodes connected by the edge), metadata, or other information defining, characterizing, or related to the edges, may be stored (e.g., as data objects) in social-graph database 206 and updated periodically or in response to various actions or factors (e.g., as a user interacts more with a hub, the edge connecting the respective user and concept nodes may be updated to reflect this interaction, which may then contribute to an affinity or connection strength score characterizing the edge as described in more detail below).

In particular embodiments, an edge 306 between a user node 302 and a concept node 304 may represent a particular action or activity performed by a user of the user node 302 toward a concept associated with a concept node 304. As an example and not by way of limitation, as illustrated in FIG. 3, a user may "like," "attended," "played," "listened," "cooked," "worked at," or "watched" a concept, each of which may correspond to a edge type or subtype. The concept-profile page corresponding to a concept node 304 may include, for example, a selectable "check in" icon (such as, for example, the "check in" icon 524 illustrated in FIG. 5B) or a selectable "add to favorites" icon (such as, for example, the icon 526 illustrated in FIG. 5B). Similarly, after a user clicks these icons, the social-networking system 20 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 20 may create a "listened" edge 306 and a "used" edge (as illustrated in FIG. 3) between the user nodes 302 corresponding to the user and the concept nodes 304 corresponding to the song and application to indicate that the user listened to the song and used the application. Moreover, the social-networking system 20 may create a "played" edge 306 (again, as illustrated in FIG. 3) between the concept nodes 304 corresponding to the song and the application to indicate that the particular song was played by the particular application. In this case, the "played" edge 306 corresponds to an action performed by an external application (SPOTIFY) on an external audio file (the song "Imagine"). Although this disclosure describes edges 306 with particular attributes connecting user nodes 302 and concept nodes 304, this disclosure contemplates edges 306 with any suitable attributes connecting user nodes and concept nodes. Moreover, although this disclosure describes edges between a user node and a concept node representing a single relationship, this disclosure contemplates edges between a user node and a concept node representing one or more relationships. As an example and not by way of limitation, an edge 306 may represent both that a user likes and has used at a particular concept. Alternatively, a separate edge 306 could be generated to represent each type of relationship (or multiples of a single relationship) between a user node 302 and a concept node 304, as illustrated in FIG. 3 between the user node 302 for user "E" and the concept node 304 for "SPOTIFY."

In particular embodiments, the social-networking system 20 may create an edge 306 between a user node 302 and a concept node 304 in social graph 300. As an example and not by way of limitation, a user viewing a concept-profile page (such as, for example, by using a web browser or a special-purpose application hosted by the user's client device 30) may indicate that he likes the concept represented by the concept node 304 by clicking or selecting a "Like" icon (such as, for example, the "Like" icons 522 illustrated in FIG. 5B or 5C), which may cause the user's client device 30 to transmit to the social-networking system 20 a message indicating the user's liking of the concept associated with the concept-profile page. In response to the message, the social-networking system 20 may create an edge 306 between the user node 302 associated with the user and the concept node 304, as illustrated by the "like" edge 306 between the user node of user "B" and the concept node of sports bar "Old Pro" in FIG. 3. In particular embodiments, the social-networking system 20 may store the edge 306 in one or more of data stores 24. Although this disclosure describes forming edges 306 in a particular manner, this disclosure contemplates forming edges 306 in any suitable manner. As an example and not by way of limitation, rather than visiting webpage and clicking an icon, a user may use a mobile application or another suitable application that is operable to form an edge 306 between the user's user node 302 and a concept node 304.

In particular embodiments, an edge 306 may be automatically formed by the social-networking system 20 in response to particular user actions. As an example and not by way of limitation, if a first user uploads a picture, watches a movie, or listens to a song, an edge 306 may be formed between the user node 302 corresponding to the first user and the concept nodes 304 corresponding to those concepts. As another example and not by way of limitation, the social-networking system 20 may automatically generating nodes and edges based on information currently being entered by a user of social-networking system 20. As yet another example and not by way of limitation, the social-networking system 20 may automatically generating nodes and edges based on information previously entered by users of social-networking system 20. More information on automatically generating nodes and edges may be found in U.S. patent application Ser. No. 12/763,162, filed 19 Apr. 2010, which is incorporated herein by reference.

User-Profile Pages

FIGS. 4A-4D illustrate example user-profile pages. In particular embodiments, a user node 302 in social graph 300 may correspond to a user-profile page. In particular embodiments, a user-profile page is visible to the user, the user's friends, and even other non-friend users depending on the privacy settings associated with the user node of the user. A user may set or modify his or her privacy settings via, for example, the user's user-profile page, a user homepage, an account-settings pages, a privacy-settings page, or via another suitable interface. The user-profile page may comprise a number of different subpages viewable or accessible via selecting one or more tabs 401. As an example and not by way of limitation, in the embodiment illustrated in FIG. 4A, the user-profile page includes a Wall (feed) tab 401a for accessing a wall (feed) for postings, an Info tab 401b for entering and displaying information about or related to the user, a Photos tab 401c for uploading and displaying photos, and a Boxes tab 401d. A user may select a particular photo or picture uploaded in photos tab 401c for display as a user profile picture 403. In particular embodiments, the user's profile picture 403 as well as other features such as, for example, the options to send a message to another user, edit the profile page, view friends of the user, or view photos of the user, may be displayed in a "chrome" (border) region of the page no matter which of tabs 401 is selected. In particular embodiments, a search bar or search interface may be included in the chrome of a user-profile page (as well as other pages), enabling users to input queries for social-network data, such as, for example, the names or attributes of other users or concepts the user desires to search for.

In particular embodiments, a portion of, or all of, the information accessible or visible to the user and other users via the user-profile page may be self-declared. A user may type or otherwise input information or content in various sections or forms that may or may not automatically appear by default when the user-profile page is created. In particular embodiments, a user may edit his or her user-profile page at anytime the user is logged into social-networking system 20. As an example and not by way of limitation, user-profile pages may include data that describe the respective users of the online social network enabled by social-networking system 20, which may include, for example, proper names (first, middle and last of a person, a trade name or company name of a business entity, etc.), nicknames, biographic, demographic, and other types of descriptive information in a basic information section 402 under Info tab 401*b*. The basic information section 402 may further include a user's sex, current city of residence, birthday, hometown, relationship status, political views, what the user is looking for or how the user is using the social network (e.g., for looking for friendships, relationships, dating, networking, etc.), and the like.

In particular embodiments, a user-profile page may also include a personal information section 406 where the user can enter more personal declarations. As an example and not by way of limitation, a personal information section 406 may include a sub-section 408 in which the user may declare various activities he, she, or it participates in or enjoys such as, for example, sports or music. As an example and not by way of limitation, in section 408, the user may declare these activities by, for example, simply listing the activities. As an example and not by way of limitation, the user may list "weight lifting, hiking, playing ping-pong, and foosball," or may use phrases such as, for example, "I enjoy weightlifting, I like hiking, I love playing ping-pong, I'm good at foosball." The user may separate or delineate his or her declared activities (and other declarations described below) with, for example, commas, semicolons, dashes, or carriage returns (which may be recognizable by the typeahead or bootstrapping processes described below). The personal information section 406 may also include a sub-section 410 in which the user may declare various interests. Again, the user may simply list such interests, such as by typing, for example, "reading and photography," or by using phrases such as, for example, "I like to read, I like photography." As another example, interests section 406 may include a favorite music sub-section 412 in which the user may declare music he or she likes or is interested in, a favorite TV shows sub-section 414, a favorite movies sub-section 416, a favorite books sub-section 418, a favorite quotations sub-section 420, and even a general "about me" sub-section 422 in which the user may enter general declarations about himself or herself that may not fit under the previously described sections.

In particular embodiments, a user-profile page may also include a contact information section 424 in which the user may enter various contact information including, for example, email addresses, phone numbers, residential address, work address, or other suitable contact information. A user-profile page may also include an education and work section 426 in which the user may enter his or her educational or employment history. As an example and not by way of limitation, a user may declare that he or she attended Stanford University in section 426 by, for example, simply typing "Stanford University," by typing "I attended Stanford University," or by selecting Stanford University from a menu interface. The user may also describe more specific information, such as, for example, the degree awarded, the field of the degree, the graduation date, etc. As another example, section 426 may enable the user to enter the user's work experience. As an example and not by way of limitation, a user may declare that he or she works at "Acme" company by, for example, simply typing "Acme," by typing "I work at Acme," or selecting the company "Acme" from a menu.

In particular embodiments, a user-profile page also includes a friends section 428 (which may be visible in the chrome or other region of the page) that displays all or a subset of the user's friends as defined by edges 306 in the social graph 300 stored in social-graph database 206. In particular embodiments, the user may click on a name or thumbnail image 429 associated with a friend resulting in the directing of the user to the user-profile page of the selected friend. In particular embodiments, any action that a user takes with respect to another second user, whether or not the second user may be a friend of the user or not, and, in particular embodiments, actions that the user takes with respect to various concept nodes, may be displayed in a recent activity section 430, which may be viewable as a sub-section within a wall (feed) section 432 under Wall (feed) tab 401*a*. Generally, wall (feed) section 432 is a space on every user's profile page that allows the user and friends to post messages via input box 434 for the user and friends to see, as well as to comment or otherwise express themselves in relation to posts on the wall (feed).

Figure 4A:
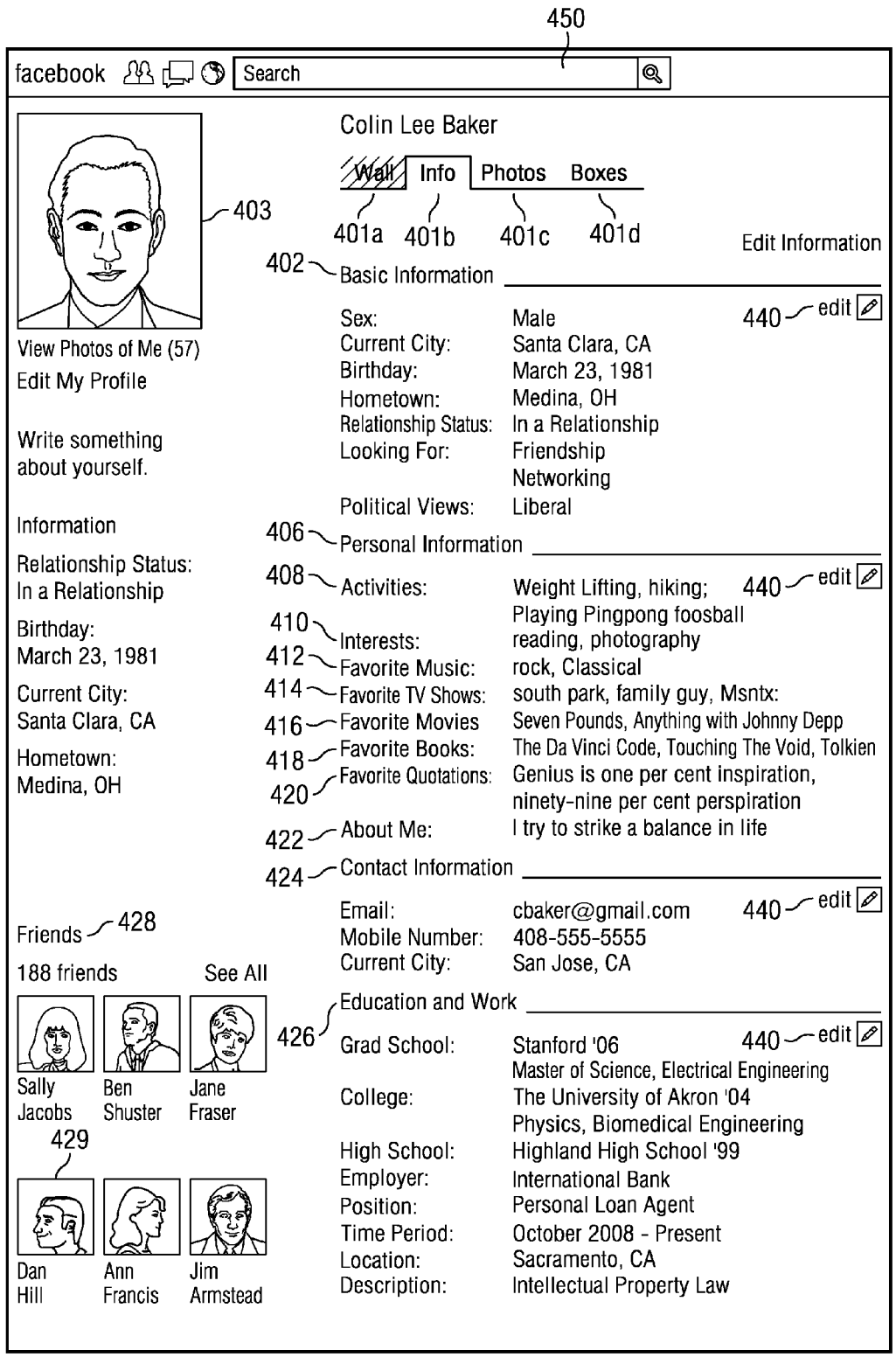
FIGS. 4A-4D illustrate example user-profile pages.
Figure 4B:
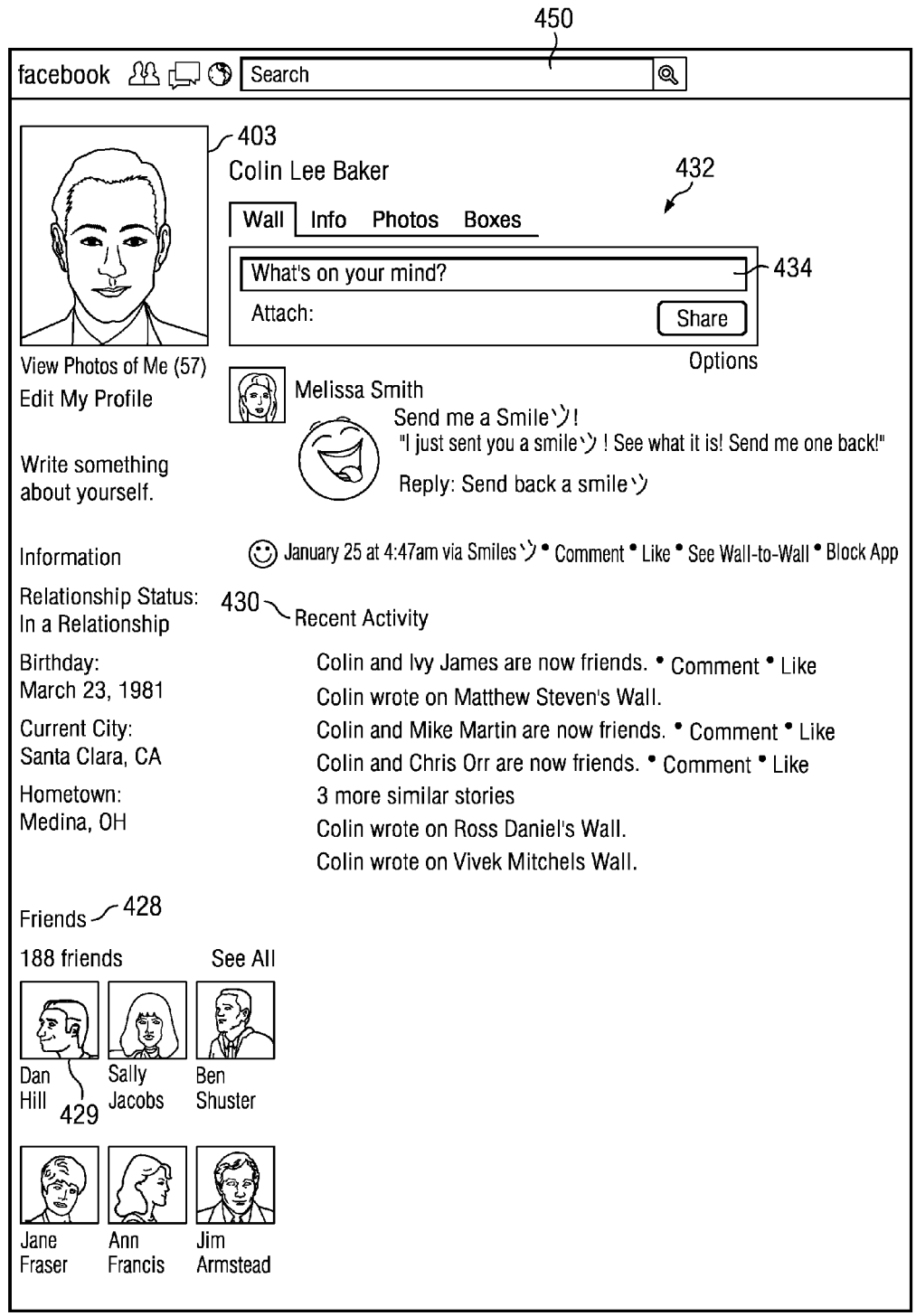
Figure 4C:
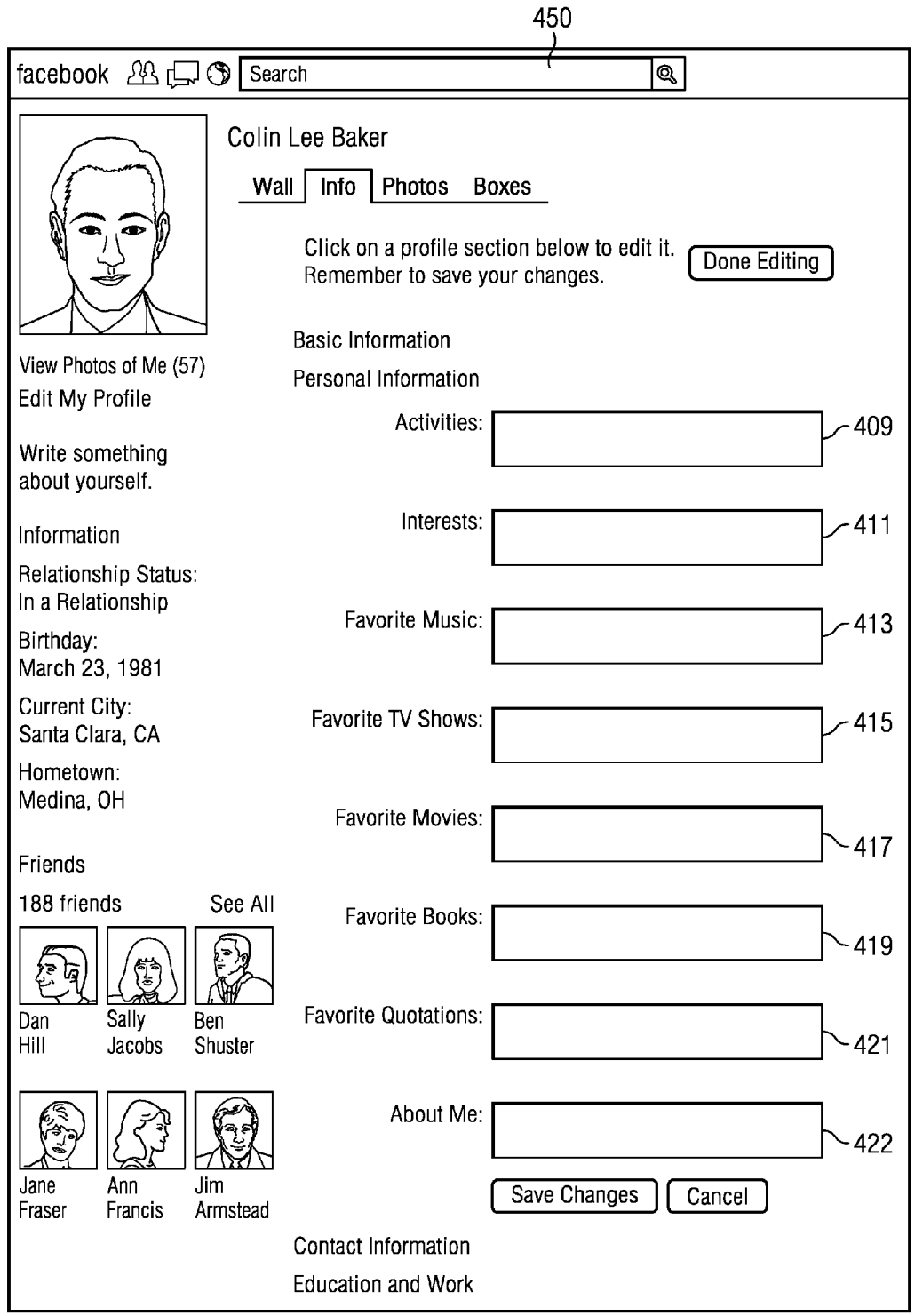

In particular embodiments, a user may edit his or her user-profile page and make declarations by clicking or otherwise selecting an edit link 440 corresponding to the section that the user desires to edit or make a declaration. As an example and not by way of limitation, FIG. 4C illustrates the resultant rendered webpage displayed to the user at the user's client device 30 after the user has selected the edit link 440 corresponding to the personal information section 406. As shown in FIG. 4C, a plurality of form boxes 409, 411, 413, 415, 417, 419, 421, and 423 are rendered enabling the user to type or otherwise enter declarations into corresponding sections 408, 410, 412, 414, 416, 418, 420, and 422, respectively. As the user enters text characters into a form box, the frontend and backend-typeahead processes 204 and 208 may attempt to identify existing concept nodes 304 (or user nodes 304, e.g., especially user nodes corresponding to celebrities, businesses, or organizations) that match the string of characters entered in the user's declaration as the user is entering the characters.

In particular embodiments, a user may submit a query to the social-network system 20 by inputting a text query into search field 450. The query may be an unstructured text query and may comprise one or more text strings or one or more n-grams. In general, a user may input any character string into search field 450 to search for content on the social-networking system 20 that matches the text query. The social-networking system 20 may then search data store 24 (or, more particularly, social-graph database 206 or concept database 216) to identify content matching the query. The identified content may include, for example, social-graph entities (i.e., user nodes 302, concept nodes 304, edges 306), profile pages, external webpages, or any combination thereof. The page-generating process 200 of the social-networking system 20 may then generate a search results webpage with search results corresponding to the identified content. The search results webpage may include reference to some or all of the identified content that matched the text query. The social-networking system 20 may then transmit the search results webpage to the user's web browser 202 on the user's client device 30. The user may then click or otherwise select the content from the search results webpage to access the content from the social-networking system 20 or from an external system, as appropriate. Although this disclosure describes querying the social-networking system 20 in a particular manner, this disclosure contemplates querying the social-networking system 20 in any suitable manner.

Concept-Profile Pages

Figure 5A:
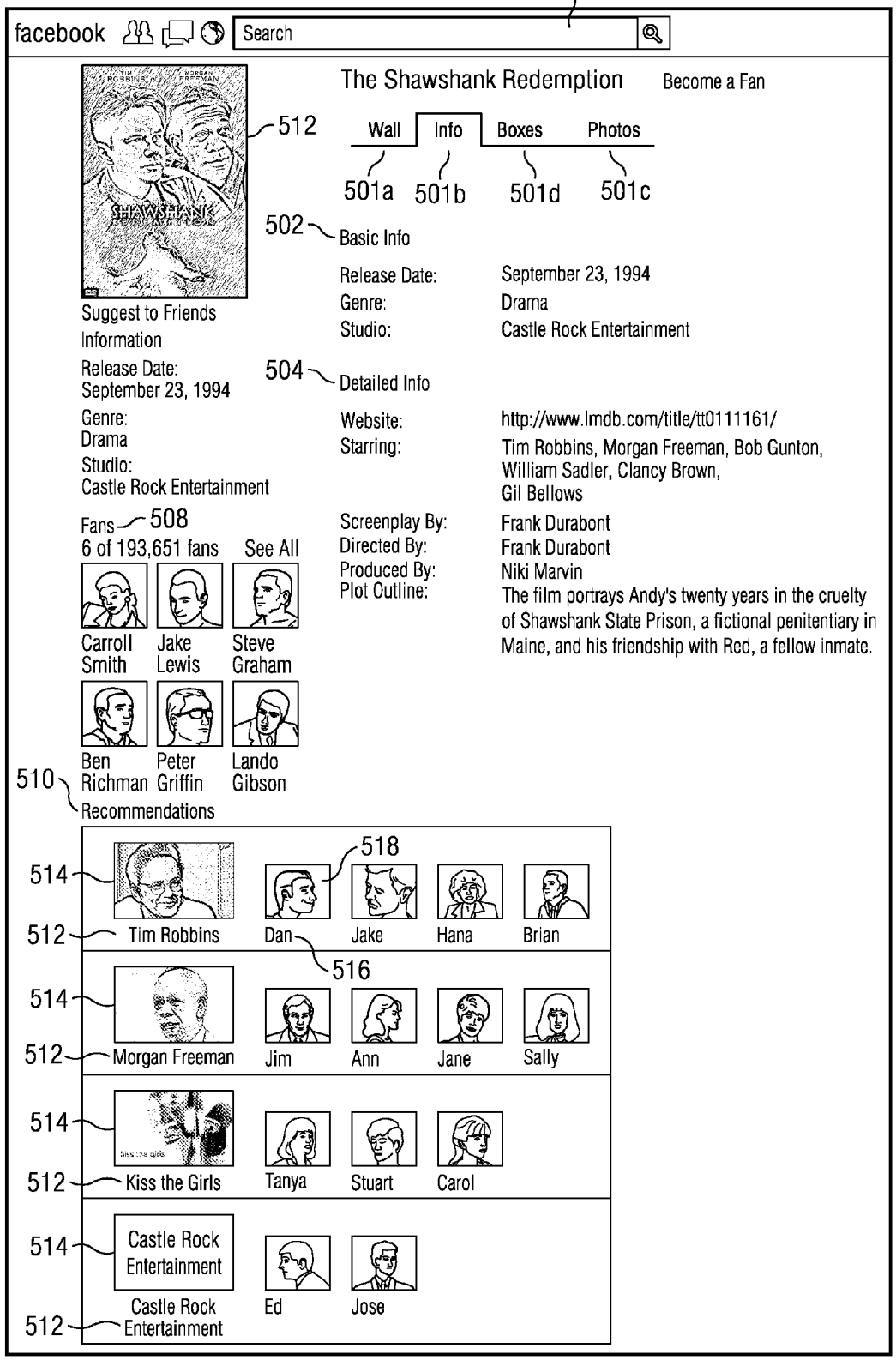
FIGS. 5A-5C illustrate example concept-profile pages.
Figure 5B:
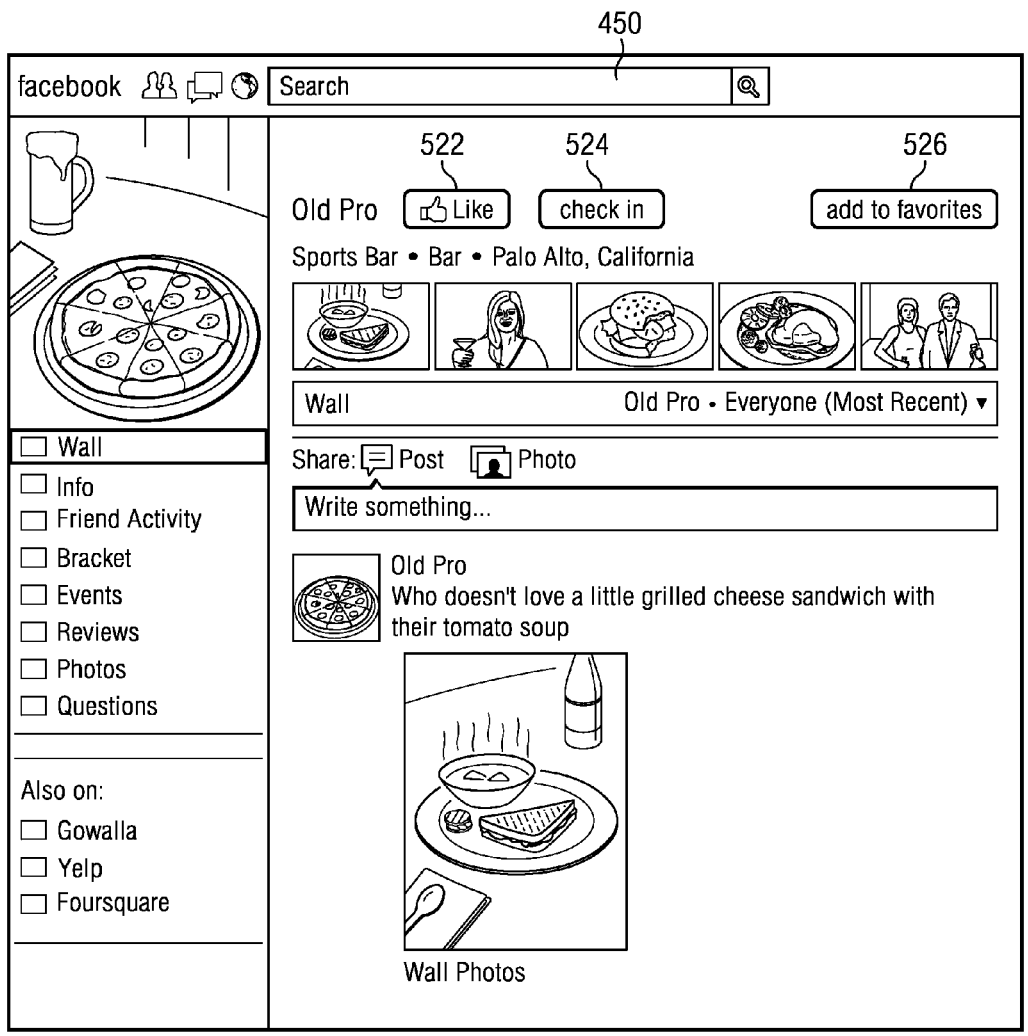
Figure 5C:
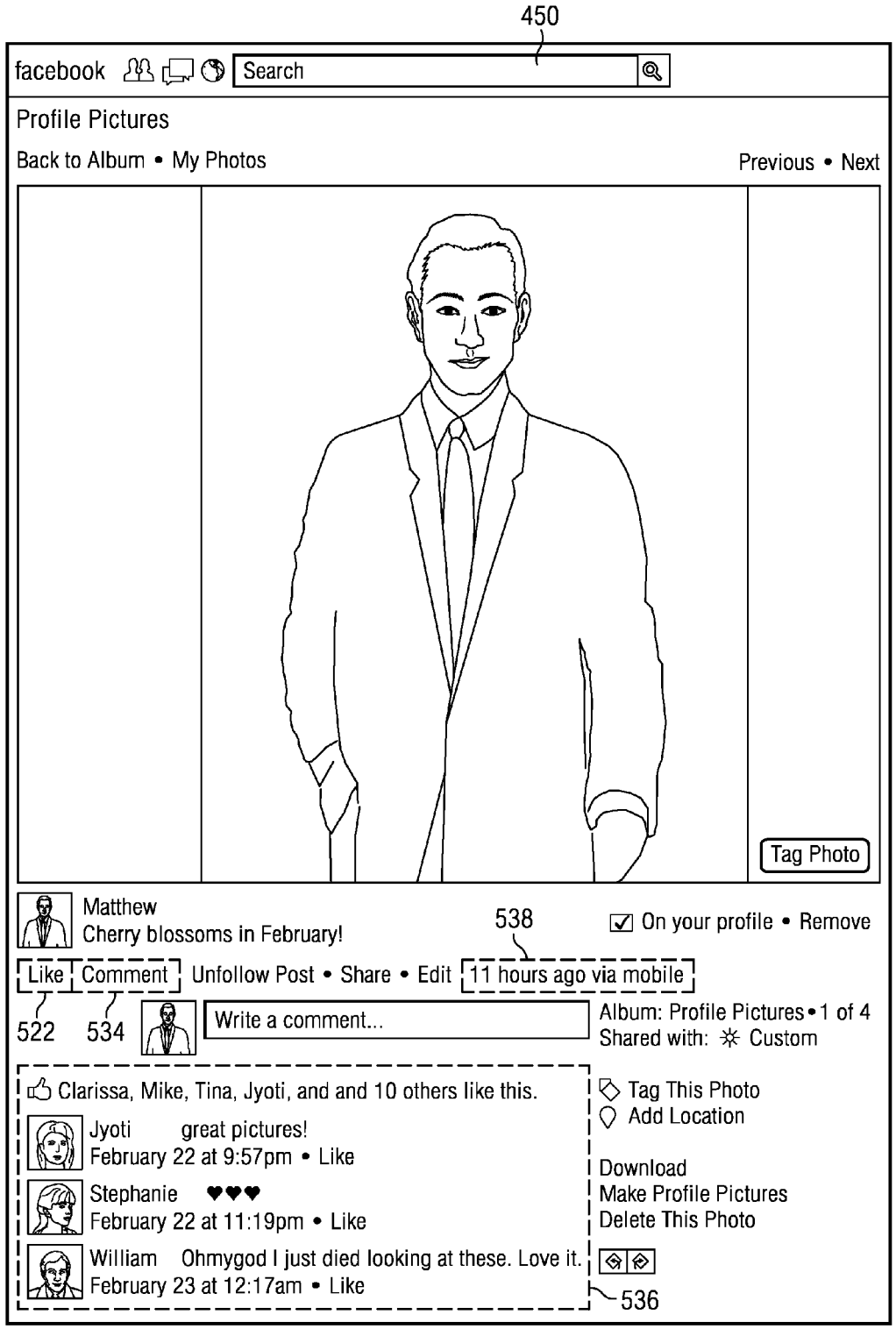

FIGS. 5A-5C illustrate example concept-profile pages. In particular embodiments, a concept node 304 in social graph 300 may correspond to a concept-profile page. In particular embodiments, concept nodes 304 and their respective hubs may be explicitly created by users of social-networking system 20 or generated automatically by social-networking system 20. Similar to user-profile pages, concept-profile pages (also referred to as "hubs") share information related to the concept associated with the corresponding concept node 304. In particular embodiments, any registered user logged in to social-networking system 20 and viewing a hub may add content to the hub (such as, for example, in a manner similar to a wiki-site). As an example and not by way of limitation, FIG. 5A illustrates an example hub for the movie "The Shawshank Redemption." In particular embodiments, and as illustrated in FIG. 5A, a hub may include subpages accessible via wall (feed) tab 501a, info tab 501b, photos tab 501c, and boxes tab 501d similar to a user-profile page. A hub may also generally include a basic information section 502, a detailed info section 504, as well as, potentially, other sections. Information included in a concept-profile page may be provided, for example, by an administrator associated with the concept or concept node 304, by a user viewing the hub (although in particular embodiments, there may be a time-delay associated with a content approval or synchronization process before the user-generated or user-added content is visible in the hub), by the social-networking system 20 (based on extracted information from internal or external/third-party sources (e.g., WIKIPEDIA)), or by another suitable source. A hub may also include a photo or picture section under photos tab 501c allowing users to upload images in or related to the concept, one of which may be selected as a profile picture 512 for the hub. As another example and not by way of limitation, FIG. 5B illustrates a webpage for the "Old Pro," a sports bar in Palo Alto, Calif. The webpage may include, for example, a selectable "like" icon 522, a selectable "check in" icon 524, a selectable "add to favorites" icon 526, other suitable components, or any combination thereof. As yet another example and not by way of limitation, FIG. 5C illustrates a webpage for the picture of "Matthew." The webpage may include, for example, a selectable "like" icon 522, a selectable "comment" icon 534, a history of comments and "likes" from various users in field 536, an indication of the application corresponding to the concept node in field 538, other suitable components, or any combination thereof. Although this disclosure describes and FIGS. 5A-5C illustrate particular webpages associated with particular concept nodes, this disclosure contemplates any suitable webpages associated with any suitable concept nodes. Moreover, although this disclosure describes concept nodes being associated with webpages, this disclosure contemplates concept nodes that are not necessarily associated with webpages. As an example and not by way of limitation, a concept node may correspond to a song or other musical work that it not associated with any particular webpage.

In particular embodiments, wall (or news feed/activities feed) section 501a, or other feed or activities section of the hub, displays comments, status updates, wall posts and other user activities associated with the user and friends of the user that are viewing the hub. The wall (or news feed/activities feed) section 501a, or other feed or activities section of the hub may also display comments, status updates, wall posts and other user activities and user generated content that are related to the concept for which the hub was created. More particularly, one or more processes within social-networking system 20 may perform a search on comments, status updates, wall posts and other user-generated content and user activities associated with the requesting user and friends of the requesting user filtered by concept; that is, a keyword search for keywords related to the concept of the currently requested or viewed hub (and potentially keywords related to the concepts associated with the recommended hubs) in these streams of user feeds or activities related to the requesting user and the requesting user's friends, and display this subset of user content or activities in the wall or feed section 501a of the currently requested or viewed hub. As an example and not by way of limitation, U.S. patent application Ser. No. 12/704, 400, filed 11 Feb. 2010, describes methods, processes, or systems for performing such searching, filtering, and displaying, and is hereby incorporated by reference herein. Wall or feed section 501a may also include a section, which may be a separate section from that just described, that displays comments, status updates, wall posts and other user activities of any and all users of social-networking system 20 that are related to the concept for which the hub was created, not just those of the user and friends of the user viewing the hub.

In particular embodiments, the default sections displayed in a particular hub upon creation of the hub may depend on the concept itself; that is, concept nodes 304 may be categorized by social-networking system 20, and these categories (e.g., people, places, things, activities, sports, sports teams, celebrities, cities, locations, movies, actors, books, restaurants, etc.) may dictate, at least in part, which sections are displayed on a particular hub. As an example and not by way of limitation, a movie hub may include a section or sub-section for entering actors starring in the movie, as illustrated in FIG. 5A, as well as sections or sub-sections for entering information such as the director, writer, releasing studio, release date, etc. In particular embodiments, a hub may also include a section 508 (which, in particular embodiments, may be visible no matter which of tabs 501 are currently selected) that lists or displays users that have connections (and corresponding edges 306 in the social graph 300) to or with the concept (and its corresponding concept node 304), such as a fans section 508 in the example illustrated in FIG. 5A. As an example and not by way of limitation, such users may have connections, and associated edges 306 stored in social-graph database 206, indicating, for example, that they like the movie, saw the movie, want to see the movie, acted in the movie, etc. In particular embodiments, the users displayed in fans section 508 may only include users who are also friends with the user currently viewing the hub.

In particular embodiments, a hub may include a recommendations section 510 (which, in particular embodiments, may be visible no matter which of tabs 501 are currently selected) that includes or displays a list or set of names 512, thumbnail images 514, or other identifiers associated with other hubs, each of which may include a hyperlink to the respective other hub. As an example and not by way of limitation, as illustrated in FIG. 5A, a recommendations section 510 for a hub corresponding to a movie may display hubs corresponding to movies that are directed by the same director, movies sharing some of the same actors, movies of the same genre, or movies liked by friends of the user, etc. In particular embodiments, the hubs displayed or listed in recommendations section 510 may be considered relevant to, have some determined relation to, or be determined based on leveraging information extracted from social-graph database 206 about, one or more of: the particular user (also referred to hereinafter as the "requesting user") requesting or currently viewing the particular hub (also referred to hereinafter as the "requested hub"), the requested hub, friends of the user whose user nodes 302 may or may not also be connected to the requested hub's concept node 304 with respective edges, other hubs having respective concept nodes 304 that are also connected to the requested hub's concept node 304, or any combination thereof. As an example and not by way of limitation, the recommended hubs displayed in recommendations section 510 may include hubs that are liked or otherwise connected (with edges 306 in social-graph database 206) to friends of the requesting user (as defined by edges 306 in social-graph database 206), and particularly friends that are also connected to the requested hub (with edges 306 in social-graph database 206). As another example, the recommended hubs displayed in recommendations section 510 may include hubs that users, and particularly friends of the requesting user (as defined by edges 306 in social-graph database 206), also like or are otherwise connected to (with edges 306 in social-graph database 206), but who aren't necessarily connected with the requested hub (with edges 306 in social-graph database 206). As yet another example, the recommended hubs displayed in recommendations section 510 may include hubs that are connected to the requested hub (with edges 306 in social-graph database 206) and one or more friends of the requesting user (as defined by edges 306 in social-graph database 206). As yet another example, the recommended hubs displayed in recommendations section 510 may include hubs that are connected to the requested hub (with edges 306 in social-graph database 206) but that aren't necessarily connected with friends of the requesting user (as defined by edges 306 in social-graph database 206).

In particular embodiments, social-networking system 20 may provide a means or process (e.g., selectable links or user interfaces) for the true voices of hubs corresponding to concept nodes 304 (or un-authenticated user-profile pages corresponding to un-authenticated user nodes 302b), such as the actual celebrity or business for which a concept node 304 has previously been created, to claim these concept nodes 304, thereby assuming administrative rights over them and redefining them in the social graph 300 as, for example, registered authenticated user nodes 302a (or, alternately, as authenticated concept nodes 304).

Typeahead Processes

Particular embodiments further relate to a method for automatically generating nodes and edges in a social graph 300 based on information currently being entered by a user of a social-networking system 20. In particular embodiments, one or more client-side and/or backend (server-side) processes implement and utilize a "typeahead" feature to automatically attempt to match concepts corresponding to respective existing concept nodes 304 to information currently being entered by a user in an input form rendered in conjunction with a requested webpage, such as a user-profile page, which may be hosted or accessible in, by the social-networking system 20. In particular embodiments, when a match is found, these or other processes may then automatically generate an edge from a user node 302 corresponding to the user to the existing concept node 304 corresponding to the concept match. Particular embodiments further relate to one or more processes that automatically create a new node and an edge from the new node to the user's node when a match to an existing concept and corresponding node is not found, or at least not found with a desired level of certainty. As an example and not by way of limitation, as will be described below, various webpages hosted or accessible in, the social-networking system 20 such as, for example, user-profile pages, enable users to add content, declare interests, or otherwise express themselves (hereinafter also referred to collectively as "declarations"), including by linking to, or otherwise referencing additional content, such as media content (e.g., photos, videos, music, text, etc.), uniform resource locators (URLs), an other nodes, via their respective profile pages or other concept-profile pages. Such declarations may then be viewable by the authoring users as well as other users. In particular embodiments, as a user is entering text to make a declaration, the typeahead feature attempts to match the string of textual characters being entered in the declaration to strings of characters (e.g., names) corresponding to existing concepts (or users) and corresponding concept (or user) nodes in the social graph 300. In particular embodiments, when a match is found, the typeahead feature may automatically populate the form with a reference to the node (such as, for example, the node name, node ID, or another suitable reference or identifier) of the existing node and, as just described, cause an edge 306 to be created between the matching existing node and the user node 302 associated with the user. In particular embodiments, as a user continues to enter text and the typeahead feature may determine that all or a portion of the declaration does not match any existing node, at least according to a statically or dynamically determined level of certainty, the typeahead feature may cause the social-networking system 20 to automatically create a new node based on the declaration entered by the user, as well as an edge from the user's node to the new node.

Particular embodiments further relate to a method for automatically generating nodes and edges based on information previously entered by users of a social-networking system 20. In particular embodiments, one or more backend (server-side) processes may implement and utilize a "bootstrapping" feature to automatically attempt to match known concepts indexed in a data store, each of which may or may not be associated with or correspond to a respective existing concept node 304 in the social graph 300, to information previously entered by a user in one or more of a variety of forms or formats and stored in the social-networking system 20. In particular embodiments, when a match to a known concept is found, these or other processes may then automatically generate an edge 306 from a node corresponding to the user (for which the previously entered information was matched) to an existing concept node 304 corresponding to the concept match. Particular embodiments further relate to one or more processes that, when a match to a known concept is found but where no concept node 304 currently exists for the known concept, automatically create a new concept node 304 for the known concept and an edge 306 from the new concept node 304 to the user node 302 associated with the user. Particular embodiments further relate to one or more processes that, when a match to a known concept or existing concept node 304 is not found, or at least not found with a desired level of certainty, automatically create a new concept node 304 based on the previously entered information and an edge 306 from the new concept node 304 to the user node 304 associated with the user. More information on automatically generating nodes and edges may be found in U.S. patent application Ser. No. 12/763,162, filed 19 Apr. 2010, which is incorporated by reference.

Particular embodiments further relate to a method for populating a concept database 216 using data obtained from one or more internal or external sources. In particular embodiments, the concept database 216 may include an index of known concepts as well as, in some embodiments, various attributes, metadata, or other information associated with the respective concepts. In particular embodiments, one or more backend (server-side) processes may crawl one or more external data sources (e.g., WIKIPEDIA (www.wikipedia.org), FREEBASE (www.freebase.com, available from METAWEB), or the internet in general) to facilitate or aid in generating or populating the concept database 216. In particular embodiments, the concept database 216 may also be augmented with information extracted from users of the social-networking system 20 described herein.

Particular embodiments further relate to a method for generating one or more recommendations for display to a user of a social-networking system 20 currently viewing a particular webpage or structured document hosted at least in part by the social-networking system 20. In particular embodiments, one or more server-side recommendation-generating processes 218 may generate the recommendations for display to the user in (on) the currently viewed page based at least in part on information extracted from a social graph 300. More particularly, the one or more server-side recommendation-generating processes 218 may leverage the social-graph information including information related to the user, the currently viewed page, friends of the user who are also connected in some fashion to the currently viewed page, and other webpages or structured documents connected in some fashion to the currently viewed page, to determine one or more other webpages or structured documents that the user may desire to connect to and then subsequently generate a list or set of these recommended pages for display in some fashion to the user in the currently viewed page.

In particular embodiments, as described in more herein, one or more terms in declarations entered in one or more of the previously described sections or sub-sections of a webpage of the online social network may be highlighted, rendered in a different color, underlined, or clickable. As an example and not by way of limitation, a term inputted by the user that matches to a node or edge of social graph 300 may be highlighted, rendered in a different color, underlined, or made clickable by the social-networking system 20 (either as the term is inputted by the user or after the term is inputted) to indicate that the term matches an element of the social graph 300. In particular embodiments, particular terms on a webpage may match to particular nodes and edges, and these terms may be associated with a hyperlink that, when clicked or otherwise selected, directs the user to a profile page associated with the node or edge. As an example and not by way of limitation, a known concepts or existing concept nodes 304 may be associated with a hyperlink that, when clicked, directs the user's web browser 202 to a concept-profile page corresponding to the concept node 304. In particular embodiments, a term may match to a node or edge when the term is identical or substantially similar to the name or identifier associated with the node or edge, or otherwise identifiable as being associated with the node or edge. As an example and not by way of limitation, clicking on a hyperlink corresponding to "Family Guy" in favorite TV shows section 414 may direct the user to a webpage (a concept-profile page/hub as described below) devoted to the Family Guy TV show.

In particular embodiments, as a user types or otherwise enters text into a form used to add content or make declarations in various sections of the user's profile page or other page, the frontend-typeahead process 204 may work in conjunction with one or more backend (server-side) typeahead processes 208 (hereinafter referred to simply as "backend-typeahead process 208") executing at (or within) the social-networking system 20 (e.g., within servers 22), to interactively and virtually instantaneously (as appearing to the user) attempt to auto-populate the form with a term or terms corresponding to names of existing hubs, or terms associated with existing hubs, determined to be the most relevant or best match to the characters of text entered by the user as the user enters the characters of text. Utilizing the social-graph information in social-graph database 206 or information extracted and indexed from social-graph database 206, including information associated with nodes as well as edges 306, the frontend and backend-typeahead processes 204 and 208, in conjunction with the information from social-graph database 206, as well as potentially in conjunction with various others processes, applications, or databases located within or executing within social-networking system 20, are able to predict a user's intended declaration with a high degree of precision. However, social-networking system 20 also provides user's with the freedom to enter any declaration they wish enabling users to express themselves freely. As such, social-networking system 20 enables the creation of new hubs and corresponding concept nodes 304 related to virtually any concept.

In particular embodiments, as a user enters text characters into a form box or other field, the frontend and backend-typeahead processes 204 and 208 may attempt to identify existing user nodes 302 or concept nodes 304 that match the string of characters entered in the user's declaration as the user is entering the characters. In particular embodiments, as the user enters characters into a form box, the frontend-typeahead process 204 may read the string of entered textual characters. As each keystroke is made, the frontend-typeahead process 204 may transmit the entered character string as a request (or call) to the backend-typeahead process 208 executing within social-networking system 20. In particular embodiments, the frontend and backend-typeahead processes 204 and 208 may communicate via AJAX (Asynchronous JavaScript and XML) or other suitable techniques, and particularly, asynchronous techniques. In one particular embodiment, the request is, or comprises, an XMLHTTPRequest (XHR) enabling quick and dynamic sending and fetching of results. In particular embodiments, the frontend-typeahead process 204 also transmits before, after, or with the request a section identifier (section ID) that identifies the particular section of the particular page in which the user is making the declaration. In particular embodiments, a user ID parameter may also be sent, but this may be unnecessary in some embodiments, as the user is already "known" based on he or she logging into social-networking system 20.

In particular embodiments, as the backend-typeahead process 208 receives requests or calls including a string of user-entered character data and section identifier, the backend process 208 may perform or causes to be performed (e.g., in conjunction with one or more other search processes executing at social-networking system 20) a string search to identify existing user nodes 302 or concept nodes 304 having respective names or other identifiers matching the entered text, and in particular embodiments, matching a particular category of nodes in social-graph database 206 as determined, at least in part, by the particular section identifier. The granularity of the categories may vary. As an example and not by way of limitation, hubs corresponding to actors, directors, producers, movie types or genres, may all be grouped in a "movie" category while. As another example and not by way of limitation, hubs corresponding to actors, directors, producers, movie types or genres, may each represent its own category. Similarly, in one example, hubs corresponding to football, basketball, soccer, rugby, and tennis may all be grouped in a "sports" category, while in another example each of these may represent its own category. In particular embodiments, the backend-typeahead process 208 may perform string matching. The backend-typeahead process 208 may attempt to match the latest string of characters received from the frontend-typeahead process 204 to an index of strings each corresponding to a name of a node in social-graph database 206. In particular embodiments, the index of strings is updated periodically or as user nodes 302 and concept nodes 304 are added to the social-graph database 206 or other index generated from social-graph database 206. The backend-typeahead process 208 may use one or more of a variety of factors when attempting to match the string of entered text and as such may examine one or more of a variety of different aspects or attributes of existing nodes in social-graph database 206. As an example and not by way of limitation, in addition to attempting to match the entered text to names (name strings) of existing nodes, the backend-typeahead process 208 may use the section identifier to determine a category of the declaration which may be then used to search a subset of existing concept nodes 304 associated with the category. In particular embodiments, backend-typeahead process 208 searches or queries an index of nodes generated from social-graph database 206 in which the nodes are indexed and searchable (or queryable) by hub category. The backend-typeahead process 208 may also use information about the user entering the text including information entered in the user's profile page, information about the users friends, information about other user nodes 302 or concept nodes 304 the user is connected with, etc. in order to best match a user declaration to an existing user or concept and respective its respective user node 302 or concept node 304. The backend-typeahead process 208 may also attempt to correct spellings or match to synonyms of the user-entered characters or extrapolations of entered characters.

Figure 4D:

In particular embodiments, the backend-typeahead process 208 may use one or more matching algorithms to attempt to identify matching nodes. In particular embodiments, when a match or matches are found, the backend-typeahead process 208 may transmit a response (which may utilize AJAX or other suitable techniques) to the user's client device 30 that may include, for example, the names (name strings) of the matching nodes as well as, potentially, other metadata associated with the matching nodes. As an example and not by way of limitation, FIG. 4D illustrates the result of the user entering the characters "wei" into form box 409 corresponding to activities section 408. In the example illustrated in FIG. 4D, the frontend-typeahead process 204 displays a drop-down menu 442 that displays names of matching existing profile pages and respective user nodes 302 or concept nodes 304 (e.g., a hub named or devoted to "weight lifting"), which the user can then click on or otherwise select thereby confirming the desire to declare the matched user or concept name corresponding to the selected node. As another example and not by way of limitation, upon clicking "weight lifting," the frontend-typeahead process 204 auto-populates, or causes the web browser 202 to auto-populate, the form box 409 with the declaration "weight lifting". In particular embodiments, the frontend-typeahead process 204 may simply auto-populate the form with the name or other identifier of the top-ranked match rather than display a drop-down menu. The user may then confirm the auto-populated declaration simply by keying "enter" on his or her keyboard or by clicking on the auto-populated declaration.

In particular embodiments, upon user confirmation of the matching node, the frontend-typeahead process 204 may transmit a request to the backend-typeahead process 208 that informs the backend-typeahead process of the user's confirmation of the matched profile page. In particular embodiments, in response to the request transmitted, the backend-typeahead process may automatically (or alternately based on an instruction in the request) call or otherwise instruct an edge-generating API (Application programming interface) 210 to create an edge 306 in the social graph 300 stored in social-graph database 206 between the particular user's node 302 and the particular user node 302 or concept node 304 corresponding to the confirmed declaration. In particular embodiments, the request transmitted may not be generated and transmitted by the frontend-typeahead process 204 until the user has selected the save changes (or other submit) button 444 indicating confirmation of the user's desire to make the declaration (or declarations made in any and all of the displayed form boxes).

In particular embodiments, the node types or categories of existing nodes as, for example, determined based, at least in part, on the section category as identified by the corresponding section identifier for the section in which the declaration was made (e.g., friends, favorite movies) or based on social-graph information stored in social-graph database 206, may be used by the backend-typeahead process 208 to better match a string of entered characters of a declaration to existing nodes that may be candidates for matching nodes. As an example and not by way of limitation, consider an example in which a user types "jaguar" into a user profile section. In such an example, the backend-typeahead process 208 may identify numerous existing nodes (and their associated profile pages) having corresponding names that at least include the name "jaguar," or a derivation thereof (e.g., "jaguars"). As an example and not by way of limitation, the backend-typeahead process 208 may identify a user node 302 associated with a user named "Victoria Jaguar." As another example and not by way of limitation, the backend-typeahead process 208 may identify a concept node 304 associated with the jungle cat jaguar. As yet another example, the backend-typeahead process 208 may identify a concept node 304 devoted to the JACKSONVILLE JAGUARS professional football team and still another concept node 304 devoted to the JAGUAR luxury and performance car-maker. In such cases, all of these user nodes 302 or concept nodes 304 may be matched by the backend-typeahead process 208 and hence, all of the node names may be transmitted in some embodiments, while in other embodiments, the backend-typeahead process 208 may only transmit one matching node name that is determined to be the most relevant based, for example and as described above, on using the section ID or other parameters extracted from the user's profile to determine a category in which the most relevant matching user node 302 or concept node 304 would be indexed in.

Additionally, in some embodiments, other factors may also be used to determine the strength or relevancy of the matching concept nodes 304 including, for example, the number of the user's friends having respective user nodes 302 connected with a matching concept node 304, the number of total users having respective user nodes 302 connected with a matching concept node 304, the number of other concept nodes 304 connected with the matching concept node 304, information obtained by analyzing other concept nodes 304 connected to both the user's node 302 and a matching concept node 304, or other concept nodes 304 connected to nodes 302 corresponding to friends of the user as well as to a matching concept node 304. Moreover, as described below, information characterizing the strength of the connections associated with the edges connecting any of these nodes may also be used to weight their relevancy in determining the most relevant matching concept nodes 304.

In particular embodiments, the backend-typeahead process 208 may make one or more determinations before the frontend-typeahead process 204 auto-populates a form box with names corresponding to matched profile pages and their respective user nodes 302 or concept nodes 304. First, considering the above example, in the case that a plurality of matches to existing nodes are identified, the backend-typeahead process 208 may then determine a confidence score for each of the matches that indicates an absolute or relative quality of each of the names of the matching nodes, the quality of the matching nodes themselves, or otherwise a level of confidence that the backend-typeahead process 208 has that the match is correct (the intended concept the user was entering or trying to enter). This determination may also result or involve a ranking of the matches (which may be reflected in the order of the matches displayed in the drop-down menu 442).

In particular embodiments, one or more factors may be used to determine a confidence score, probability, quality, or ranking of a matching node. As an example and not by way of limitation, such factors may again include, the number of the user's friends having respective user nodes 302 connected with a matching concept node 304, the number of total users having respective user nodes 302 connected with a matching concept node 304, the number of other concept nodes 304 connected with the matching concept node 304, information obtained by analyzing other concept nodes 304 connected to both the user's node 302 and a matching concept node 304, other concept nodes 304 connected to nodes 302 corresponding to friends of the user as well as to a matching concept node 304, other suitable factors, or any combination thereof. Other suitable factors may also include the number of sections on the corresponding candidate matching hub that are filled in, the relationship of content displayed on the hub corresponding to the matching concept node to the content, including other declarations, displayed on the user's profile page, etc. Again, as described below, information characterizing the strength of the connections associated with the edges 306 connecting any of these nodes may also be used to weight their relevancy in determining the most relevant matching concept nodes 304. Referring back to the "jaguar" example, the backend-typeahead process 208 may identify another declaration of the user that says "I love watching football," and as such, based on this identification (as well as other factors), the backend-typeahead process 208 may rank the node corresponding to the JACKSONVILLE JAGUARS professional football team as the best match and the frontend-typeahead process 204 may list the name of this node at the top of the drop-down menu or automatically auto-populate the form with the name.

In particular embodiments, the backend-typeahead process 208 may then make one or more second determinations before the frontend-typeahead process 204 auto-populates a form box with names corresponding to ranked matched nodes. As an example and not by way of limitation, based on the confidence scores, one or both of the frontend and backend-typeahead processes 204 and 208 may determine whether there is a determined level of probability, certainty, or confidence (a confidence score) for each match before the match is displayed to the user in the form of a drop-down menu for selection or auto-populated in the form box. That is, in particular embodiments, even though one or more matches have been identified from the existing nodes in the social-graph database 206, their respective certainties (in being the actual concept the user was intending to declare) as demonstrated by their determined confidence scores may be below a first predetermined threshold, and hence, none of the matches may be displayed to the user and be auto-populated by the frontend-typeahead process 204. That is, rather than display and provide the user with the match or matches having confidence scores below the threshold, the frontend-typeahead process 204 may allow the user to finish typing the declaration himself or herself, and then transmit the request. The backend process 208 may determine the best match corresponding to the user's declaration.

In particular embodiments, the determination of whether a match or matches have been found may be based on comparing respective confidence scores determined for the prospective matches with a second predetermined threshold below the first predetermined threshold described above. That is, the second predetermined threshold may be used when determining if a match is found while the first predetermined threshold may be used when determining if the match should be auto populated for display to the user.

In particular embodiments, if no suitable match is identified to a predetermined level of certainty (e.g., based on comparison of confidence scores with the second threshold), or the user abstains from selecting a provided or auto-populated match, then, as the user continues to enter characters of text in a declaration, the frontend-typeahead process 204 may wait until the user is finished entering the declaration as, for example, indicated by the user clicking or otherwise selecting the save changes button 444, before transmitting the character string, section identifier, or other information/data to backend-typeahead process 208.

In particular embodiments, the bootstrapping process 214 may scan data structure 24, including social-graph database 206, for text entered or otherwise associated with or stored with each user of social-networking system 20. As described herein, all of the information about or associated with a given user including that entered and displayed with the user's profile page may be stored with the user's node 302 in social-graph database 206. In particular embodiments, for each user (but also, in some embodiments, potentially each hub having a corresponding concept node 304), bootstrapping process 214 may identify all of the fields or objects associated with the user's node 302 that contain textual characters. Such fields may include any of sections 408, 410, 412, 414, 416, 418, 420, and 422 in the user's profile page as well as, in some embodiments, text in private messages sent between the user and other users, public messages posted in wall (feed) sections, status updates, captions below photos, etc.

In particular embodiments, for each field or object containing text, bootstrapping process 214 may perform some amount of pre-processing of the text. As an example and not by way of limitation, some or all the text in a given field may be considered a single character string. As another example and not by way of limitation, some or all of the text in a given field may be considered one or more n-grams. In particular embodiments, pre-processing of the character string may include applying a set of one or more heuristic rules to parse, separate, or delimit the character string into separate words, phrases, or n-grams associated with distinct node (i.e., user or hub/concept) candidates. More particularly, pre-processing may involve bootstrapping process 214 separating the character string in a given field by delimiters (e.g., commas, semicolons, carriage returns, etc.). As an example and not by way of limitation, the character string illustrated in section 408 of FIG. 4A may be delimited into four distinct concept or hub candidates, the first distinct hub candidate being "weight lifting," the second distinct hub candidate being "hiking," the third distinct hub candidate being "playing ping pong," and the fourth distinct hub candidate being "foosball." Pre-processing may additionally involve identifying synonyms of the word or words in each distinct hub candidate, identifying words that may be misspelled, identifying the potentially correct spellings, expanding phrases or adding words to phrases (e.g., words that may have been unintentionally left out or left our as a result of brevity), removing URLs, removing metadata, normalizing the word or words based on language (e.g., converting words from the language in which they were entered into the language typically used by the user, or converting words from the language in which they were entered into the language in which a best match for the hub candidate is likely to be found), and the like. As an example and not by way of limitation, consider that a user may have entered "Godfather I, II, III" in a favorite movies section 416. Bootstrapping process 214 may identify that the user has actually intended to indicated three movies: The Godfather part I, The Godfather part II, and The Godfather part III. In such a case, the bootstrapping process 214 may consider each movie as a separate hub candidate as though the user had explicitly typed out all three movie names.

In particular embodiments, each identified distinct node candidate (e.g., n-gram or string of characters) may then be matched to or compared with a list of known users nodes 302 or concept nodes 304 (or users and concept) using one or more of a variety of suitable string matching algorithms. In particular embodiments, the known users or concepts with which the node candidates are compared may be indexed in the form of a corresponding n-gram or strings of characters and stored in social-graph database 206 or concept database 216. Generally, concept database 216 may be an indexed repository of concept information that bootstrapping process 214 can query against for matching candidate hubs to known concepts. That is, in particular embodiments, it is desired to match each hub candidate with a single known concept. In particular embodiments, concept database 216 may be populated with known concepts by crawling one or more external information sources or data repositories (such as, for example, by crawling WIKIPEDIA (www.wikipedia.org) or FREEBASE (www.freebase.com)) and combining these crawling results with each other, as well as, potentially, information extracted from one or more internal information sources, including social-graph database 206. In particular embodiments, the concepts indexed and stored in concept database 216 don't necessarily have corresponding existing concept nodes 304 (or user nodes 302) in social-graph database 206. That is, concept database 216 may generally store an index of known concepts (each represented by corresponding character string), as well as information about these concepts (which may be crawled from an external data source such as those just described), but not all of these known concepts may have corresponding existing concept nodes 304 stored in social-graph database 206. In particular embodiments, concept database 216 may include social-graph database 206 or vice versa. In particular embodiments, to facilitate the matching of node candidates to known users or concepts indexed in social-graph database 206 or concept database 216, the index of known users or concepts may be organized into categories such as, by way of example and not by way of limitation, people, places, things, activities, sports, sports teams, celebrities, cities, locations, movies, books, restaurants, etc. The particular categories searched by bootstrapping process 214 may be determined by a section ID or other field identifier associated with where the node candidate was identified.

In particular embodiments, as a result of pre-processing, each node candidate may have associated with it, one or more n-grams or character strings that are each attempted to be matched with known users or concepts in social-graph database 206 or concept database 216. As an example and not by way of limitation, the delimited character string corresponding to the user's entered text may be matched as well as other character strings in which spelling changes, word additions, work removals, among other changes have been made. In particular embodiments, bootstrapping process 214 may then identify a "shortlist" of the best matching known users or concepts matching the node candidate. In particular embodiments, bootstrapping process 214 may then generate or determine a confidence score or value for each match in the shortlist (similarly to the confidence score described with reference to the typeahead processes above). As an example and not by way of limitation, the confidence score for each known user or concept may be based on one or more of the following: a determination of how well the text in the character string of the node candidate matched the text in the character string of each known user or concept, whether the spellings of any of the words in the node candidate n-gram or character string were changed to obtain the match, whether any characters or words were added or removed in the node candidate n-gram or character string to obtain the match, etc.

In particular embodiments, after a list of potential node candidates are identified, the list may be narrowed further by using other information known about the user. As an example and not by way of limitation, a user "A" may declares "Twilight, Harry Potter" in a favorite movies section 416 on the user's profile page. If bootstrapping process 214 could not unambiguously identify the movie corresponding to "Twilight," (e.g., because there are multiple movies with the word "twilight"), bootstrapping process 214 may use the fact that many other users who like "Harry Potter" also like the movie "Twilight: New Moon" (an unambiguous movie), and therefore determine that user "A" is referring to "Twilight: New Moon" (and therefore referring to the concept node 304 corresponding to this movie) with a sufficient degree of certainty when user "A" has typed "Twilight." Similarly, bootstrapping process 214 could use demographic information about the user. As an example and not by way of limitation, an older user may prefer the 1958 version of "Romeo and Juliet," whereas a younger user may be more likely to mean the newer version of "Romeo+Juliet" released in 1996.

In particular embodiments, bootstrapping process 214 may iteratively re-query the concept database 216 to find matches having the same confidence scores as the matches in the previously identified list of matches. Second, third, and additional rounds of matching may be performed in order to reduce or eliminate the possibility of false positives. As an example and not by way of limitation, rather than simply choose the match having the best confidence score, which may appear high thereby indicating a high level of confidence in the match, by performing the second round of matching, bootstrapping process 214 may find that there are numerous matching known users or concepts having the same confidence score, thereby signaling the reality that the quality of, or confidence in, the match is misleading and the match shouldn't be accepted.

In particular embodiments, bootstrapping process 214 may then determine whether a suitable match to a known user or concept exists for the given node candidate based on the results determined previously. If it is determined that a match exists in social-graph database 206 or concept database 216, bootstrapping process 214 may then determine whether or not an existing user node 302 or concept node 304 exists in social-graph database 206. Alternatively, bootstrapping process 214 may attempt to match a node candidate to an existing node in social-graph database 206 first before resorting to attempting to match the node candidate to known users or concepts not having corresponding existing nodes in social-graph database 206.

In particular embodiments, if it is determined that a match cannot be found for the n-gram or character string associated with the node candidate, at least according to a desired or predetermined level of probability or confidence, bootstrapping process 214 may then determine whether the node candidate is splittable; that is, whether the n-gram or character string can be split into separate node candidates. As an example and not by way of limitation, a match from a node candidate to a known user or concept may not be found for a variety of reasons, the simplest of which may be that the node candidate is too generic to identify a known user or concept with confidence, is a common name, is drastically misspelled or entered wrong, or is considered a "higher order" concept that, generally, involves a phrase and even two or more concepts. As an example and not by way of limitation, a user may have typed a declaration that, even after pre-processing, results in the higher order node candidate character string "all movies with Johnny Depp or Edward Norton." To facilitate this process, bootstrapping process 214 may keep a list of "connector words" such as "and" or "or," among others. In particular embodiments, if a confident match for a character string such as this can't be found, bootstrapping process 214 may make the determination as to whether the n-gram or character string corresponding to the node candidate is splittable. In particular embodiments, if it is determined that the n-gram or character string is splittable (e.g., bootstrapping process 214 identified connector words in the character string), then bootstrapping process 214 may split the n-gram or character string into one or more node candidates. For each of these split node candidates (e.g., "all movies with Johnny Depp" and "all movies with Edward Norton"), bootstrapping process 214 then proceeds as before.

In particular embodiments, bootstrapping process 214 may use a second list of "common phrase language" that it may use to determine if a node candidate is splittable or, more particularly, reducible. As an example and not by way of limitation, in the above example, the part of the character string that reads "all movies with" may be identified as common phrase language and removed, thereby resulting in the separate node candidates of simply "Johnny Depp" and "Edward Norton."

In particular embodiments, recommendation-generating process 218 may determine recommended profile pages for a particular user (the "requesting user") requesting or currently viewing a particular profile page (the "requesting page"), and further may cause references to the recommended profile pages to be displayed or listed in a recommendations section of the profile page (such as recommendations section 510 illustrated in FIG. 5A). In particular embodiments, recommendation-generating process 218 may determine recommended profile pages based information extracted from social-graph database 206, including information about one or more of: the requesting user, the requested profile page, friends of the user whose user nodes 302 may or may not also be connected to the requested profile page's node with respective edges, other profile pages having respective nodes that are also connected to the requested profile page's node, other suitable social-networking data, or any combination thereof. As an example and not by way of limitation, the recommended profile pages displayed in recommendations section 510 may include profile pages that are "liked," "friends," or otherwise connected (with edges in social-graph database 206) to friends of the requesting user (as defined by edges in social-graph database 206), and particularly friends that are also connected to the requested profile page (with edges in social-graph database 206). As another example and not by way of limitation, the recommended profile pages displayed in recommendations section 510 may include profile pages that users, and particularly friends of the requesting user (as defined by edges in social-graph database 206), also "like" or are otherwise connected to (with edges in social-graph database 206), but who aren't necessarily connected with the requested profile page (with edges in social-graph database 206). As yet another example and not by way of limitation, the recommended profile pages displayed in recommendations section 510 may include profile pages that are connected to the requested profile page (with edges in social-graph database 206) and one or more friends of the requesting user (as defined by edges in social-graph database 206). As yet another example and not by way of limitation, the recommended profile pages displayed in recommendations section 510 may include profile pages that are connected to the requested profile page (with edges in social-graph database 206) but that aren't necessarily connected with friends of the requesting user (as defined by edges in social-graph database 206). Generally, one goal or motivation for displaying recommended profile pages to the requesting user currently viewing or requesting a particular profile page is to provide the user with recommended profile pages the user may be interested in viewing or interacting with and, furthermore, facilitate navigation to such recommended profile pages from the currently viewed profile page and, in particular embodiments, to facilitate the creation of edges 306 connecting the user node 302 corresponding to the user to nodes corresponding to the recommended profile pages the user demonstrates or indicates an interest in.

In particular embodiments, the method may begin when social-networking system 20 receives a request for a particular profile page (the requested profile page) from a particular user (the requesting user). In particular embodiments, in response to the request, social-networking system 20, and particularly page-generating process 200, may generate a structured document for rendering the profile page at the requesting user's client device 30 and transmits an initial response that includes the structured document to the requesting user's client device 30. The structured document transmitted to the requesting user may be a base structured document that includes markup language code as well as various code segments, scripts, resources, or other information or content for serving the requested profile page to the client for rendering by the client's web browser 202. In particular embodiments, the base structured document may include code for rendering one or more portions of the requested profile page including code for displaying portions of the recommendations section 510, but may not include the recommended profile pages themselves in the form of profile page names or other identifiers 512 and images 514; that is, in one implementation, social-networking system 20 may transmit the structured document in the initial response before the recommended profile pages are determined by recommendation-generating process 218. In this way, the client's web browser 202 may start rendering the structured document and downloading resources for rendering the requested profile page as recommendation-generating process 218 completes it's determination of recommended profile pages.

In particular embodiments, in parallel with or after the generation of the base structured document or sending of the initial response, recommendation-generating process 218 may generate recommended profile pages that are then transmitted in one or more subsequent responses to the requesting user's client device 30 for rendering by the client's web browser 202. In particular embodiments, after the request for the profile page is received by social-networking system 20, page-generating process 200 or other process executing within social-networking system 20 may transmit an instruction or query to recommendation-generating process 218 requesting one or more recommended profile pages for display in recommendations section 510. In particular embodiments, the instruction or query may include information such as an identifier of the user (e.g., a user ID that identifies the requesting user's user node 302) and an identifier of the requested profile page (e.g., a profile page ID that identifies the requested profile page's user node 302 or concept node 304).

In particular embodiments, in response to the instruction or query, recommendation-generating process 218 may then determine or identify a first data set that includes profile pages that are each connected (via edges 306 in social-graph database 206) with one or more users or concept who are, in turn, each connected with both the requesting user (e.g., friends of the requesting user, concepts liked by the requesting user) and also connected with the requested profile page (e.g., users that also like the requested profile page, concepts liked by friends of the requesting user). In particular embodiments, in parallel with or after determining the first data set, recommendation-generating process 218 may determine a second data set that includes profile pages that are each connected both with the requested profile page (via edges 306 in social-graph database 206) and also connected with one or more users or concepts who, in turn, are connected (via edges 306 in social-graph database 206) to the requesting user (e.g., friends of the requesting user). Generally, the first and second data sets may include one or more of the same profile pages.

In particular embodiments, social-graph database 206 may include one or more queryable (searchable) indexes generated by indexing the data within social-graph database 206 (alternately, in another embodiment, the indexes may be stored in one or more data stores or databases outside of social-graph database 206). In particular embodiments, an indexing process 220 may generate or update the indexes periodically (e.g., hourly, daily, weekly). Additionally, or alternately, the indexes may be updated dynamically in response to the creation of new nodes or new edges in social-graph database 206 as well as in response to other actions (e.g., in response to interactions between users and profile pages or in response to edits made to user-profile pages or hubs). In particular embodiments, indexing process 220 may generate a plurality of indexes to facilitate the determinations. As an example and not by way of limitation, indexing process 220 may generate and maintain an index of all registered users that is indexed by user ID (e.g., the identifiers of the users and respective user nodes 302 in social-graph database 206) and which includes, for each user ID, the set of other users identified by their respective user IDs whose respective user nodes 302 are connected to the user node 302 corresponding to the particular user ID in the index. As another example and not by way of limitation, indexing process 220 may generate and maintain another index of all registered users that is again indexed by user ID but which includes, for each user ID, the set of hubs or respective concept nodes 304 identified by their respective profile page IDs (e.g. the identifiers of the profile pages and respective concept nodes 304 in social-graph database 206) that are connected to the user node 302 corresponding to the particular user ID in the index. As yet another example and not by way of limitation, indexing process 220 may generate and maintain another index of all the profile pages indexed by profile page ID and that includes, for each profile page ID, the set of other profile pages and respective concept nodes 304 identified by profile page ID that are connected to the concept node 304 corresponding to the particular profile page ID in the index. As yet another example and not by way of limitation, indexing process 220 may generate and maintain another index of all the profile pages indexed by profile page ID and that includes, for each profile page ID, the set of users and respective user nodes 302 identified by user ID that are connected to the concept node 304 corresponding to the particular profile page ID in the index.

In particular embodiments, recommendation-generating process 218 may determine the first and second data sets, respectively, by querying the indexes generated by indexing process 220. This may involve querying indexing process 220 itself or some other process that is configured to receive queries and return results based on searching one or more of the indexes. As an example and not by way of limitation, recommendation-generating process 218 may determine the first data set by sending a first nested query to indexing process 220 that, in a first part or step of the first nested query, instructs indexing process 220 to identify all the user IDs corresponding to users who are connected (e.g., friends) with the requesting user. In a second part of the nested query, indexing process 220 may be instructed to identify which of the user IDs identified in the first part correspond to users who are also connected with the requested profile page. In a third part of the first nested query, indexing process 220 may be instructed to return, to recommendation-generating process 218, the profile page IDs corresponding to the profile pages connected with the user IDs identified in the second part of the query (but in particular embodiments, excluding those profile page IDs corresponding to profile pages already connected to the requesting user) as well as the user IDs themselves matched with each of the profile page IDs. In a similar fashion, recommendation-generating process 218 may determine the second data set by sending a second nested query to indexing process 220 that instructs indexing process to determine all the profile page IDs corresponding to profile pages that are connected with the requested profile page and then return, to recommendation-generating process 218, the profile page IDs corresponding to the ones of the identified profile pages that are also connected with one or more users connected with the requesting user (but in particular embodiments, excluding those profile page IDs corresponding to profile pages already connected to the requesting user) as well as the user IDs themselves matched with each of the profile page IDs.

In particular embodiments, the profile page indexes generated by indexing process 220 may be indexed, arranged, or otherwise searchable by profile page category (e.g., user, group, association, movie, music, activity, sport, etc.). In particular embodiments, the profile pages returned in the first and second data sets may only include profile pages sharing the same category as the requested profile page. However, in particular embodiments, profile pages of different categories may be included in the returned data sets.

In particular embodiments, each of the first and second data sets may include a list or index of profile pages (e.g., identified by profile page ID) as well as, for each profile page, a set of users (e.g., identified by user ID) and/or concepts (e.g., identified by concept ID) connected with the respective profile page. Recommendation-generating process 218 may then generate a score for each profile page identified in the first and second data sets and subsequently rank the profile pages based on their respective scores to generate a single combined or correlated list of ranked profile pages that are candidates (hereinafter also referred to as "candidate pages") for recommended profile pages. In particular embodiments, recommendation-generating process 218 may score each profile page in each of the first and second data sets based at least in part on the number of users (i.e., the friends of the requesting user) or concepts (i.e., concepts liked by the requesting user or his friends) returned with the respective profile page in the first or second data sets.

In particular embodiments, recommendation-generating process 218 may score the profile pages in each of the first and second data sets and then combines the resulting scores. As an example and not by way of limitation, if a profile page in the first set is connected with five of the requesting user's friends, that profile page may be assigned a score or weight of five by recommendation-generating process 218. Similarly, if a profile page in the second set is connected with four of the requesting user's friends, that profile page may be assigned a score or weight of four by recommendation-generating process 218. In particular embodiments, recommendation-generating process may then generate a combined data set that includes all of the profile pages in each of the first and second data sets and combine or correlate the scoring results based on each of the first and second data sets to generate a single correlated score for each of the profile pages in the combined data set. The single correlated scores for the respective candidate pages may then be used in ranking the profile pages in the correlated ranked list of profile pages. In particular embodiments, the weights assigned to the profile pages in the first and second data sets are themselves weighted equally by recommendation-generating process 218. As an example and not by way of limitation, a profile page with a weight of five from the first data set may be assigned a score of five in the single correlated ranked list. Similarly, a profile page with a weight of four from the second data set may be assigned a score of four in the single correlated ranked list. Additionally, as the first and second data sets may share common profile pages, if a profile page returned in both of the first and second data sets was assigned a weight of six based on the first data set and assigned a weight of three based on the second data set, recommendation-generating process 218 may sum the individual weights and assign the profile page a score of nine in the single correlated ranked list (6+3=9). However, as the friends used to generate the weights may be shared in the first and second data sets, recommendation-generating process 218 may reduce the combined score to account for this. As an example and not by way of limitation, continuing the above example, assuming that a profile page found in both data sets also shares two friends in each data set, the resultant correlated score for the profile page may be calculated as seven (6+3−2=7). However, in particular embodiments, recommendation-generating process 218 may first combine the first and second data sets to generate one combined data set and then score each of the profile pages in the resultant combined data set. In this way, profile pages and associated users shared between the data sets may be accounted for, if desired, before generating a score for the profile page.

In particular embodiments, recommendation-generating process 218 may determine a score for each profile page in the combined data set based on factors other than simply the number of the requesting user's friends connected with the respective profile page. As an example and not by way of limitation, recommendation-generating process 218 may query indexing process 220 for one or more other data sets. As an example and not by way of limitation, recommendation-generating process 218 may determine a third data set that includes all the profile pages connected with the requested profile page, or all the profile pages that are connected with the requested profile page and not connected to any of the requesting user's friends. As another example and not by way of limitation, recommendation-generating process 218 may determine a fourth data set that includes all of the profile pages connected with the requesting user's friends, or all of the profile pages connected with the requesting user's friends but not connected to the requested profile page. These third or fourth data sets may be used in augmenting the data in the first and second data sets or to provide additional criteria (e.g., a global filter that indicates an overall popularity of each of the profile pages) with which to score the profile pages in the first and second data sets. Furthermore, the third and fourth data sets may be particularly useful in cases in which there are not any friends of the user that are connected with the requested profile page or in which none of the profile pages connected with the requested profile page are connected to any of the requesting user's friends.

In particular embodiments, recommendation-generating process 218 may weight the profile pages in such third or fourth data sets differently than the profile pages in the first and second data sets. As an example and not by way of limitation, each profile page in the third or fourth data sets are weighted according to the total number of user nodes 302 connected with the respective profile page's user node 302 or concept node 304. However, when combining the first, second, third, and fourth data sets and calculating a correlated score for each profile page in the combined data set, the number of total users connected with each profile page in the third and fourth data sets may account for a smaller contribution to the single correlated score. As an example and not by way of limitation, if "profile page A" is found in each of the first, second, third, and fourth data sets and is associated with 5 users in the first data set, 4 non-shared users in the second data set, 50 users in the third data set, and 75 users in the fourth data set, recommendation-generating process may calculate the correlated score for the profile page as 5a+4b+50c+75d where a, b, c, and d are the weights with which the respective number of users are multiplied by. As an example and not by way of limitation, in one implementation, a=1, b=1, c=0.01, and d=0.01 such that the correlated score for the profile page A is 5+4+0.5+0.75=10.25.

In particular embodiments, recommendation-generating process 218 may determine the single correlated score for each profile page in the first and second data sets (in some embodiments the profile pages in the third and fourth data sets that are not also in one or more of the first and second data sets are not scored) by summing or otherwise combining, for each profile page in the combined data set, a number of coefficient scores that are, in turn, generated for each profile page in the combined data set and each user connected with the respective profile page. In particular embodiments, a coefficient score in this sense refers to the strength of the connection (as defined or represented by an edge 306) or plurality of connections. The coefficient scores generated by recommendation-generating process 218 for a particular profile page and associated users may be based on various factors, such as, for example, the relationship of the user to the profile page; the relationship of the user to the requesting user (e.g., friend, relative, spouse, etc.); a level or frequency of interaction between the profile page and the user (e.g., how many times the user views the profile page or how much content was added to the profile page by the user over a period of time); a level or frequency of interaction between the user and the requesting user (e.g., how times the users viewed one another's profile pages or how many times the users posted comments, wall (feed) postings, sent messages, or otherwise interacted with one another's profile pages over a period of time); the number of user nodes 302, concept nodes 304, or total nodes connected to both the profile page and the user, or connected to both the user and the requesting user, or connected to both the profile page and the requested profile page, or connected to both the profile page and the requested user; the quantity or quality of shared content between the profile page and the requested profile page, other suitable factors, or any combination thereof. As an example and not by way of limitation, determining a single correlated score for each profile page in the combined data set may involve recommendation-generating process 218 generating one or more coefficient scores between each profile page in the combined data set and each of the requesting user's friends connected to the respective profile page, one or more coefficient scores between each profile page in the combined data set and the requesting user, one or more coefficient scores between each profile page in the combined data set and the requested profile page, or one or more coefficient scores between the requesting user and each of the users connected with a profile page from the combined data set. Determining a single correlated score for each profile page in the combined data set may additionally involve summing or otherwise combining each of the coefficient scores to generate the single correlated score for each profile page.

In particular embodiments, in order to calculate coefficient scores and subsequently single correlated scores for each of the profile pages in the combined data set, the data results returned in the first and second data sets (and in some embodiments the third and fourth data sets as well) may be first sent by recommendation-generating process (or directly from indexing process 220) to a data mining system such as, for example, HIVE (a data warehouse infrastructure built on top of HADOOP) where HADOOP then runs or executes a number of MapReduce jobs or processes on the data to generate the coefficient scores which are then used by recommendation-generating process 218 to generate the single correlated scores for each profile page.

In particular embodiments, recommendation-generating process 218 may rank the profile pages by their respective correlated scores and generates a ranked list of profile pages (e.g., a ranked list of profile page IDs) with the profile pages having the highest correlated scores representing the most relevant profile pages. In particular embodiments, recommendation-generating process 218 may then select the top x (e.g., four in the example illustrated in FIG. 5A) profile pages having the highest correlated scores as the recommended profile pages to be displayed in recommendations section 510.

In particular embodiments, recommendation-generating process 218 may then communicate the profile page IDs of the recommended profile pages to page-generating process 200 or other process that then generates code including, for example, HTML or other markup language code as well as, in some embodiments, various other code segments or resources including, for example, image resources for use in rendering the recommended profile page names 512 or images 514 in recommendations section 510, and in some embodiments, code segments for implementing hyperlinks that direct the user to a recommended profile page upon clicking or otherwise selecting a recommended profile page name text field 512 or profile page image 514. The code and resources may then be sent to the user's client device 30 in a subsequent response for rendering by the client's web browser 202. In particular embodiments, the subsequent response is sent using AJAX or other asynchronous techniques as the base structured document for rendering the requested profile page may have already been sent in an initial response. In particular embodiments, social-networking system 20 may wait for recommendation-generating process 218 to provide the profile page IDs of the recommended profile pages and includes the code or resources for displaying the recommended profile page names 512 or profile page images 514 with the rest of the structured document for rendering the profile page at the client device 30 prior to sending the structured document to the requesting user.

In particular embodiments, code for rendering node names (e.g., text) 516 or node images 518 (e.g., user-profile pictures, avatars, or concept-profile pictures) of a select subset of the users or nodes connected with each of the recommended profile pages and the requesting user is also sent with the subsequent response for rendering and display next to the respective recommended profile page in recommendations section 510. Additionally or alternately, the subsequent response sent may include code for displaying a text string for each of the recommended profile pages in proximity to the respective recommended profile page that reads, for example, "n of your friends also like this," where n is the number of the requesting user's friends that are connected to the respective recommended profile page or "these friends also like this," where "these friends" are represented by the node names 516 or node images 518 displayed next to the respective recommended profile page, or "n of your friends also like this including:".

In particular embodiments, wall (or news feed/activities feed) section 501a, or other feed or activities section of the profile page, may display comments, status updates, wall posts, or other user activities associated with the user and friends of the user that are viewing the profile page. The wall (or news feed/activities feed) section 501a, or other feed or activities section of the profile page may also display comments, status updates, wall posts, or other user activities and user generated content that are related to the concept for which the profile page was created as well as, in some embodiments, the users/concepts associated with the recommended profile pages determined for the currently requested or viewed profile page. Recommendation-generating process 218 may perform a search on comments, status updates, wall posts and other user-generated content and user activities associated with the requesting user and friends of the requesting user filtered by user or concept; that is, a keyword search for keywords related to the user or concept of the currently requested or viewed profile page (and potentially keywords related to the users or concepts associated with the recommended profile pages) in these streams of user feeds or activities related to the requesting user and the requesting user's friends, and display this subset of user content or activities in the wall or feed section of the currently requested or viewed profile page.

Structured Search Queries

In particular embodiments, a user of an online social network may search for information relating to a specific subject matter (e.g., users, concepts, external content or resource) by providing a short phrase describing the subject matter, often referred to as a "search query," to a search engine. The search engine may conduct a search based on the query phrase using various search algorithms and generate search results that identify resources or content (e.g., user-profile pages, content-profile pages, or external resources) that are most likely to be related to the search query. To conduct a search, a user may input or transmit a search query to the search engine. In response, the search engine may identify one or more resources that are likely to be related to the search query, which may collectively be referred to as a "search result" identified for the search query. The search results may be presented to the user, often in the form of a list of links on search-results webpage, each link being associated with a different webpage that contains some of the identified resources or content. In particular embodiments, each link in the search results may be in the form of a Uniform Resource Locator (URL) that specifies where the corresponding webpage is located and the mechanism for retrieving it. The user may then be able to click on the URL links to view the specific resources or contents contained in the corresponding webpages as he or she wishes. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are relatively more relevant to the search query or to the user may be ranked higher than the resources that are relatively less relevant to the search query or the user. In particular embodiments, the search engine may limit its search to resources and content on the online social network. However, in particular embodiments, the search engine may also search for resources or contents on other sources, such as web-application server 40, enterprise server 50, the internet or World Wide Web, or other suitable sources.

In particular embodiments, the typeahead processes described herein may be applied to search queries entered by a user. As an example and not by way of limitation, as a user enters text characters into the search field 450, the frontend-typeahead process 204 and/or the backend-typeahead processes 208 may attempt to identify existing user nodes 302, concept nodes 304, or edges 306 that match the string of characters entered search field 450 as the user is entering the characters. As the backend-typeahead process 208 receives requests or calls including a string or n-gram from the text query, the backend process 208 may perform or causes to be performed a search to identify existing social-graph elements (i.e., user nodes 302, concept nodes 304, edges 306) having respective names, types, categories, or other identifiers matching the entered text. The backend-typeahead process 208 may use one or more matching algorithms to attempt to identify matching nodes or edges. When a match or matches are found, the backend-typeahead process 208 may transmit a response to the user's client device 30 that may include, for example, the names (name strings) of the matching nodes as well as, potentially, other metadata associated with the matching nodes. The frontend-typeahead process 204 may then display a drop-down menu (such as, for example, drop-down menu 600 illustrated in FIGS. 6A-6R) that displays names of matching existing profile pages and respective user nodes 302 or concept nodes 304, and displays names of matching edges 306 that may connect to the matching user nodes 302 or concept nodes 304, which the user can then click on or otherwise select thereby confirming the desire to search for the matched user or concept name corresponding to the selected node, or to search for users or concepts connected to the matched users or concepts by the matching edges. Alternatively, the frontend-typeahead process 204 may simply auto-populate the form with the name or other identifier of the top-ranked match rather than display a drop-down menu. The user may then confirm the auto-populated declaration simply by keying "enter" on his or her keyboard or by clicking on the auto-populated declaration. Upon user confirmation of the matching nodes and edges, the frontend-typeahead process 204 may transmit a request to the backend-typeahead process 208 that informs the backend-typeahead process of the user's confirmation of a query containing the matching social-graph elements. In response to the request transmitted, the backend-typeahead process may automatically (or alternately based on an instruction in the request) call or otherwise instruct the social-networking system 20 to search the social-graph database 206 for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

Figure 6A:
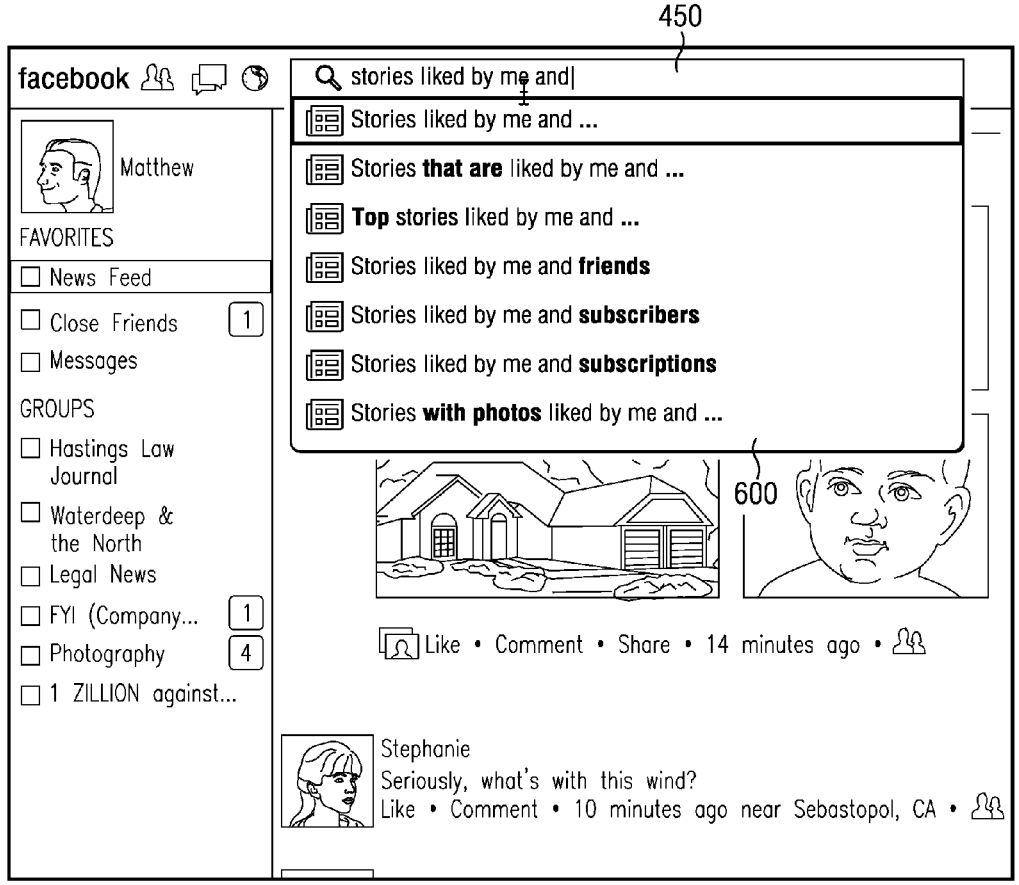
FIGS. 6A-6R illustrate example queries of the social network.
Figure 6B:
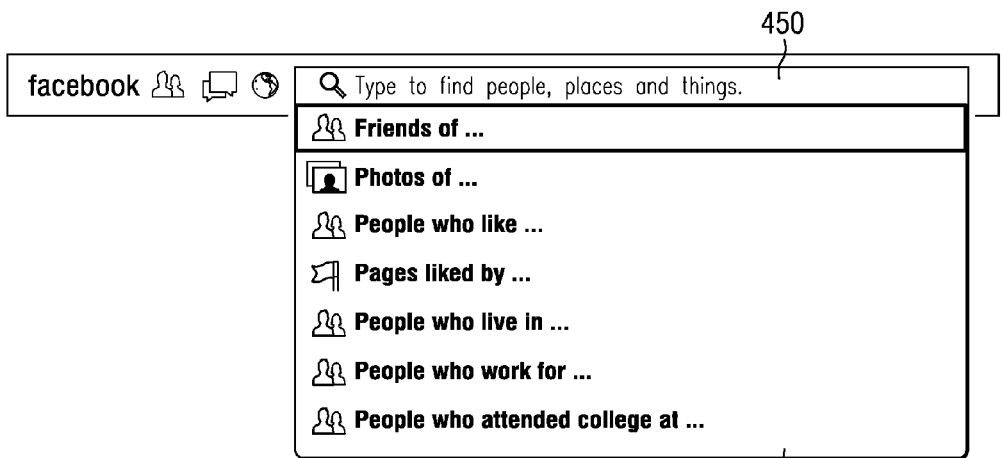
Figure 6C:
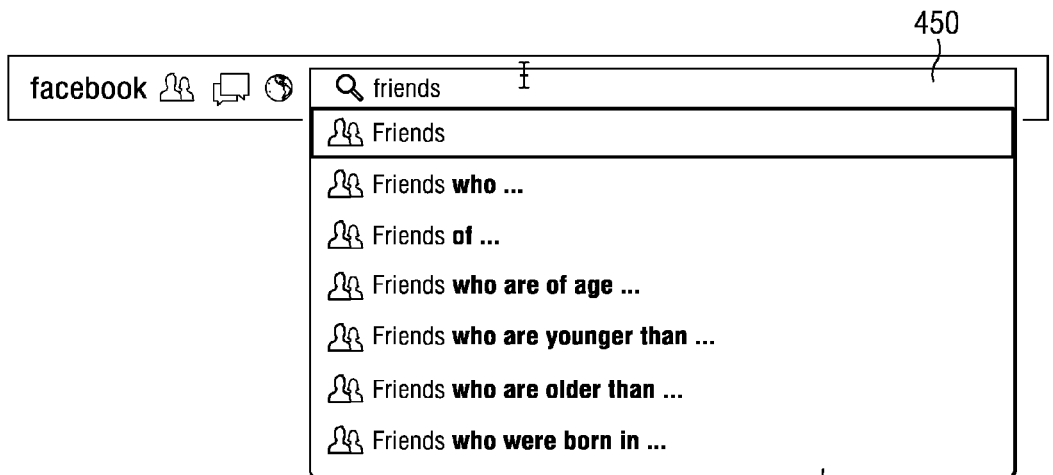
Figure 6D:
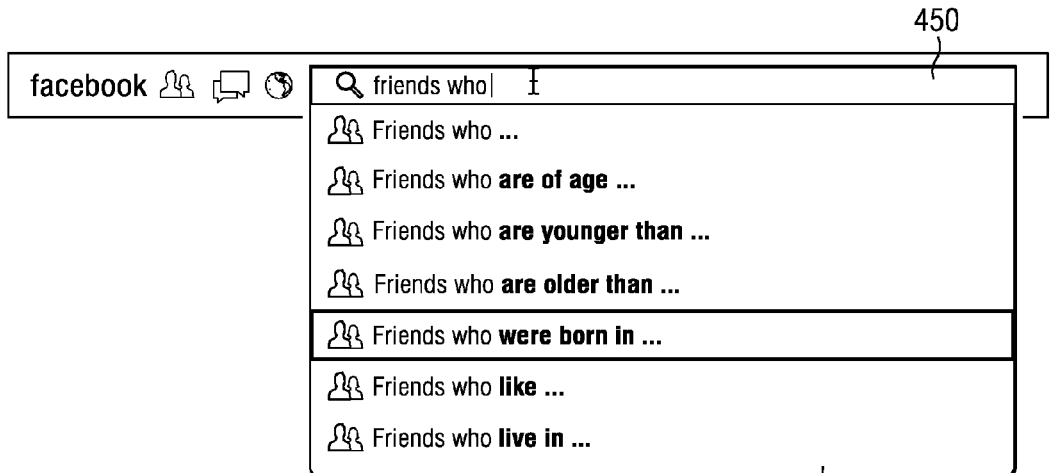
Figure 6E:
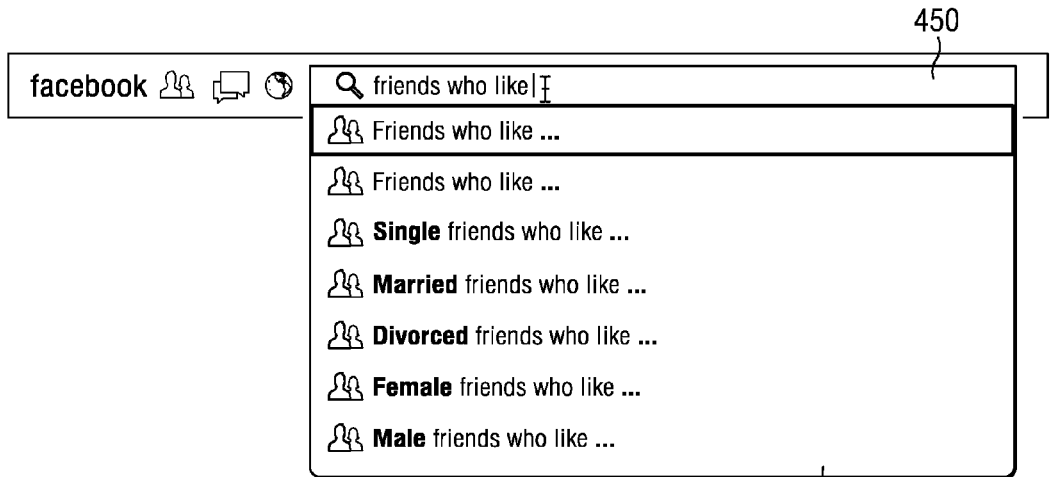
Figure 6F:
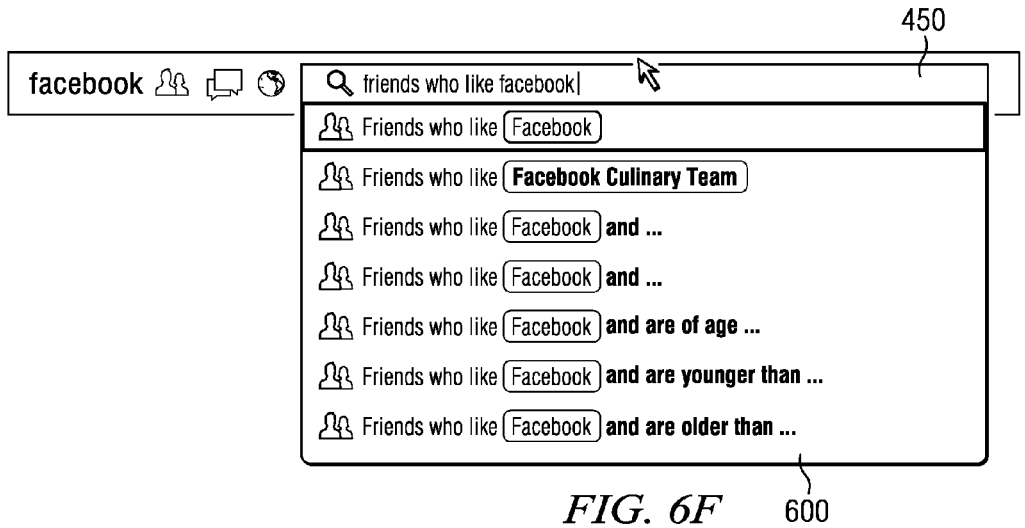
Figure 6G:
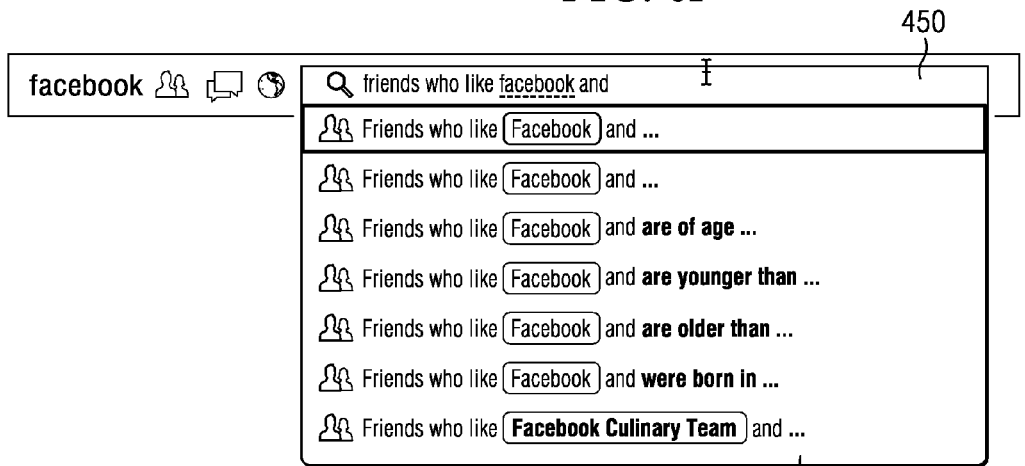
Figure 6H:
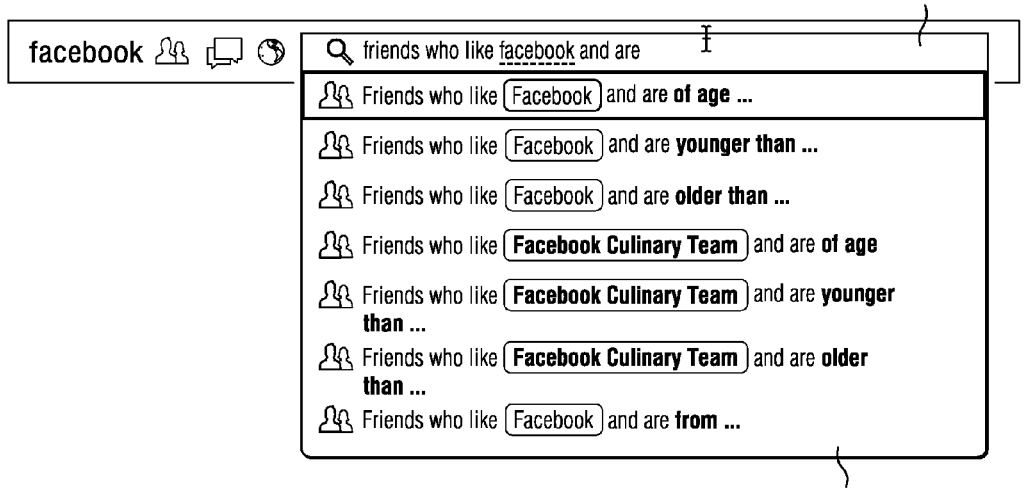
Figure 6I:
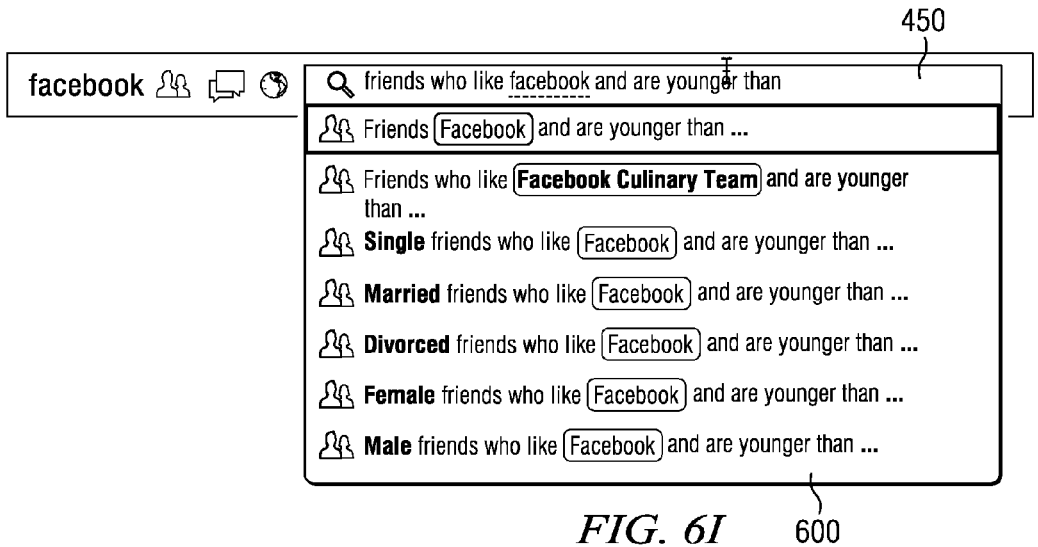
Figure 6J:
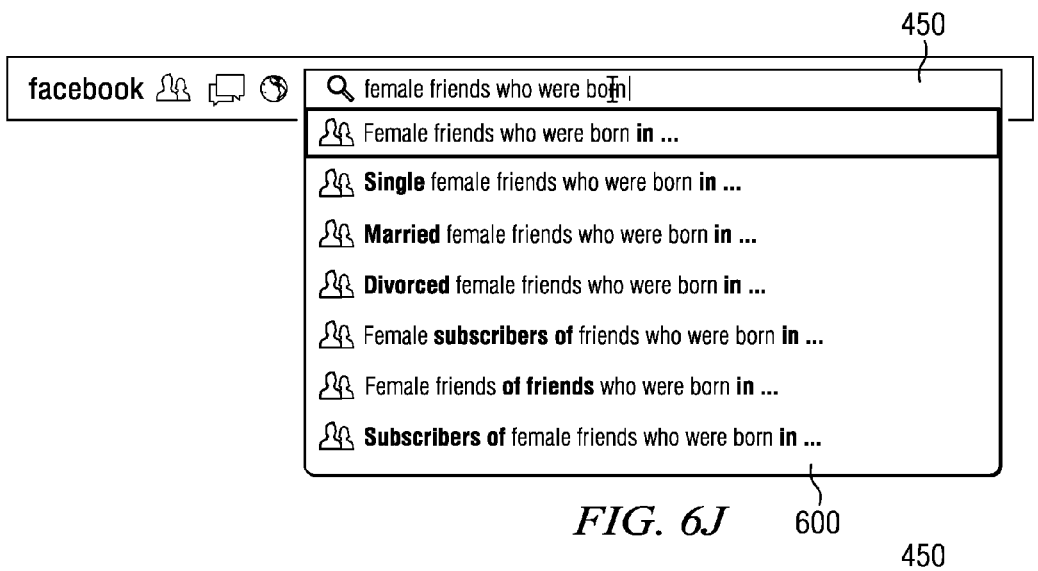
Figure 6K:
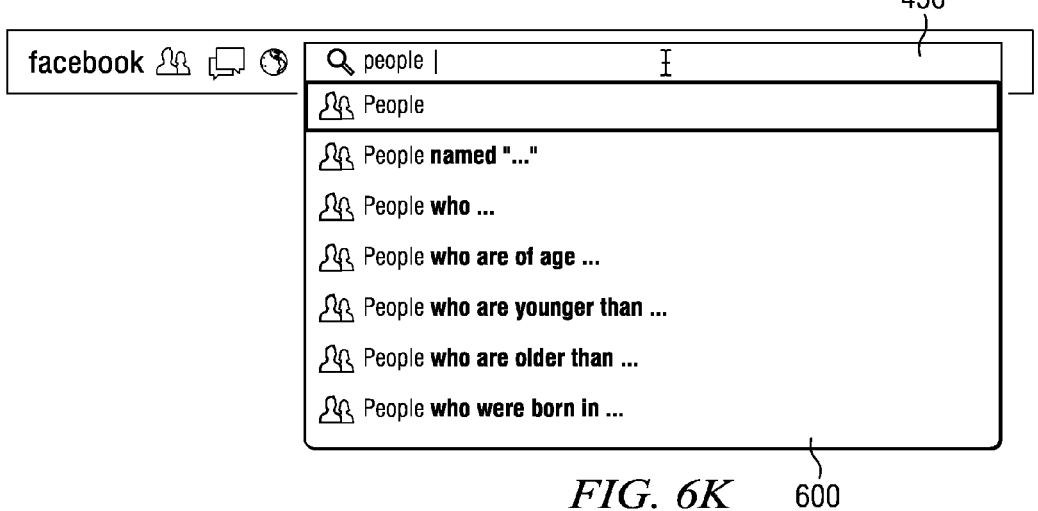
Figure 6L:
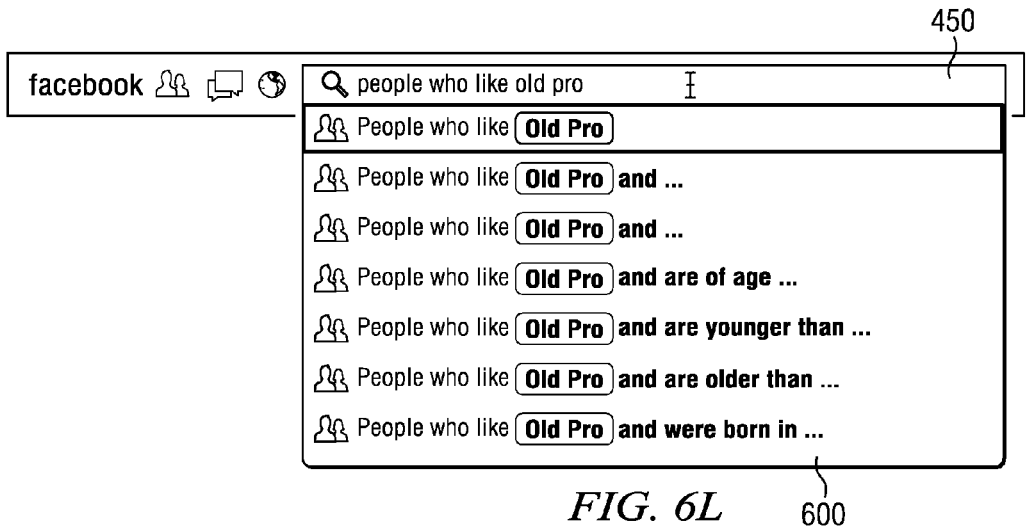
Figure 6M:
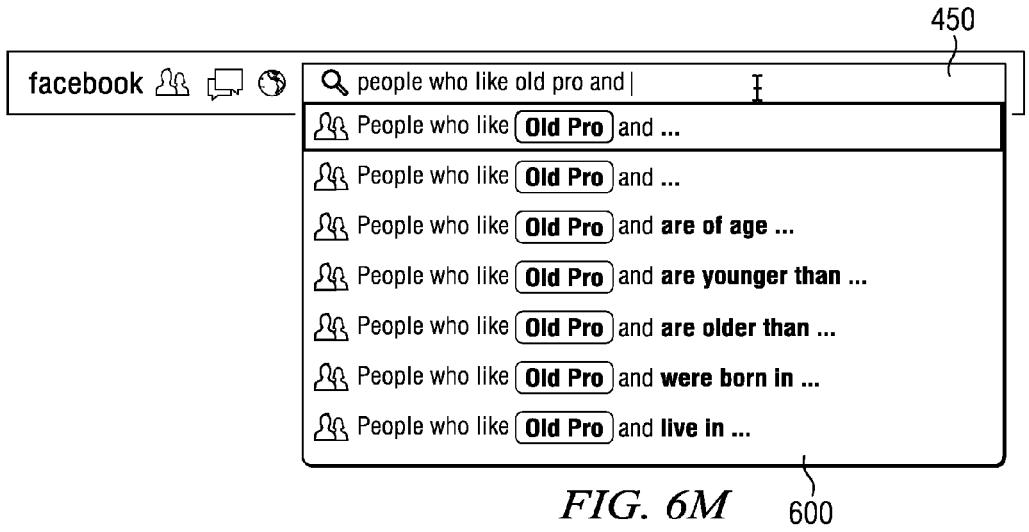
Figure 6N:
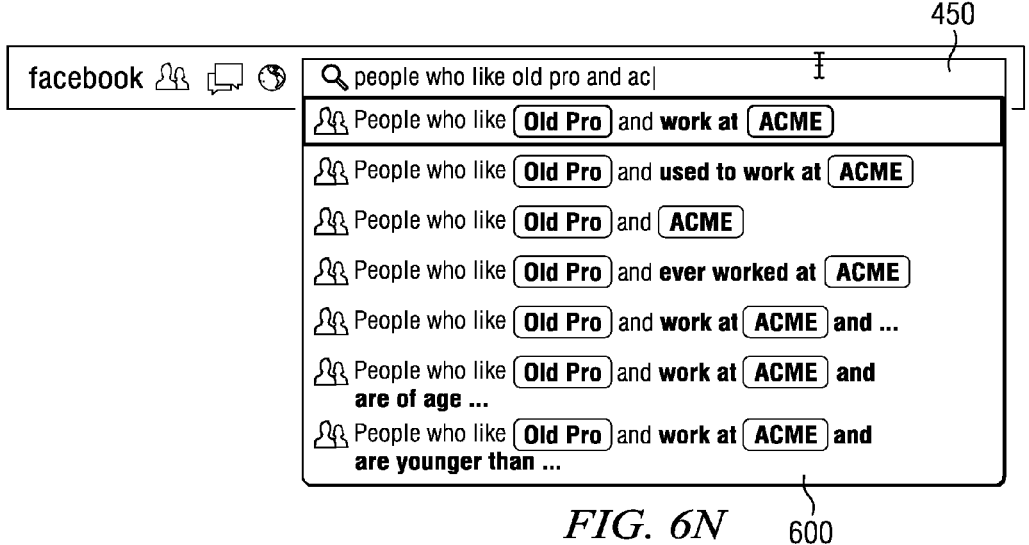
Figure 6O:
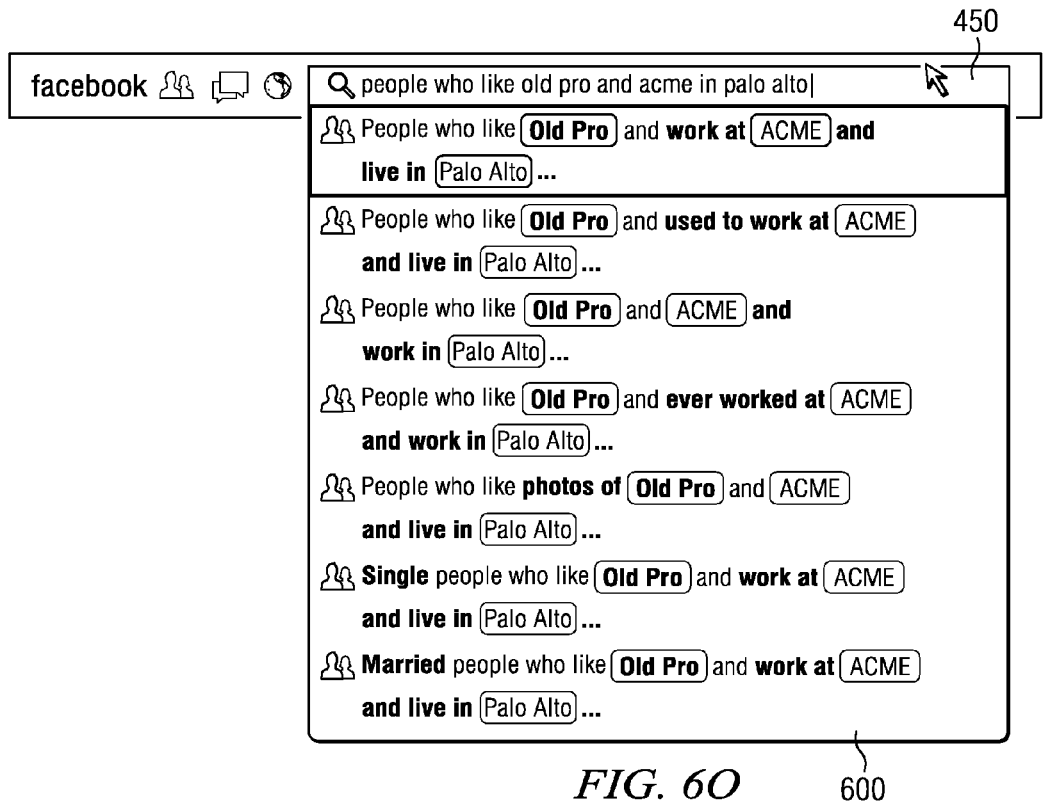
Figure 6P:
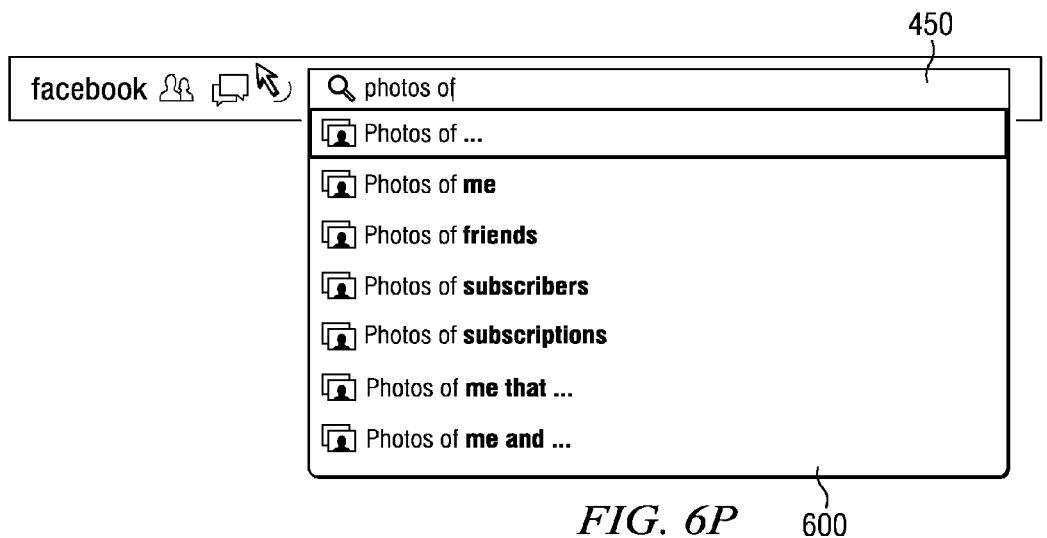
Figure 6Q:
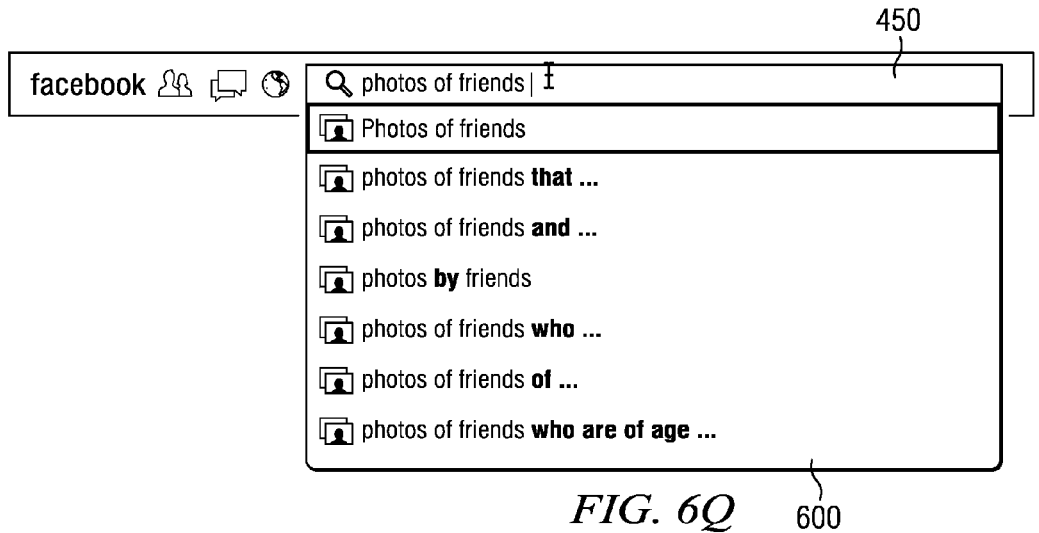
Figure 6R:
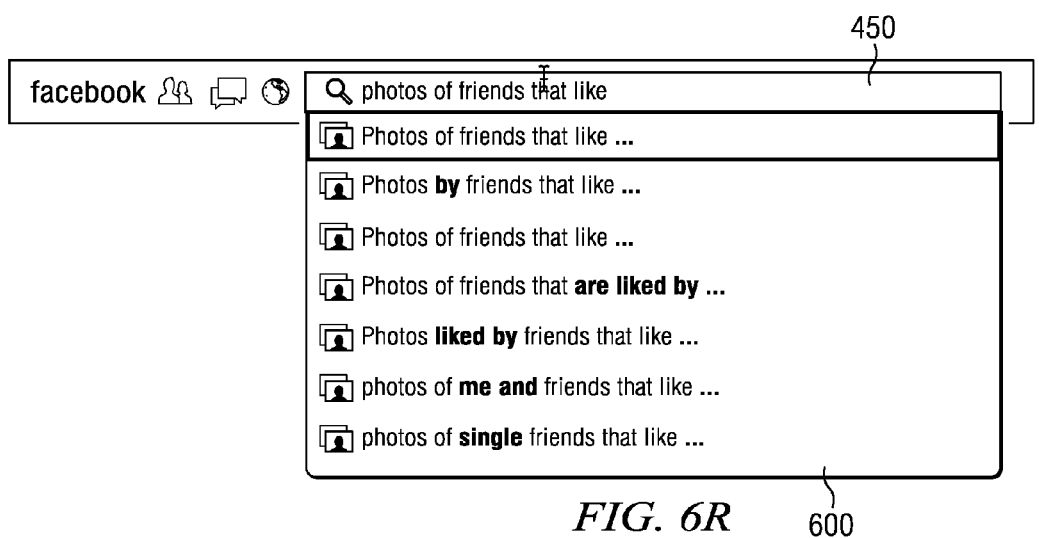

FIGS. 6A-6R illustrate example queries of the social network. In particular embodiments, the social-networking system 20 may generate one or more structured queries comprising references to one or more identified social-graph elements in response to a text query received from a first user (i.e., the querying user). FIGS. 6A-6R illustrate various example text queries in query fields 450 and various structured queries generated in response in drop-down menus 600. By providing suggested structured queries in response to a user's text query, the social-networking system 20 may provide a powerful way for users of the online social network to search for elements represented in the social graph 300 based on their social-graph attributes and their relation to various social-graph elements. Structured queries may allow a querying user to search for content that is connected to particular users or concepts in the social graph 300 by particular edge types. As an example and not by way of limitation, the social-networking system 20 may receive a substantially unstructured text query from a first user. In response, the social-networking system 20 (via, for example, a server-side element detection process) may access the social graph 300 and then parse the text query to identify social-graph elements that corresponding to n-grams from the text query. The social-networking system 20 may identify these corresponding social-graph elements by determining a probability for each n-gram that it corresponds to a particular social-graph element. Social-graph elements with a probability greater than a threshold probability may be identified and then referenced in one or more structured queries generated by the social-networking system 20. The structured queries may then be transmitted to the first user and displayed in a drop-down menu 100 (via, for example, a client-side typeahead process), where the first user can then select an appropriate query to search for the desired content. After the first user selects a particular structured query, the social-networking system 20 may process the query to identify target nodes corresponding to the query. These target nodes may then be filtered based on privacy settings associated with the nodes (via, for example, a server-side privacy-filter process), and the filtered results may then be transmitted to the first user as search results. Some of the advantages of using the structured queries described herein include finding users of the online social networking based upon limited information, bringing together virtual indexes of content from the online social network based on the relation of that content to various social-graph elements, or finding content related to you and/or your friends. Although this disclosure describes and FIGS. 6A-6R illustrate generating particular structured queries in a particular manner, this disclosure contemplates generating any suitable structured queries in any suitable manner.

Element Detection

In particular embodiments, social-networking system 20 may receive from a querying/first user (corresponding to a first user node 302) a substantially unstructured text query. As an example and not by way of limitation, a first user may want to search for other users who: (1) are first-degree friends of the first user; (2) "like" the company FACEBOOK (i.e., the user nodes 302 are connected by an edge 306 to the concept node 304 corresponding to the company FACEBOOK INC.); and (3) are younger than a certain age. The first user may then enter a text query "friends who like facebook and are younger than" into search field 450, as illustrated in FIGS. 6C-6I. As another example and not by way of limitation, the first user may want to search for other users who: (1) "like" the location "Old Pro"; (2) "like" the company "Acme; and (3) live in the city of Palo Alto. The first user may then enter a text query "people who like old pro and acme in palo alto" into search field 450, as illustrated in FIGS. 6K-6O. In both of the examples described above, as the first user enters this text query into search field 450, the social-networking system 20 may provide various suggested structured queries, as illustrated in drop-down menus 600. As used herein, a substantially unstructured text query refers to a simple text string inputted by a user. The text query may, of course, be structured with respect to standard language/grammar rules. However, the text query will ordinarily be unstructured with respect to social-graph elements. In other words, a simply text query will not ordinarily include embedded references to particular social-graph elements. Thus, as used herein, a structured query refers to a query that contains references to particular social-graph elements, allowing the search engine to search based on the identified elements. Although this disclosure describes receiving particular queries in a particular manner, this disclosure contemplates receiving any suitable queries in any suitable manner.

In particular embodiments, social-networking system 20 may parse the substantially unstructured text query (also simply referred to as a search query) received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. An n-gram of size one can be referred to as a "unigram," of size two can be referred to as a "bigram" or "digram," of size three can be referred to as a "trigram," and so on. Each n-gram may include one or more parts from the text query received from the querying user. In particular embodiments, each n-gram may comprise a character string (e.g., one or more characters of text) entered by the first user. As an example and not by way of limitation, the social-networking system 20 may parse the text query "friends in palo alto" to identify the following n-grams: friends; in; palo; alto; friends in; in palo; palo alto; friend in palo; in palo also; friends in palo alto. In particular embodiments, each n-gram may comprise a contiguous sequence of n items from the text query. As another example and not by way of limitation, the social-networking system 20 may parse the text query "friends who like facebook" (as illustrated in FIG. 6F) to identify the following n-grams: friends; who; like; facebook; friends who; who like; like facebook; friends who like; who like facebook. Although this disclosure describes parsing particular queries in a particular manner, this disclosure contemplates parsing any suitable queries in any suitable manner.

In particular embodiments, the social-networking system 20 may parse each text query and extract one or more n-grams that have been predetermined to correspond to particular social-graph elements. Note that not every word in a search query may represent a predetermined element. Particular embodiments may ignore those n-grams that do not represent any predetermined query elements. As an example and not by way of limitation, the social-networking system 20 may receive a search query containing "friends who like facebook," as illustrated in FIG. 6F. The unigram "friends" may have been predetermined to correspond to any "friend" edges 306 connecting the querying user to his first-degree friends (i.e., other user nodes 302 within one-degree of separation of the user node 302 corresponding to the querying user) in the social graph 300. Similarly, the n-gram "like" may have been predetermined to correspond to any "like" edges 306 connecting to concept nodes 304 in the social graph 300. Finally, the n-gram "facebook" may have been predetermined to correspond to the concept node 304 for the company FACEBOOK INC. As another example and not by way of limitation, if the social-networking system 20 received a search query containing "Doctor Yeites Ziltzer," there may not be a predetermined elements for a title or a position. Thus, the unigram "doctor" may not represent any social-graph element (though it may represent an attribute or property of a particular social-graph element, and be searchable on that basis). On the other hand, there may be a predetermined element for a person's name. Thus, the n-gram "Yeites Ziltzer," may represent a query element corresponding to a particular user node 302 for a user named Yeites Ziltzer. An n-gram that does not represent any predetermined element may be marked as representing null element or otherwise not corresponding to a particular social-graph element. Although this disclosure describes parsing particular search queries in a particular manner, this disclosure contemplates parsing any suitable search queries in any suitable manner.

In particular embodiments, social-networking system 20 may determine or calculate, for each n-gram identified in the text query, a score that the n-gram corresponds to a social-graph element. The score may be, for example, a confidence score, a probability, a quality, a ranking, another suitable type of score, or any combination thereof. As an example and not by way of limitation, the social-networking system 20 may determine a probability score (also referred to simply as a "probability") that the n-gram corresponds to a social-graph element, such as a user node 302, a concept node 304, or an edge 306 of social graph 300. The probability score may indicate the level of similarity or relevance between the n-gram and a particular social-graph element. There may be many different ways to calculate the probability. The present disclosure contemplates any suitable method to calculate a probability score for an n-gram identified in a search query. In particular embodiments, the social-networking system 20 may determine a probability, p, that an n-gram corresponds to a particular social-graph element. The probability, p, may be calculated as the probability of corresponding to a particular social-graph element, k, given a particular search query, X. In other words, the probability may be calculated as $p=(k|X)$. As an example and not by way of limitation, a probability that an n-gram corresponds to a social-graph element may calculated as an probability score denoted as $p_{i,j,k}$. The input may be a text query $X=(x_1, x_2, \ldots, x_N)$, and a set of classes. For each (i:j) and a class k, the social-networking system 20 may compute $p_{i,j,k}=p(\text{class}(x_{i,j})=k|X)$. In particular embodiments, the social-networking system 20 may determine the probability that a particular n-gram corresponds to a social-graph element based on a language model. Any suitable probabilistic language model may be used to determine the probability that a particular n-gram corresponds to a particular social-graph element. As an example and not by way of limitation, the social-networking system 20 may use an n-gram model, a segmental Markov model, a grammar-language model, another suitable probabilistic language model, or any combination thereof. In particular embodiments, the social-networking system 20 may user a forward-backward algorithm to determine the probability that a particular n-gram corresponds to a particular social-graph element. For a given n-gram within a text query, the social-networking system 20 may use both the preceding and succeeding n-grams to determine which particular social-graph elements correspond to the given n-gram. In particular embodiments, the social-networking system 20 may determine the probability that a particular n-gram corresponds to a social-graph element based on advertising sponsorship. An advertiser (such as, for example, the user or administrator of a particular profile page corresponding to a particular node) may sponsor a particular node such that the node is given a higher probability when determining whether is corresponds to particular n-grams, or may even be identified as corresponding to particular n-grams regardless of the determined probability. As an example and not by way of limitation, the n-gram "smart phone" may correspond to a concept node 304 for "iPhone" (which is a type of smart phone) and may also correspond to a concept node for "Android" (which is another type of smart phone). If one of these concept nodes 304 is sponsored by an advertiser, then the social-networking system 20 may determine a higher probability of the n-gram corresponding to the "smart phone" n-gram. Although this disclosure describes determining whether n-grams correspond to social-graph elements in a particular manner, this disclosure contemplates determining whether n-grams correspond to social-graph elements in any suitable manner. Moreover, although this disclosure describes determining whether an n-gram corresponds to a social-graph element using a particular type of score, this disclosure contemplates determining whether an n-gram corresponds to a social-graph element using any suitable type of score.

In particular embodiments, the social-networking system 20 may determine the probability that a particular n-gram corresponds to a social-graph element based social-graph information. As an example and not by way of limitation, when determining a probability, p, that an n-gram corresponds to a particular social-graph element, the calculation of the probability may also factor in social-graph information. Thus, the probability of corresponding to a particular social-graph element, k, given a particular search query, X, and social-graph information, G, may be calculated as $p=(k|X,G)$. In particular embodiments, the probability that an n-gram corresponds to a particular node may be based on the degree of separation between the first user node 302 and the particular node. A particular n-gram may have a higher probability of corresponding to a social-graph element that is closer in the social graph 300 to the querying user (i.e., fewer degrees of separation between the element and the first user node 302) than a social-graph element that is further from the user (i.e., more degrees of separation). As an example and not by way of limitation, referencing FIG. 3, if user "B" inputs a text query of "chicken," the calculated probability that this corresponds to the concept node 304 for the recipe "Chicken Parmesan," which is connected to user "B" by an edge 306, may be higher than the calculated probability that this n-gram corresponds to other nodes associated with the n-gram chicken (e.g., concept nodes 304 corresponding to "chicken nuggets," or "funky chicken dance") that are not connected to user "B" in the social graph 300. In particular embodiments, the social-networking system 20 may only determine the probability that a particular n-gram corresponds to node within a threshold degree of separation of the user node 302 corresponding to the first user (i.e., the querying user). Thus, nodes beyond the threshold degree of separation may be assigned a zero or null probability of corresponding to the n-gram. Alternatively, when resolving queries, the social-networking system 20 may only access nodes within the threshold degree of separation and only determine probabilities for those nodes. The threshold degree of separation may be, for example, one, two, three, or all. In particular embodiments, the probability that an n-gram corresponds to a particular node may be based on the identified edges 306 connected to the particular node. If the social-networking system 20 has already identified one or more edges that correspond to n-grams in a received text query, those identified edges may then be considered when determining whether particular nodes correspond to particular n-grams in the text query. Nodes that are not connected to any of the identified edges may be assigned a zero or null probability of corresponding to the n-gram. As an example and not by way of limitation, if a user searches for "friends who have played poker," the social-networking system 20 may identify that the n-gram "have played" corresponds to "played" edges 306 in the social-graph 300, and then search for nodes connected to one or more "played" edges 306. Continuing with this example, the social-graph 300 may contain a concept node 304 corresponding to the application "online poker," as illustrated in FIG. 3, which can be played online by users of the online social network (thus forming a "played" edge), and may also contain a concept node 304 corresponding to the book "Poker for Dummies," which can be "read" or "liked" by users of the online social network (such as, for example, by indicating as much on the concept-profile page corresponding to the book). When determining the probability that either of these nodes corresponds to the n-gram "poker," the social-networking system 20 may determine that the concept node 304 for "online poker" has relatively high probability of corresponding to the n-gram "poker" because it is connected to a "played" edge 306, while a concept node 304 for "Poker for Dummies" has a relatively low probability of corresponding to the n-gram "poker" because it is not connected to any "played" edges 306. In particular embodiments, the probability that an n-gram corresponds to a particular node may be based on the number of edges 306 connected to the particular node. Nodes with more connecting edges 306 may be more popular and more likely to be a target of a search query. As an example and not by way of limitation, continuing with the prior example, if the concept node 304 for "online poker" is only connected by five edges while the concept node 304 for "Poker for Dummies" is connected by five-thousand edges, when determining the probability that the n-gram "poker" corresponds to either of these nodes, the social-networking system 20 may determine that the concept node 304 for "Poker for Dummies" has a relatively higher probability of corresponding to the n-gram "poker" because of the greater number of edges connected to that concept node 304. In particular embodiments, the probability that an n-gram corresponds to a particular node may be based on the search history associate with the first user (i.e., the querying user). Nodes that the first user has previously accessed, or are relevant to the nodes the first user has previously accessed, may be more likely to be the target of the first user's search query. As an example and not by way of limitation, continuing with the prior example, if first user has previously visited "online poker" profile page but has never visited the "Poker for Dummies" profile page, when determining the probability that the n-gram "poker" corresponds to either of the nodes corresponding to these pages, the social-networking system 20 may determine that the concept node 304 for "online poker" has a relatively higher probability of corresponding to the n-gram "poker" because the querying user has previously accessed that concept node 304 (and may in fact already be connected to that node with a "viewed" edge 306). As another example and not by way of limitation, if the first user has previously visited the concept-profile page for the "Facebook Culinary Team," when determining the probability that the n-gram "facebook" corresponds to a particular social-graph element, the social-networking system 20 may determine that the concept node 304 corresponding to the "Facebook Culinary Team" has a relatively high probability because the querying user has previously accessed the concept node 304. Although this disclosure describes determining whether n-grams correspond to social-graph elements in a particular manner, this disclosure contemplates determining whether n-grams correspond to social-graph elements in any suitable manner.

In particular embodiments, the social-networking system 20 may determine the probability that a particular n-gram corresponds to a social-graph element based on the relevance of the social-graph element to the querying user (i.e., the first user, corresponding to a first user node 302). User nodes 302 and concept nodes 304 that are connected to the first user node 302 directly by an edge 306 may be considered relevant to the first user. As an example and not by way of limitation, a concept node 304 connected by an edge 306 to a first user node 302 may be considered relevant to the first user node 302. As used herein, when referencing a social graph 300 the term "connected" means a path exists within the social graph 300 between two nodes, wherein the path may comprise one or more edges 306 and zero or more intermediary nodes. In particular embodiments, nodes that are connected to the first user node 302 via one or more intervening nodes (and therefore two or more edges 306) may also be considered relevant to the first user. Furthermore, in particular embodiments, the closer the second node is to the first user node, the more relevant the second node may be considered to the first user node. That is, the fewer edges 306 separating the first user node 302 from a particular user node 302 or concept node 304 (i.e., the fewer degrees of separation), the more relevant that user node 302 or concept node 304 may be considered to the first user. As an example and not by way of limitation, as illustrated in FIG. 3, the concept node 304 corresponding to the location "Old Pro" is connected to the user node 302 corresponding to User "B," and thus the concept "Old Pro" may be considered relevant to User "B." As another example and not by way of limitation, the concept node 304 corresponding to "SPOTIFY" is connected to the user node 302 corresponding to User "B" via one intermediate node and two edges 306 (i.e., the intermediated user node 302 corresponding to User "C"), and thus the concept "SPOTIFY" may be considered relevant to User "B," but because the concept node 304 for "SPOTIFY" is a second-degree connection with respect to User "B," that particular concept node 304 may be considered less relevant than a concept node 304 that is connected to the user node for User "B" by a single edge 306, such as, for example, the concept node 304 corresponding to the movie "Shawshank Redemption." As yet another example and not by way of limitation, the concept node for "Online Poker" (which is an online multiplayer game) is not connected to the user node for User "B" by any pathway in social graph 300, and thus the concept "Online Poker" may not be considered relevant to User "B." In particular embodiments, a second node may only be considered relevant to the first user if the second node is within a threshold degree of separation of the first user node 302. As an example and not by way of limitation, if the threshold degree of separation is three, then the user node 302 corresponding to User "D" may be considered relevant to the concept node 304 corresponding to the recipe "Chicken Parmesan," which are within three degrees of each other on social graph 300 illustrated in FIG. 3. However, continuing with this example, the concept node 304 corresponding to the application "All About Recipes" would not be considered relevant to the user node 302 corresponding to User "D" because these nodes are four degrees apart in the social graph 300. Although this disclosure describes determining whether particular nodes are relevant to each other in a particular manner, this disclosure contemplates determining whether any suitable nodes are relevant to each other in any suitable manner. Moreover, although this disclosure describes determining whether user nodes 302 and concept nodes 304 are relevant to a first user nodes 302, this disclosure contemplates similarly determining whether any particular node is relevant to any other particular node. As an example and not by way of limitation, social graph 300 may be used to determine which concept nodes 304 are relevant to other concept nodes 304.

In particular embodiments, the social-networking system 20 may place one or more constraints when determining whether an n-gram corresponds to a particular social-graph element. As an example and not by way of limitation, the social-networking system 20 may only identify user nodes 302 where the name of the user corresponding to the user node 302 exactly matches a text query. In general, a search query containing a person's name typically should have an exact match in a particular user-profile page for that particular user-profile page to be considered to contain the person's name (after accounting for name variations, such as nicknames, short names, diminutives, etc.). This may be represented as a proximity constraint where the n-gram representing a person's name in the search query should locate next to each other in a user-profile page and in the same order as they appear in the search query in order for the user-profile page to be considered to contain the person's name. Thus, with respect to query words "Colin Lee Baker" that represent the name of a user of the online social network, the user-profile page illustrated in FIG. 4A contains the user's name, while other user-profile pages associated with other users would not (assuming there are no other users or concepts named Colin Lee Baker). Other user-profile pages may contain all three words of the search query (for example, a person named Colin Lee who works as a baker), but those words may not necessarily appear in the same order as they appear in the search query. Thus, other user-profile pages containing the same words would not satisfy the proximity constraint required for the query words representing a query for a user node 302. In this case, the search engine may only reference user nodes 302 where the corresponding user-profile pages include the words "Colin Lee Baker" in that order. Although this discloses describes placing particular constraints on determining whether particular n-grams correspond to particular social-graph elements, this disclosure contemplates placing any suitable constraints on determining whether any suitable n-grams correspond to any suitable social-graph elements.

In particular embodiments, social-networking system 20 may identify one or more edges 306 having a probability greater than an edge-threshold probability. Each of the identified edges 306 may correspond to at least one of the n-grams. As an example and not by way of limitation, the n-gram may only be identified as corresponding to an edge k if $P_{i,j,k} > P_{edge-threshold}$. Furthermore, each of the identified edges 306 may be connected to at least one of the identified nodes (described below). In other words, the social-networking system 20 may only identify edges 306 or edge-types that are connected to user nodes 302 or concept nodes 304 that have previously been identified as corresponding to a particular n-gram. Edges 306 or edge-types that are not connected to any previously identified node are typically unlikely to correspond to a particular n-gram in a search query. By filtering out or ignoring these edges 306 and edge-types, the social-networking system 20 may more efficiently search the social graph for relevant social-graph elements. As an example and not by way of limitation, referencing FIG. 3, for a text query containing "went to Stanford," where an identified concept node 304 is the school "Stanford," the social-networking system 20 may identify the edges 306 corresponding to "worked at" and the edges 306 corresponding to "attended," both of which are connected to the concept node 304 for "Stanford." Thus, the n-gram "went to" may be identified as corresponding to these edges 306. However, for the same text query, the social-networking system 20 may not identify the edges 306 corresponding to "like" or "fan" in the social graph 300 because the "Stanford" node does not have any such edges connected to it.]. Although this disclosure describes identifying edges 306 that corresponding to n-grams in a particular manner, this disclosure contemplates identifying edges 306 that corresponding to n-grams in any suitable manner.

In particular embodiments, social-networking system 20 may identify one or more user nodes 302 or concept nodes 304 having a probability greater than a node-threshold probability. Each of the identified nodes may correspond to at least one of the n-grams. As an example and not by way of limitation, the n-gram may only be identified as corresponding to a node k if $p_{i,j,k} > p_{node-threshold}$. Furthermore, each of the identified user nodes 302 or concept nodes 304 may be connected to at least one of the identified edges 306 (described above). In other words, the social-networking system 20 may only identify nodes or nodes-types that are connected to edges 306 that have previously been identified as corresponding to a particular n-gram. Nodes or node-types that are not connected to any previously identified edges 306 are typically unlikely to correspond to a particular n-gram in a search query. By filtering out or ignoring these nodes and node-types, the social-networking system 20 may more efficiently search the social graph for relevant social-graph elements. As an example and not by way of limitation, for a text query containing "worked at Apple," where an identified edge 306 is "worked at," the social-networking system 20 may identify the concept node 304 corresponding to the company APPLE, INC., which may have multiple edges 306 of "worked at" connected to it. However, for the same text query, the social-networking system 20 may not identify the concept node 304 corresponding to the fruit-type "apple," which may have multiple "like" or "fan" edges connected to it, but no "worked at" edge connections. In particular embodiments, the node-threshold probability may differ for user nodes 302 and concept nodes 304. The n-gram may be identified as corresponding to a user node 302 $k_{user}$ if $p_{i,j,k} > p_{user-node-threshold}$ while the n-gram may be identified as corresponding to a concept node 304 $k_{concept}$ if $P_{i,j,k} > P_{concept-node-threshold}$. In particular embodiments, the social-networking system 20 may only identify nodes that are within a threshold degree of separation of the user node 302 corresponding to the first user (i.e., the querying user). The threshold degree of separation may be, for example, one, two, three, or all. Although this disclosure describes identifying nodes that corresponding to n-grams in a particular manner, this disclosure contemplates identifying nodes that corresponding to n-grams in any suitable manner.

In particular embodiments, social-networking system 20 may generate one or more structured queries that each comprise references to one or more of the identified edges 306 and one or more of the identified nodes. Generating structured queries is described more below.

Figure 7:
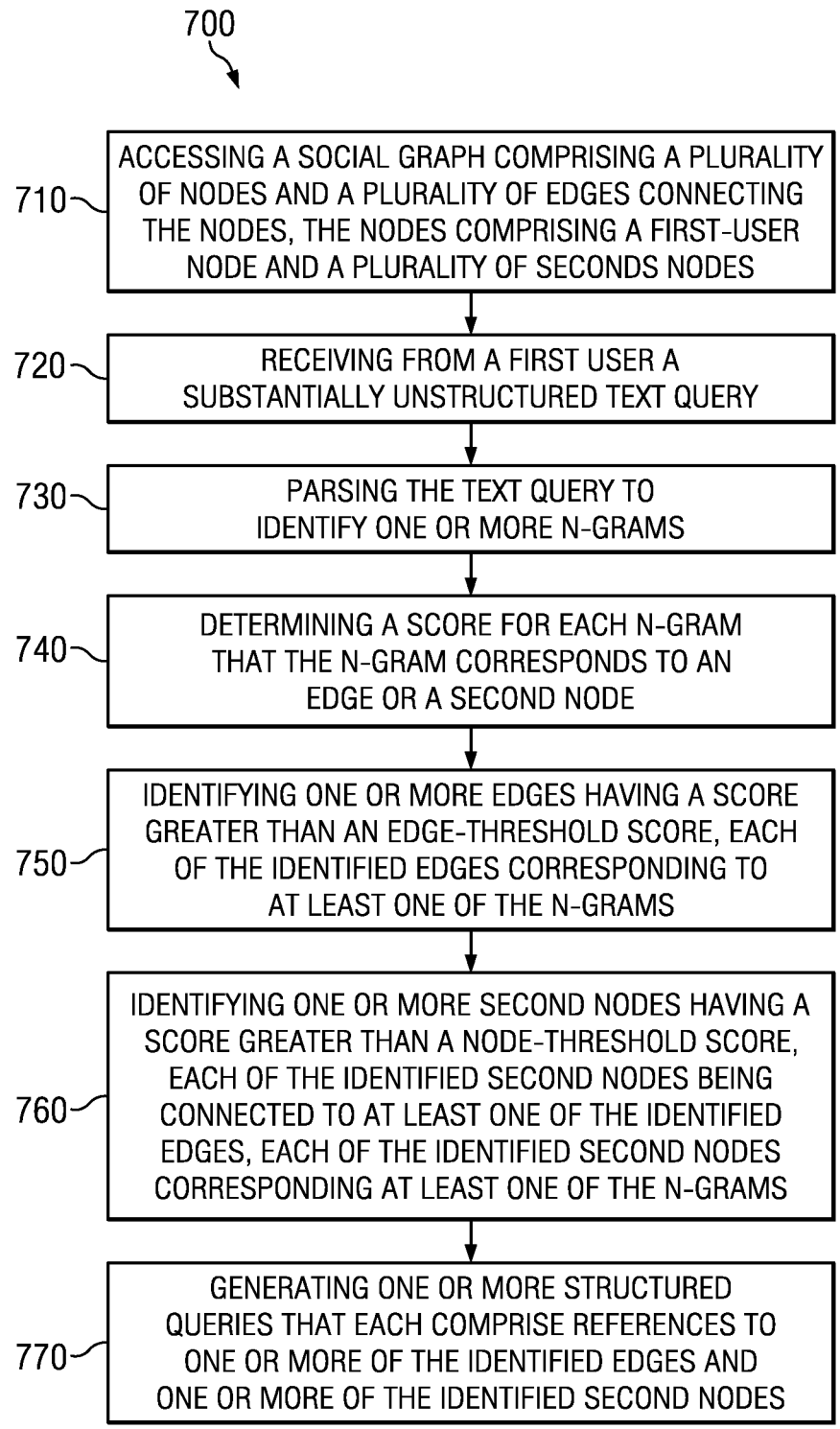
FIG. 7 illustrates an example method for detecting social graph elements for structured search queries.

FIG. 7 illustrates an example method 700 for detecting social graph elements for structured search queries. The method may begin at step 710, where the social-networking system 20 may access a social graph 300 comprising a plurality of nodes and a plurality of edges 306 connecting the nodes. The nodes may comprise a first user node 302 and a plurality of second nodes (one or more user nodes 302, concepts nodes 304, or any combination thereof). At step 720, the social-networking system 20 may receive from the first user a substantially unstructured text query. At step 730, the social-networking system 20 may parse the text query to identify one or more n-grams. At step 740, the social-networking system 20 may determine a probability for each n-gram that the n-gram corresponds to an edge 306 or a second node. At step 750, the social-networking system 20 may identify one or more edges 306 having a probability greater than an edge-threshold probability. Each of the identified edges 306 may correspond to at least one of the n-grams. At step 760, the social-networking system 20 may identify one or more second nodes having a probability greater than a node-threshold probability. Each of the identified second nodes may be connected to at least one of the identified edges 306. Furthermore, each of the identified second nodes may correspond to at least one of the n-grams. At step 770, the social-networking system 20 may generate one or more structured queries. Each structured query may include references to one or more of the identified edges 306 and one or more of the identified second nodes. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Structured Search Queries

In particular embodiments, social-networking system 20 may generate one or more structured queries that each comprise references to one or more of the identified user nodes 302 and one or more of the identified edges 306. This type of structured search query may allow the social-networking system 20 to more efficiently search for resources and content related to the online social network (such as, for example, profile pages) by searching for content connected to or otherwise related to the identified user nodes 302 and the identified edges 306. As an example and not by way of limitation, in response to the text query, "show me friends of my girlfriend," the social-networking system 20 may generate a structured query "Friends of Stephanie," where "Friends" and "Stephanie" in the structured query are references corresponding to particular social-graph elements. The reference to "Stephanie" would correspond to a particular user node 302, while the reference to "friends" would correspond to "friend" edges 306 connecting that user node 302 to other user nodes 302 (i.e., edges 306 connecting to "Stephanie's" first-degree friends). When executing this structured query, the social-networking system 20 may identify one or more user nodes 302 connected by "friend" edges 306 to the user node 302 corresponding to "Stephanie." In particular embodiments, the social-networking system 20 may generate a plurality of structured queries, where the structured queries may comprise references to different identified user nodes 302 or different identified edges 306. As an example and not by way of limitation, in response to the text query, "photos of cat," the social-networking system 20 may generate a first structured query "Photos of Catey" and a second structured query "Photos of Catherine," where "Photos" in the structured query is a reference corresponding to a particular social-graph element, and where "Catey" and "Catherine" are references to two different user nodes 302. When executing either of these structured queries, the social-networking system 20 may identify one or more concept nodes 304 corresponding to photos that are connected to the identified user nodes 302 by edges 306. Although this disclosure describes generating particular structured queries in a particular manner, this disclosure contemplates generating any suitable structured queries in any suitable manner.

In particular embodiments, social-networking system 20 may generate one or more structured queries that each comprise references to one or more of the identified concept nodes 304 and one or more of the identified edges 306. This type of structured search query may allow the social-networking system 20 to more efficiently search for resources and content related to the online social network (such as, for example, profile pages) by search for content connected to or otherwise related to the identified concept nodes 304 and the identified edges 306. As an example and not by way of limitation, in response to the text query, "friends who like facebook," the social-networking system 20 may generate a structured query "Friends who like Facebook," as illustrated in drop-down menu 600 in FIG. 6F, where "Friends," "like," and "Facebook" in the structured query are references corresponding to particular social-graph elements as described previously (i.e., a "friend" edge 306, a "like" edge 306, and a "Facebook concept node 304). In particular embodiments, the social-networking system 20 may generate a plurality of structured queries, where the structured queries may comprise references to different identified concept nodes 304 or different identified edges 306. As an example and not by way of limitation, continuing with the previous example, in addition to the structured query "Friends who like Facebook," the social-networking system 20 may also generate a structured query "Friends who like Facebook Culinary Team," also as illustrated in drop-down menu 600 in FIG. 6F, where "Facebook Culinary Team" in the structured query is a reference corresponding to yet another social-graph element. Although this disclosure describes generating particular structured queries in a particular manner, this disclosure contemplates generating any suitable structured queries in any suitable manner.

In particular embodiments, social-networking system 20 may rank the generated structured queries. The structured queries may be ranked based on a variety of factors. Structured queries that are given a higher/better rank may be considered more relevant to the querying user or a better match to the unstructured text query received from the querying user. Similarly, structured queries that are given a higher/better rank may reference social-graph elements that are more relevant to the querying user or have a higher probability of matching the n-grams from the unstructured text query received from the querying user. In particular embodiments, the social-networking system 20 may rank each of the structured queries based on the degree of separation between the first user node 302 corresponding to the first user (i.e, the querying user) and at least one of the identified user nodes 302 or concept nodes 304 referenced in the structured query. Structured queries including referenced nodes that are closer in the social graph 300 to the querying user (i.e., fewer degrees of separation) may be ranked higher than structured queries containing nodes further away from the querying user. In particular embodiments, the social-networking system 20 may rank each of the structured queries based on a search history associated with the first user. Structured queries referencing social-graph elements that have been searched for or accessed more recently or more frequently by the querying user may be ranked higher than structured queries referencing social-graph elements that have not been accessed recently, frequently, or at all by the querying user. As an example and not by way of limitation, if the querying user has previously searched for the "Facebook Culinary Team" and visited a concept-profile page corresponding to the concept node 304 for the "Facebook Culinary Team," then structured queries referencing this social-graph element may be ranked relatively high compared to other structured queries, as illustrated in FIG. 6F. In particular embodiments, the structured queries may be ranked based on advertising sponsorship. An advertiser (such as, for example, the user or administrator of a particular profile page corresponding to a particular node) may sponsor a particular node such that structured queries referencing the node are ranked higher than structured queries that do not reference the particular node. As an example and not by way of limitation, the n-gram "smart phone" may correspond to a concept node 304 for "IPHONE" (which is a type of smart phone) and may also correspond to a concept node for "ANDROID" (which is another type of smart phone). If one of these concept nodes 304 is sponsored by an advertiser, then the social-networking system 20 may rank the structured queries referencing the sponsored node higher than the structured queries referencing the non-sponsored (or less sponsored) node. In particular embodiments, the social-networking system 20 may rank each of the structured queries based on the social relevance of the social-graph elements referenced in the structured queries. As an example and not by way of limitation, the social relevance of a particular node may be based on the number of edges 306 connected to the particular nodes, such that a structured query referencing a node connected by more edges 306 may be ranked higher than a structure query referencing a node connected by fewer edges 306. As another example and not by way of limitation, the social relevance of a particular edge 306 or edge-type may be based on the frequency of that edge-type being connected to particular nodes. In particular embodiments, the social-networking system 20 may rank each of the structured queries based on the textual relevance of the structured query with respect to the received text query. The textual relevance of a particular structured query may be based on how the terms and number of terms in the particular structured query match to the text query received from the querying user. As an example and not by way of limitation, a structured query that with fewer inserted terms compared to the received text query may be ranked higher than a structured query with more inserted terms. In particular embodiments, the social-networking system 20 may rank each of the structured queries based on the importance or popularity of the structured query. As an example and not by way of limitation, a first structured query containing "Friends of User A" may be ranked higher than a second structured query containing "Pictures of User A" because structured queries referencing "friend" edge-types may be more important or more popular on the online social network than structured queries referencing "picture" edge-types. As another example and not by way of limitation, a first structured query containing "Stanford students" may be ranked higher than a second structured query containing "Stanford employees" because structured queries referencing "student" edge-types may be more important or more popular on the online social network than structured queries referencing "employee" edge-types. In particular embodiments, the social-networking system 20 may rank each of the structured queries based on the tenses of the terms used in the structured query. Structured queries using terms with a particular tense may be ranked more highly then structured queries using terms with a different tense. Although this disclosure describes ranking structured queries in a particular manner, this disclosure contemplates ranking structured queries in any suitable manner.

In particular embodiments, social-networking system 20 may transmit one or more of the structured queries to the first user (i.e., the querying user). As an example and not by way of limitation, after the structured queries are generated, the social-networking system 20 may transmit one or more of the structured queries as a response (which may utilize AJAX or other suitable techniques) to the user's client device 30 that may include, for example, the names (name strings) of the referenced social-graph elements, other query limitations (e.g., Boolean operators, etc.), as well as, potentially, other metadata associated with the referenced social-graph elements. The web browser 202 on the querying user's client device 30 may display the transmitted structured queries in a drop-down menu 600, as illustrated in FIGS. 6A-6R. In particular embodiments, the transmitted queries may be presented to the querying user in a ranked order, such as, for example, based on a rank previously determined as described above. Structured queries with better rankings may be presented in a more prominent position. Furthermore, in particular embodiments, only structured queries above a threshold rank may be transmitted or displayed to the querying user. As an example and not by way of limitation, as illustrated in FIGS. 6A-6R, the structured queries may be presented to the querying user in a drop-down menu 600 where higher ranked structured queries may be presented at the top of the menu, with lower ranked structured queries presented in descending order down the menu. In the examples illustrated in FIGS. 6A-6R, only the seven highest ranked queries are transmitted and displayed to the user. In particular embodiments, one or more references in a structured query may be highlighted in order to indicate its correspondence to a particular social-graph element. As an example and not by way of limitation, as illustrated in FIGS. 6F-6I, the reference to "Facebook" may be highlighted in the structured queries to indicate that it corresponds to a particular concept node 304. Similarly, the references to "Friends" and "like" in the structured queries presented in drop-down menu 600 could also be highlighted to indicate that they correspond to particular edges 306. Although this disclosure describes transmitting particular structured queries in a particular manner, this disclosure contemplates transmitting any suitable structured queries in any suitable manner.

In particular embodiments, social-networking system 20 may receive from the first user (i.e., the querying user) a selection of one of the structured queries. As an example and not by way of limitation, the web browser 202 on the querying user's client device 30 may display the transmitted structured queries in a drop-down menu 600, as illustrated in FIGS. 6A-6R, which the user may then click on or otherwise select (e.g., by simply keying "enter" on his keyboard) to indicate the particular structured query the user wants the social-networking system 20 to execute. Upon selecting the particular structured query, the user's client device 30 may call or otherwise instruct to the social-networking system 20 to execute the selected structured query. Although this disclosure describes receiving selections of particular structured queries in a particular manner, this disclosure contemplates receiving selections of any suitable structured queries in any suitable manner.

In particular embodiments, social-networking system 20 may generate search results corresponding to the selection of one of the structured queries. Generating search results based on structured queries is described more below.

Figure 8:
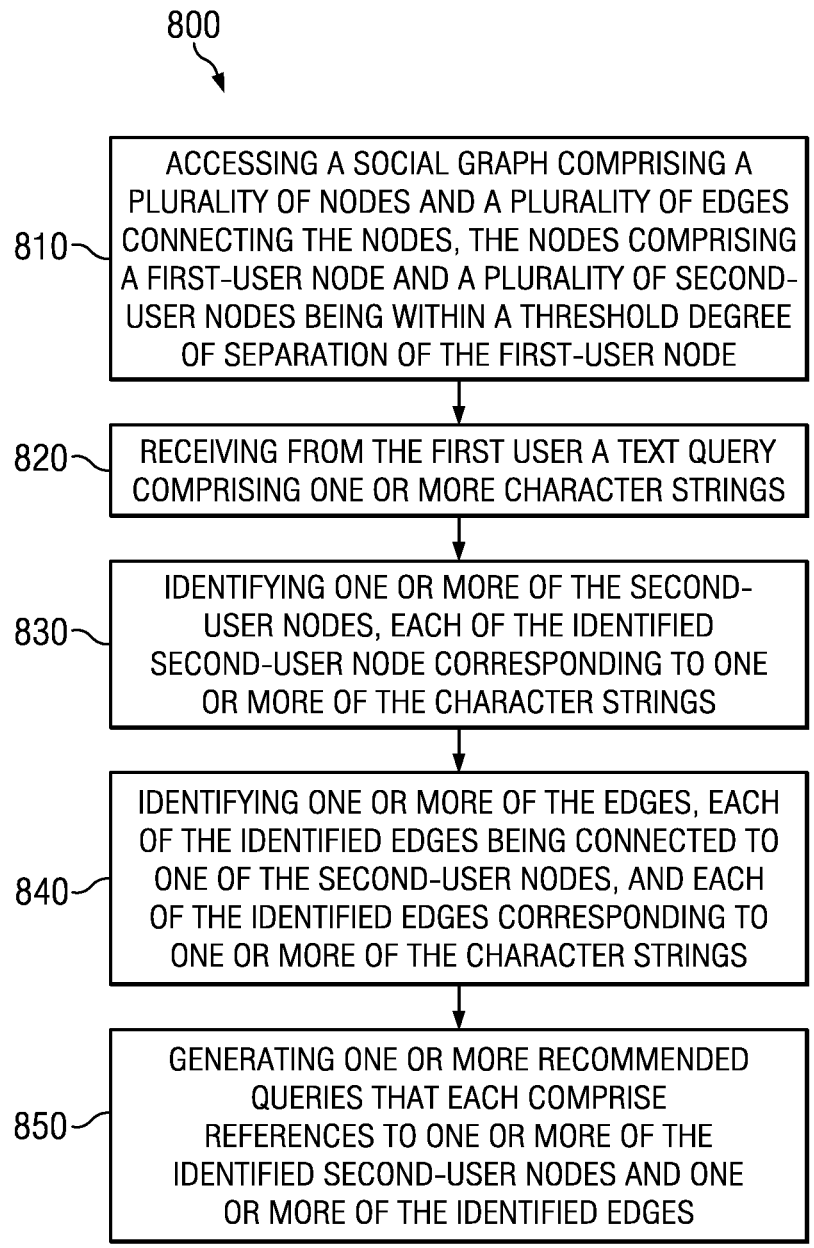
FIG. 8 illustrates an example method for generating personalized structured search queries.

FIG. 8 illustrates an example method 800 for generating personalized structured search queries. The method may begin at step 810, where the social-networking system 20 may access a social graph 300 comprising a plurality of user nodes 302 and a plurality of edges 306 connecting the user nodes 302. Each edge 306 between two user nodes 302 represents a single degree of separation between them. The plurality of user nodes 302 may include a first user node 302 corresponding to a first user associated with an online social network. The plurality of user nodes 302 may also include one or more second user nodes 302 that each correspond to a second user associated with the online social network. Each of the second user nodes 302 may be within a threshold degree of separation from the first user node 302. At step 820, the social-networking system 20 may receive from the first user a text query comprising one or more character strings. At step 830, the social-networking system 20 may identify one or more of the second user nodes 302 that correspond to one or more of the character strings. At step 840, the social-networking system 20 may identify one or more of the edges 306 that correspond to one or more of the character strings. Each of the identified edges 306 may be connected to one of the second user nodes 302. At step 850, the social-networking system 20 may generate one or more recommended queries. Each structure query may include references to one or more of the identified second user nodes 302 and one or more of the identified edges 306. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
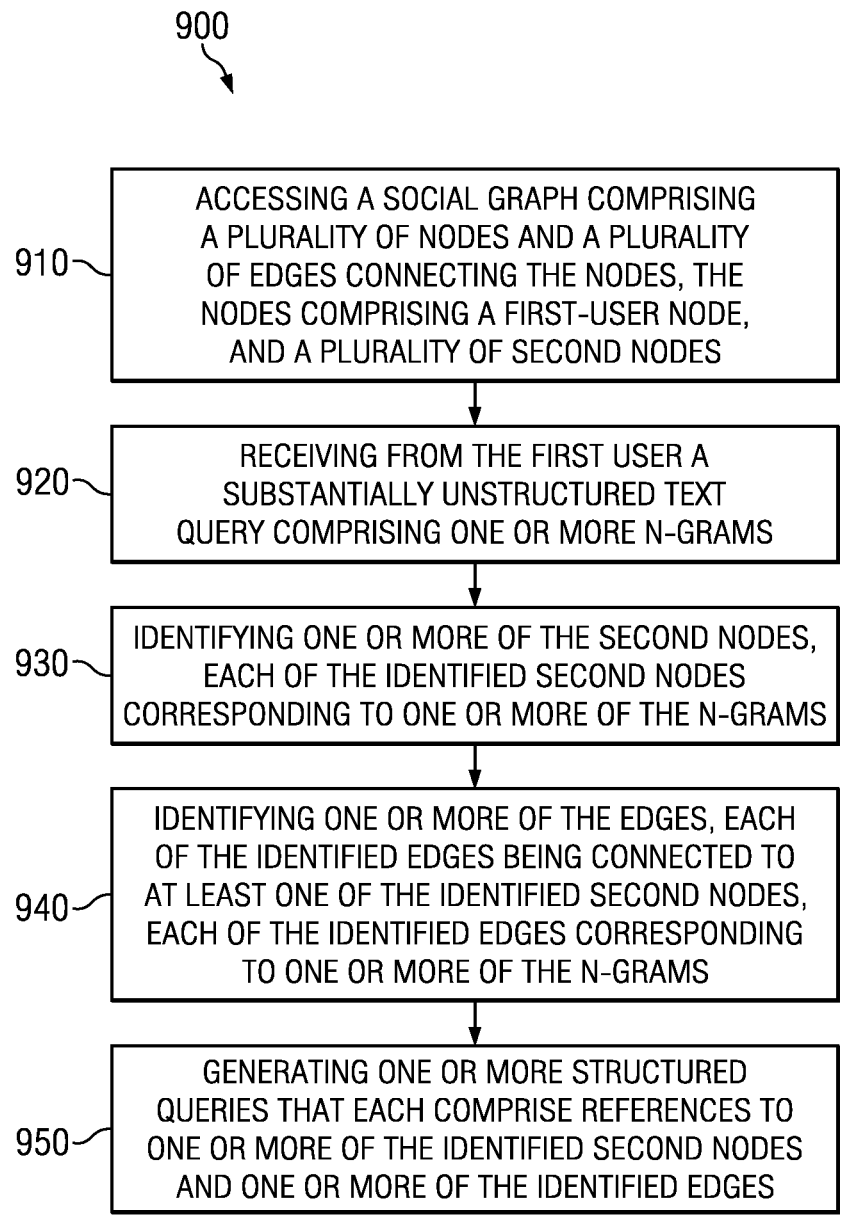
FIG. 9 illustrates an example method for generating structured queries based on social-graph information.

FIG. 9 illustrates an example method 900 for generating structured queries based on social-graph information. The method may begin at step 910, where the social-networking system 20 may, where the social-networking system 20 may access a social graph 300 comprising a plurality of nodes and a plurality of edges 306 connecting the nodes. The nodes may comprise a first user node 302, a plurality of second nodes (e.g., user nodes 302 and concept nodes 304). At step 920, the social-networking system 20 may receive from the first user a substantially unstructured text query comprising one or more n-grams. At step 930, the social-networking system 20 may identify one or more of the second nodes that correspond to one or more of the n-grams. At step 940, the social-networking system 20 may identify one or more of the edges 306 that correspond to one or more of the n-grams. Each of the identified edges may be connected to at least one of the identified second nodes. At step 950, the social-networking system 20 may generate one or more structured queries. Each structured query may include references to one or more of the identified second nodes and one or more of the identified edges 306. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Filtering Search Results Based on Privacy Setting

Figure 10:
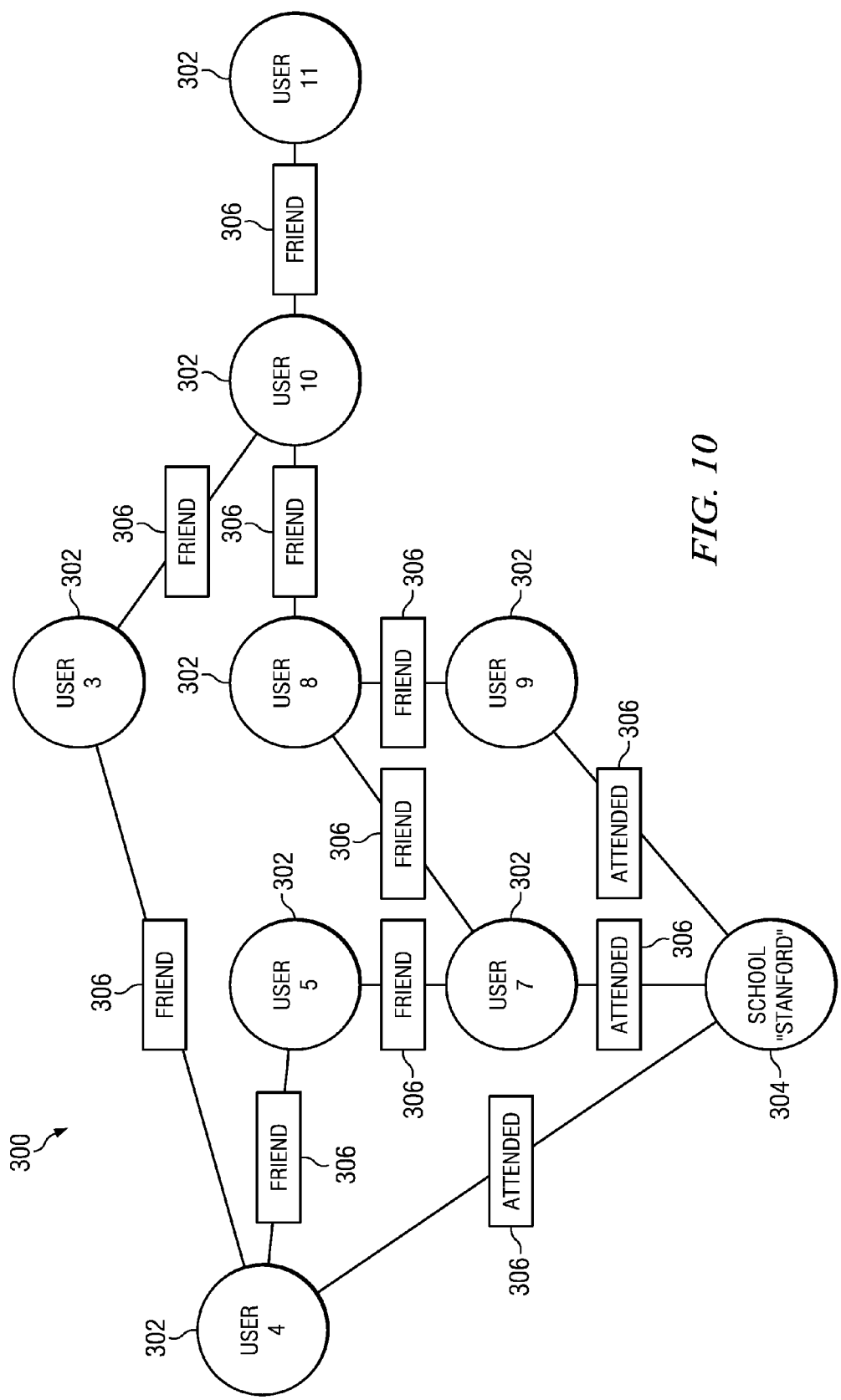
FIG. 10 illustrates an example social graph.

In particular embodiments, when generating search results in response to a structured search query, the social-networking system 20 may filter the search results based on privacy settings associated with particular users of the online social network. As an example and not by way of limitation, after a structured query is selected by a querying user and received by the social-networking system 20, a search engine may identify target content (e.g., nodes and/or their corresponding profile pages) that satisfies or matches the query conditions. The target content (and more specifically, the target nodes corresponding to the target content) may be associated with privacy settings that specify which other users of the online social network may view or access the content. For example, particular social-graph elements may not be visible to the querying user, and thus a structure search query referencing that social-graph element (or its related elements) should not generate search results relying on that element. Consequently, particular target content may not be displayed in the search results because of the privacy settings associated with that content. FIG. 10 illustrates an example social graph 300. The social graph 300 illustrated in FIG. 10 may be referenced in some of the examples below to illustrate how privacy settings are used to filter search results. Although this disclosure describes filtering search results based on privacy settings in a particular manner, this disclosure contemplates filtering search results based on privacy settings in any suitable manner.

In particular embodiments, social-networking system 20 may access the privacy settings associated with each target node and each selected node. The privacy settings for each node may define the visibility of the node or the visibility of edges connecting to the node to users of the social-networking system 20. In this way, the ability of users of the online social network (or even users outside the network) may be restricted by limiting their ability to view or access profile-pages (or other related content) associated with particular nodes. As an example and not by way of limitation, a first user's privacy settings specify that his profile-page can only be viewed or accessed by "friends of friends" (i.e., second-degree friends), thereby preventing users who are three or more degrees of separation from the first user from viewing or accessing the first user's profile page. As another example and not by way of limitation, referencing FIG. 10, the privacy settings for user "9" may specify that his educational information is not visible to other users, and therefore the "attended" edge 306 connecting the user node 302 for user "9" to the concept node 304 corresponding to the school "Stanford" may not be visible to other users. Thus, the privacy settings for user "9" would prevent references to his user node 302 (or corresponding user-profile page) from appearing in search results for users that attended Stanford. Although this disclosure describes accessing particular privacy settings in a particular manner, this disclosure contemplates accessing any suitable privacy settings in any suitable manner.

In particular embodiments, social-networking system 20 may identify one or more target nodes corresponding to the structured query. A target node may be a user node 302 or a concept node 304 that is connected by at least one edge to at least one of the nodes referenced in a selected structured query. As an example and not by way of limitation, referencing FIG. 10, the social-networking system 20 may receive the following substantially unstructured text query from a user, "show me user 5's friends," which the social-networking system 20 may parse to generate a structured query, "Friends of User 5," where the reference to "Friends" corresponds to particular "friend" edges 306 and "User 5" corresponds to the user node 302 for user "5." The social-networking system 20 may then identify the user nodes 302 corresponding to user "4" and user "7" as target nodes corresponding to the structured query because both of those nodes are connected to the node for user "5" by "friend" edges 306. Although this disclosure describes identifying particular target nodes in a particular manner, this disclosure contemplates identifying any suitable target nodes in any suitable manner.

In particular embodiments, social-networking system 20 may generate search results comprising references to each target node that is connected to the first/querying user node 302 in the social graph 300 by a series of nodes and edges 306 that have a visibility that is visible to the first user. The nodes and edges in the path between the first user and the target node may comprise nodes and edges references in the selected structured query. As an example and not by way of limitation, continuing with the prior example referencing FIG. 10, the structured query "Friends of User 5" references the user node 302 for user "5" and the "friends" edges 306 connected to that node. This structured query may identify the target nodes for user "4" and user "7." Assuming the querying user can view the node for user "5," then the privacy settings of users "4," "5," and "7" may be accessed to determine whether the edges connecting these users are visible. For example, either users "4" or "5" may have privacy settings that make it so the "friend" edge 306 connecting them is not visible to particular other users; if this edge 306 is visible to the querying user, then the generated search results could include a reference to user "4." Similarly, either users "5" or "7" may have privacy settings that make it so the "friend" edge 306 connecting them is not visible; thus, if this edge 306 is visible to the querying user, then the generated search results could include a reference to user "7." In particular embodiments, the user node 302 for the querying user does not necessarily need to be connected by a visible path to the target node; however, there should be at least a path between a node that is visible to the querying user (a source node) and the target node. As an example and not by way of limitation, continuing with the prior example, the querying user does not necessarily need to be connected in a path to either user "4" or user "7"; so long as the querying user can view a source node, which may be user "5" in this case, and so long as the querying user can view the path between user "5" and the target nodes, then the target nodes may appear in search results. The querying user may be able to view the source node, for example, because that node is publicly accessible or within a threshold degree of separation of the querying user. Although this disclosure describes generating search results in a particular manner, this disclosure contemplates generating search results in any suitable manner.

In particular embodiments, social-networking system 20 may receive a selection of a structured query comprising a first condition and one or more second conditions, where at least one of the second conditions is dependent on the first condition. The social networking system may resolve such a query by identifying one or more nodes that satisfy the first condition and applying the nodes that satisfy the first condition to each second condition that is dependent on the first condition. As another example and not by way of limitation, referencing FIG. 10, the social-networking system 20 may receive the following substantially unstructured text query from a user: "find me people who are friends of user 11 or friends of user 10 and friends of user 5 or attended stanford." The social-networking system 20 may parse this text query and generate the following structured search query: "Find Friends of User 11 or friends of User 10 that are also friends of User 5 or attended Stanford," where the references to "friends of" and "attended" correspond to particular edges 306, references to "User 5," "User 10," and "User 11" correspond to particular user nodes 302, and the reference to "Stanford" corresponds to a particular concept node 304. The equivalent symbolic expression ("s-expression") for this query would be: (or (and friend:10 (apply friend: (or friend:5 attended>6))) friend:11), where the concept node 304 corresponding to "Stanford" is being referenced as "6." The social-networking system 20 may identify the inner condition of (apply friend: (or friend:5 attended>6)) as a first condition that needs to be resolved before the dependent outer condition can be resolved. Referencing FIG. 10, the inner condition can be resolved by identifying users that are either friends of user "5" or users that attended "Stanford." The friends of user "5" are users "4" and "7," both of whom are connected by "friend" edges 306 to the node for user "5." The users that attended "Stanford" are users "4," "7," and "9." Therefore, combining these results, the inner condition has identified the user nodes 302 for users "4," "7," and "9." These three results may now be applied using the apply-operator to the outer condition, which may now be re-expressed as the s-expression: (or (and friend:10 (or friend:4 friend:7 friend:9) friend:11). This re-expressed query may be resolved by identifying users that are either friends of user "11" or friends of both user "10" and one of users "4," "7," or "9." The only friend of user "11" is user "10." The friends of user "10" include users "3" and "8," while the friends of users "4," "7," and "9" include users "3," "5," and "8"; thus users "3" and "8" are friends in both sets and satisfy this condition. Thus, the outer condition would identify user nodes 302 for users "3," "8," and 10" as target nodes corresponding to the structured query. Although this disclosure describes resolving search queries in a particular manner, this disclosure contemplates resolving search queries in any suitable manner.

Figure 11A:
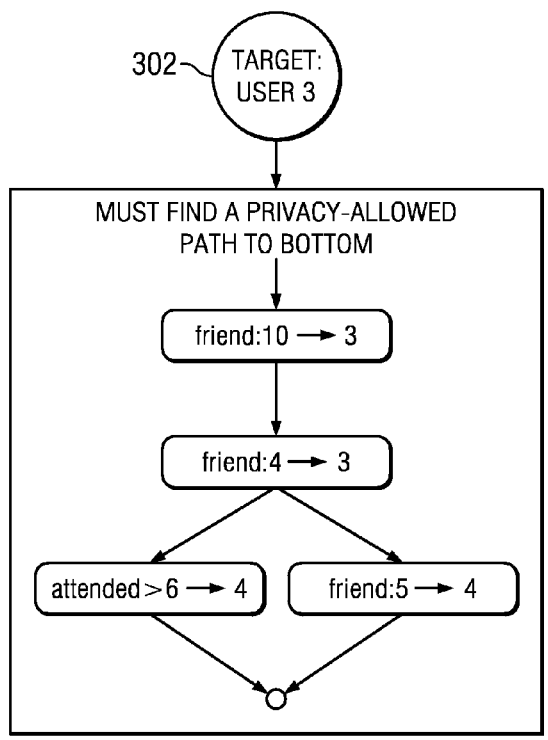
FIGS. 11A-11C illustrate example sub-graphs for resolving privacy settings.
Figure 11B:
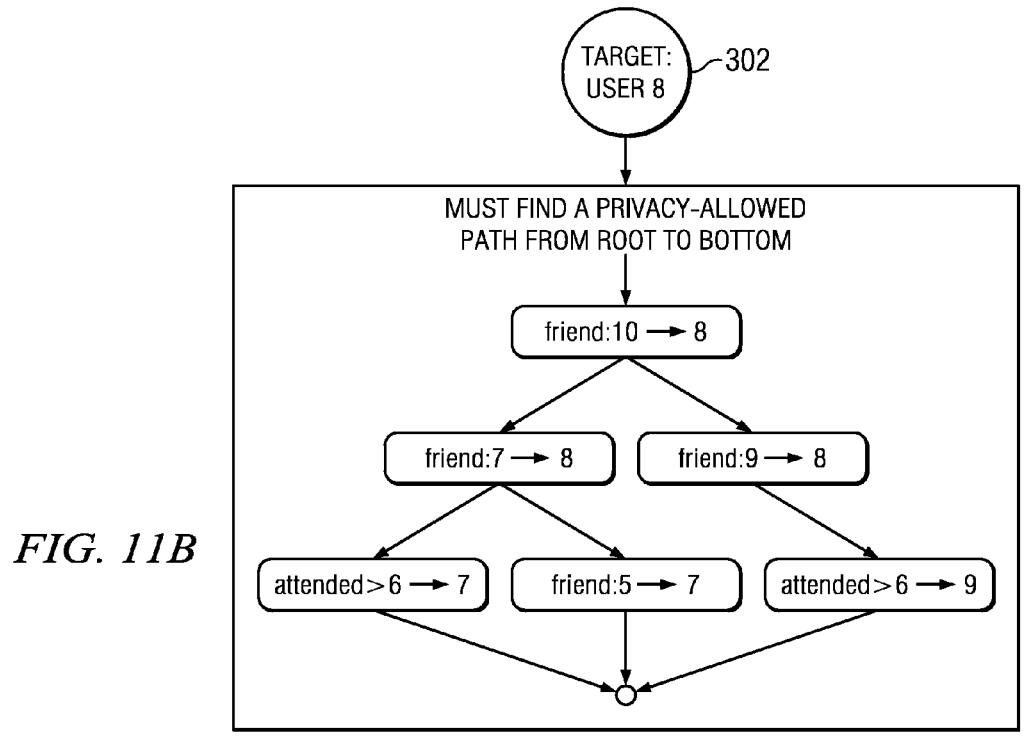
Figure 11C:
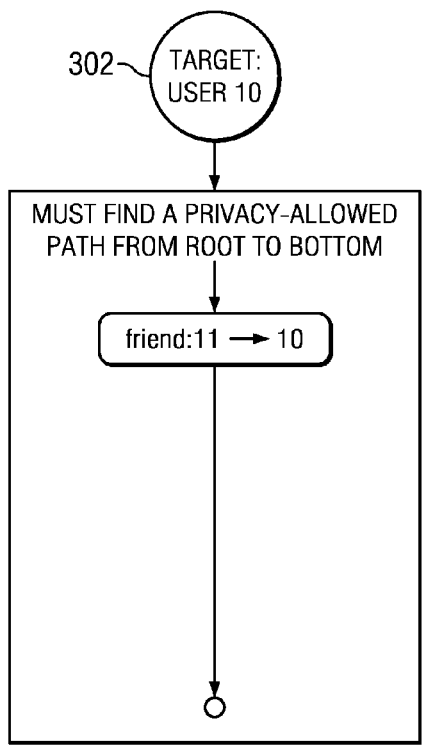

FIGS. 11A-11C illustrate example sub-graphs for resolving privacy settings. In particular embodiments, the social-networking system 20 may generate a sub-graph for each target node. The sub-graph may comprise the first-user node (i.e., a user node 302 of the querying user), the target node, and each selected node and each selected edge connecting the first-user node and the target node in the social graph. As an example and not by way of limitation, continuing with the examples from the prior paragraph, sub-graphs may be constructed for the target nodes corresponding to users "3," "8," and "10," which are illustrated in FIGS. 11A, 11B, and 11C, respectively. These graphs illustrate each edge 306 in path between the querying user and the target node. For example, the edge 306 connecting user's "10" and "3" is illustrated in FIG. 11A as "friend:10→3". The social-networking system 20 may then identify, for each sub-graph, each terminal path in the sub-graph connecting the first-user node to the target node. A terminal path includes the series of selected nodes and selected edges connecting the first-user node to the target node. As an example and not by way of limitation, the terminal path connecting the querying user to the target node for user "10" consists of the edge 306 connecting the querying user to the node for user "11," the user node 302 for user "11," and the edge 306 connecting user "11" to user "10," as illustrated in FIG. 11C. Of course, multiple terminal paths may exist between the querying user and the target node, as illustrated in FIGS. 11A and 11B, and each of these terminal paths may be identified. The social-networking system 20 may then determine, for each terminal path in the sub-graph, whether each selected edge in the terminal path has a visibility that is visible to the first user. In other words, the social-networking system 20 may attempt to find whether the sub-graph has any privacy-allowed paths between the querying user and the target node. As an example and not by way of limitation, to determine whether the terminal path in FIG. 11C is visible to the querying user, the social-networking system 20 may evaluate the following s-expression: (edge friend:11 10). As another example and not by way of limitation, to determine whether the terminal path in FIG. 11A is visible to the querying user, the social-networking system 20 may evaluate the following s-expression: (and (edge friend: 10 3) (edge friend:4 3) (or (edge attended>6 4) (edge friend:5 4))). Where multiple terminal paths exist in a particular sub-graph, the social-networking system 20 may evaluate some or all of the terminal paths to determine whether the edges 306 in each path are visible. The social-networking system 20 may then identify each sub-graph having at least one terminal path wherein each selected edge in the path has a visibility that is visible to the first user. Therefore, where a sub-graph includes multiple terminal paths between the querying user and the target node, the sub-graph may still be identified as having a privacy-allowed path so long as at least one terminal path in the sub-graph is visible to the user. The generated search results would then include references to each target nodes that corresponds to an identified sub-graph having at least one visible terminal paths. As an example and not by way of limitation, referencing FIG. 11A, there are two possible terminal paths between the querying user and the target node for user "3." So long as at least one of the two possible terminal paths is visible to the querying user, then the target node for user "3" will be included in the search results for the query. In particular embodiments, the user node 302 for the querying user does not necessarily need to be connected by a visible path to the target node; however, there should be at least a path between a node that is visible to the querying user (a source node) and the target node. As an example and not by way of limitation, continuing with the prior example, the querying user does not necessarily need to be connected in a path to either users "3," "8," or "10"; so long as the querying user can view a source node and a path between the source node and the target node, then the target node may appear in search results. Although this disclosure describes and FIGS. 11A-11C illustrate resolving privacy settings in a particular manner, this disclosure contemplates resolving privacy settings in any suitable manner.

In particular embodiments, social-networking system 20 may generate search results corresponding to the selection of one of the structured queries. The search results may be presented in a structured document (e.g., a search results webpage) comprising one or more links or other references to the content (e.g., profile pages) corresponding the structured query. The references in the search results may be used to navigate to the corresponding content. In particular embodiments, the search results may comprise references to one or more of the identified user nodes 302, one or more of the identified concept nodes 304, or any combination thereof. As an example and not by way of limitation, referencing FIG. 3, user "B" may select the structured query of "Friends who worked at Acme," where "Friends" is a reference to the "friends" edges 306 connecting user "B" to other users, "worked at" is a reference to the "worked at" edges 306 connected to the user nodes 302 of friends of user "B," and "Acme" is a reference to the concept node 304 for the company "Acme." The social-networking system 20 may then identify the user node 302 corresponding to user "C" in the social graph 300 as corresponding to the structured query, since the user node 302 for user "C" connected by a "friend" edge 306 to user "B" and connected by a "worked at" edge to the identified concept node 304 corresponding to "ACME." The social-networking system 20 may then generate search results that lists or otherwise references user "C," along with any other social-graph elements that correspond to the selected search query. In particular embodiments, the search results may comprise references to user nodes 302 or concept nodes 304 that are connected by one or more edges 306 to the identified user nodes 302 or the identified concept nodes 304. Although this disclosure describes generating particular search results corresponding to structured queries in a particular manner, this disclosure contemplates generating any suitable search results corresponding to structured queries in any suitable manner.

In particular embodiments, social-networking system 20 may only generate search results comprising references to target nodes (i.e., user nodes 302 or concept node 304) within a threshold degree of separation of the user node 302 corresponding to the first user (i.e., the querying user). The threshold degree of separation may be, for example, one, two, three, or all. Although this disclosure describes generating search results in a particular manner, this disclosure contemplates generating search results in any suitable manner.

Figure 12:
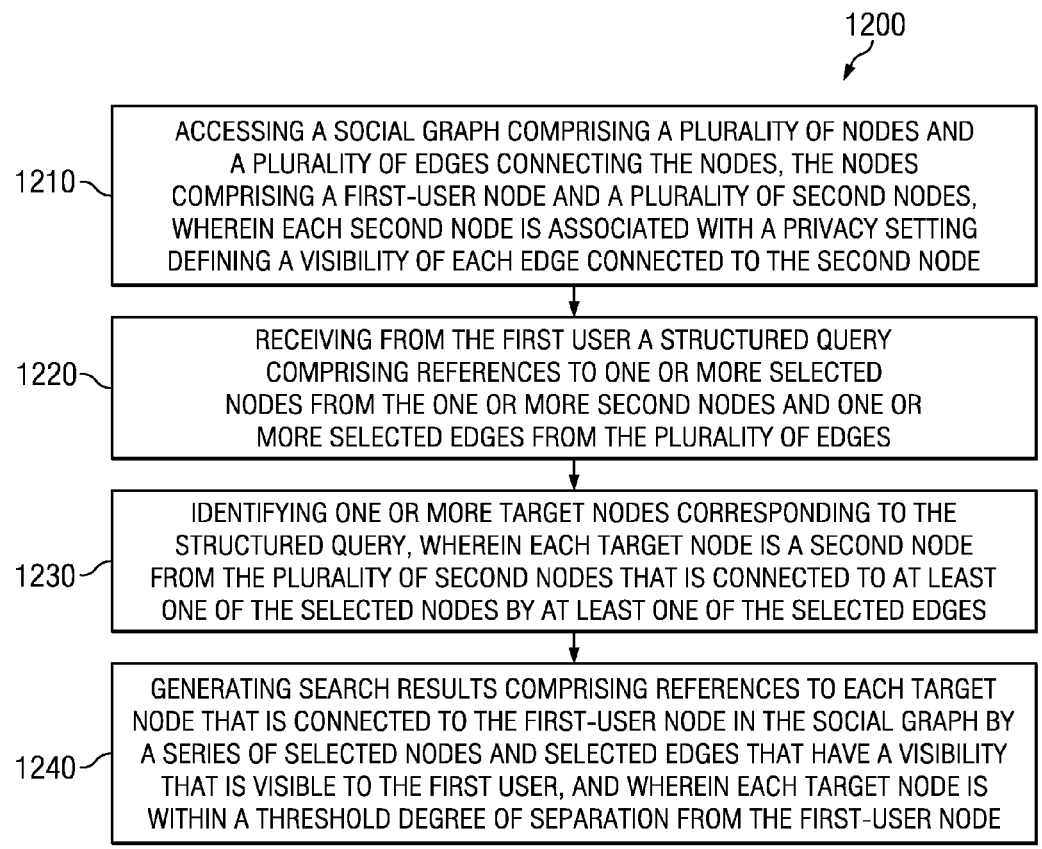
FIG. 12 illustrates an example method for filtering the search results for a structured search query based on privacy settings.

FIG. 12 illustrates an example method 1200 for filtering the search results for a structured search query based on privacy settings. The method may begin at step 1210, where the social-networking system 20 may access a social graph 300 comprising a plurality of nodes and a plurality of edges 306 connecting the nodes. The nodes may comprise a first user node 302 and a plurality of second nodes (one or more user nodes 302, concepts nodes 304, or any combination thereof). Each second node may be associated with a privacy setting defining a visibility of each edge 306 connected to the second node. At step 1220, the social-networking system 20 may receive from the first user a structured query comprising references to one or more selected nodes from the one or more second nodes and one or more selected edges 306 from the plurality of edges 306. At step 1230, the social-networking system 20 may identify one or more target nodes corresponding to the structured query. Each target node may be a second node from the plurality of second nodes that is connected to at least one of the selected nodes by at least one of the selected edges 306. At step 1240, the social-networking system 20 may generate search results comprising references to each target node that is connected to the first user node 302 in the social graph 300 by a series of selected nodes and selected edges 306 that have a visibility that is visible to the first user. Furthermore, the generated search results may only include target nodes that are within a threshold degree of separation from the first user node 302. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Systems and Methods

Figure 13:
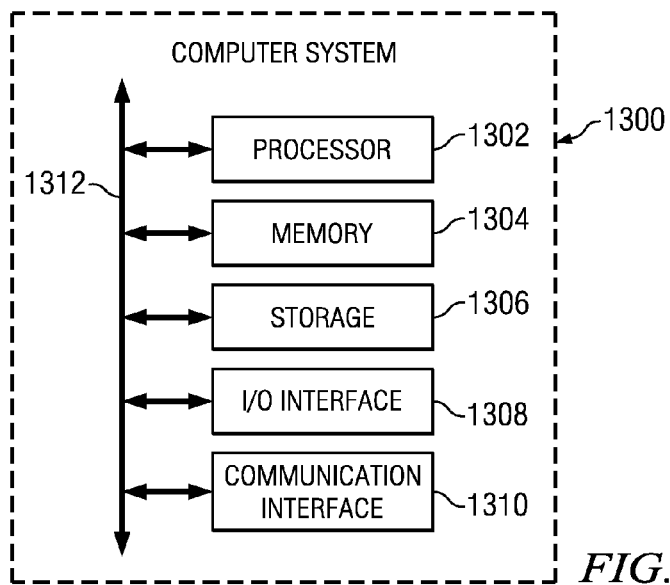
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example and not by way of limitation, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, reference to a computer-readable non-transitory storage medium may include a semiconductor-based or other integrated circuit (IC) (such as, for example, a field-programmable gate array (FPGA) or an application-specific IC (ASIC)), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 1302 (such as, for example, one or more internal registers or caches), one or more portions of memory 1304, one or more portions of storage 1306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 14:
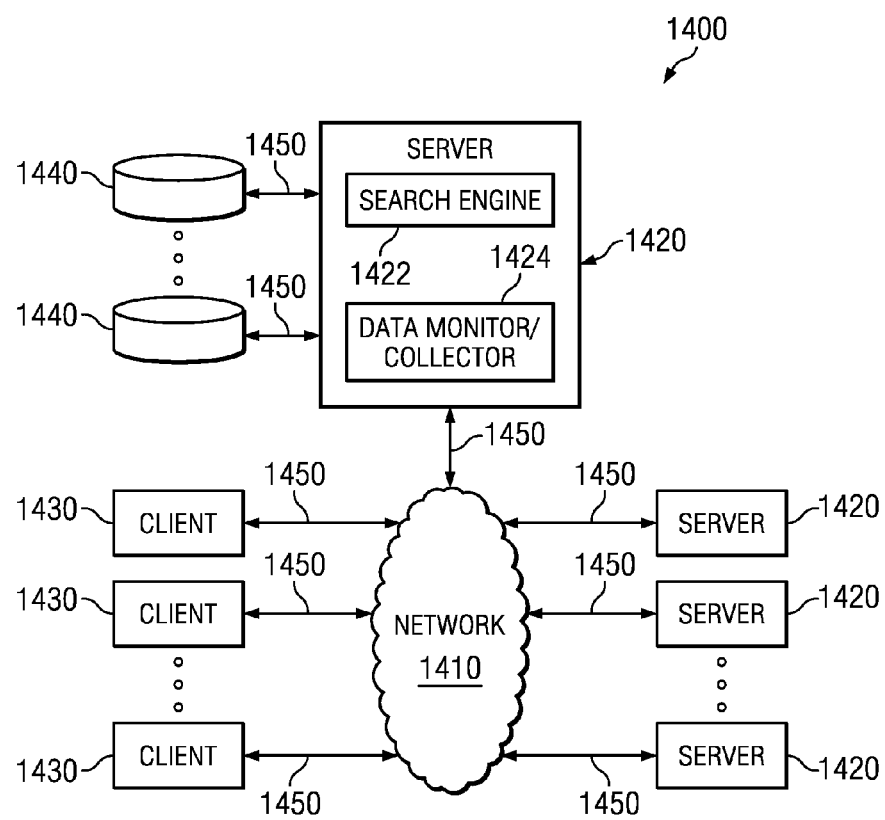
FIG. 14 illustrates an example network environment.

FIG. 14 illustrates an example network environment 1400. This disclosure contemplates any suitable network environment 1400. As an example and not by way of limitation, although this disclosure describes and illustrates a network environment 1400 that implements a client-server model, this disclosure contemplates one or more portions of a network environment 1400 being peer-to-peer, where appropriate. Particular embodiments may operate in whole or in part in one or more network environments 1400. In particular embodiments, one or more elements of network environment 1400 provide functionality described or illustrated herein. Particular embodiments include one or more portions of network environment 1400. Network environment 1400 includes a network 1410 coupling one or more servers 1420 and one or more clients 1430 to each other. This disclosure contemplates any suitable network 1410. As an example and not by way of limitation, one or more portions of network 1410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1410 may include one or more networks 1410.

Links 1450 couple servers 1420 and clients 1430 to network 1410 or to each other. This disclosure contemplates any suitable links 1450. As an example and not by way of limitation, one or more links 1450 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 1450. In particular embodiments, one or more links 1450 each includes an intranet, an extranet, a VPN, a LAN, a WLAN, a WAN, a MAN, a communications network, a satellite network, a portion of the Internet, or another link 1450 or a combination of two or more such links 1450. Links 1450 need not necessarily be the same throughout network environment 1400. One or more first links 1450 may differ in one or more respects from one or more second links 1450.

This disclosure contemplates any suitable servers 1420. As an example and not by way of limitation, one or more servers 1420 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 1420 includes hardware, software, or both for providing the functionality of server 1420. As an example and not by way of limitation, a server 1420 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 1430, the web server may communicate one or more such files to client 1430. As another example, a server 1420 that operates as a mail server may be capable of providing e-mail services to one or more clients 1430. As another example, a server 1420 that operates as a database server may be capable of providing an interface for interacting with one or more data stores (such as, for example, data stores 1440 described below). Where appropriate, a server 1420 may include one or more servers 1420; be unitary or distributed; span multiple locations; span multiple machines; span multiple datacenters; or reside in a cloud, which may include one or more cloud components in one or more networks.

In particular embodiments, one or more links 1450 may couple a server 1420 to one or more data stores 1440. A data store 1440 may store any suitable information, and the contents of a data store 1440 may be organized in any suitable manner. As an example and not by way or limitation, the contents of a data store 1440 may be stored as a dimensional, flat, hierarchical, network, object-oriented, relational, XML, or other suitable database or a combination or two or more of these. A data store 1440 (or a server 1420 coupled to it) may include a database-management system or other hardware or software for managing the contents of data store 1440. The database-management system may perform read and write operations, delete or erase data, perform data deduplication, query or search the contents of data store 1440, or provide other access to data store 1440.

In particular embodiments, one or more servers 1420 may each include one or more search engines 1422. A search engine 1422 may include hardware, software, or both for providing the functionality of search engine 1422. As an example and not by way of limitation, a search engine 1422 may implement one or more search algorithms to identify network resources in response to search queries received at search engine 1422, one or more ranking algorithms to rank identified network resources, or one or more summarization algorithms to summarize identified network resources. In particular embodiments, a ranking algorithm implemented by a search engine 1422 may use a machine-learned ranking formula, which the ranking algorithm may obtain automatically from a set of training data constructed from pairs of search queries and selected Uniform Resource Locators (URLs), where appropriate.

In particular embodiments, one or more servers 1420 may each include one or more data monitors/collectors 1424. A data monitor/collection 1424 may include hardware, software, or both for providing the functionality of data collector/collector 1424. As an example and not by way of limitation, a data monitor/collector 1424 at a server 1420 may monitor and collect network-traffic data at server 1420 and store the network-traffic data in one or more data stores 1440. In particular embodiments, server 1420 or another device may extract pairs of search queries and selected URLs from the network-traffic data, where appropriate.

This disclosure contemplates any suitable clients 1430. A client 1430 may enable a user at client 1430 to access or otherwise communicate with network 1410, servers 1420, or other clients 1430. As an example and not by way of limitation, a client 1430 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 1430 may be an electronic device including hardware, software, or both for providing the functionality of client 1430. As an example and not by way of limitation, a client 1430 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 1430 may include one or more clients 1430; be unitary or distributed; span multiple locations; span multiple machines; span multiple datacenters; or reside in a cloud, which may include one or more cloud components in one or more networks.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Furthermore, "a", "an," or "the" is intended to mean "one or more," unless expressly indicated otherwise or indicated otherwise by context. Therefore, herein, "an A" or "the A" means "one or more A," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
    receiving, from a client device associated with a first user of an online social network, a text query comprising one or more character strings, the online social network being associated with a social graph comprising a plurality of nodes and a plurality of edges connecting the nodes;
    identifying one or more nodes and one or more edges of the social graph by determining one or more nodes and one or more edges of the social graph that match at least a portion of one or more of the character strings, wherein each of the identified nodes is within a threshold degree of separation within the social graph of a node corresponding to the first user;
    generating one or more recommended queries that each comprise the character strings of the text query and references to one or more of the identified nodes and one or more of the identified edges; and
    sending, to the client device associated with the first user in response to receiving the text query, one or more of the recommended queries for presentation to the first user.

2. The method of claim 1, further comprising accessing the social graph comprising the plurality of nodes and the plurality of edges connecting the nodes, each of the edges between two of the nodes representing a single degree of separation between them, the nodes comprising:
    a first node corresponding to the first user associated with the online social network; and
    one or more second nodes that each correspond to a second user associated with the online social network, each of the second nodes being within the threshold degree of separation from the first node.

3. The method of claim 2, wherein identifying one or more nodes and one or more edges of the social graph comprising:
    identifying one or more of the second nodes, each of the identified second node corresponding to one or more of the character strings; and
    identifying one or more of the edges, each of the identified edges being connected to one of the second nodes, and each of the identified edges corresponding to one or more of the character strings.

4. The method of claim 1, further comprising receiving from the first user a selection of one of the recommended queries.

5. The method of claim 1, further comprising generating search results corresponding to the selection of one of the recommended queries, each search result comprising a reference to a node of the plurality of nodes.

6. The method of claim 1, wherein identifying one or more nodes comprises, for each character string:
   determining for each node of the plurality of nodes whether the node matches the character string; and
   identifying each node that matches the character string.

7. The method of claim 1, wherein each character strings comprises one or more characters of text entered by the first user.

8. The method of claim 1, wherein the threshold degree of separation is one, two, three, or all.

9. The method of claim 1, wherein each node of the plurality of nodes is associated with a structured document.

10. The method of claim 1, wherein receiving from the first user the text query comprises receiving one or more characters of a character string as the first user at a client system enters the character string into a graphical user interface comprising a query field, and wherein the character string is entered by the first user into the query field.

11. The method of claim 10, wherein the graphical user interface is displayed on a user interface of a native application associated with the online social network.

12. The method of claim 10, wherein the graphical user interface is displayed on a webpage associated with the online social network accessed by a browser client.

13. The method of claim 1, further comprising presenting the one or more sent structured queries to the first user, wherein, for each sent structured query, one or more of the references of the sent structured query is highlighted as presented to indicate the reference corresponds to an identified second node or an identified edge.

14. The method of claim 1, wherein the text query is received from a third-party system via a call through an application programming interface associated with the online social network from the client device associated with the first user.

15. The method of claim 1, further comprising sending, to a third-party system, search results corresponding to one of the structured queries in response to receiving from the third-party system a call through an application programming interface associated with the online social network from the client device associated with the first user.

16. The method of claim 1, wherein the text query is received from a third-party system via a communication channel associated with the online social network from the client device associated with the first user.

17. A system comprising: one or more processors; and a memory coupled to the processors comprising instructions executable by the processors, the processors operable when executing the instructions to:
   receive, from a client device associated with a first user of an online social network, a text query comprising one or more character strings, the online social network being associated with a social graph comprising a plurality of nodes and a plurality of edges connecting the nodes;
   identify one or more nodes and one or more edges of the social graph, by determining one or more nodes and one or more edges of the social graph that match at least a portion of one or more of the character strings, wherein each of the identified nodes is within a threshold degree of separation within the social graph of a node corresponding to the first user;
   generate one or more recommended queries that each comprise the character strings of the text query and references to one or more of the identified nodes and one or more of the identified edges; and
   send, to the client device associated with the first user in response to receiving the text query, one or more of the recommended queries for presentation to the first user.

18. One or more computer-readable non-transitory storage media embodying software that is operable when executed to:
   receive, from a client device associated with a first user of an online social network, a text query comprising one or more character strings, the online social network being associated with a social graph comprising a plurality of nodes and a plurality of edges connecting the nodes;
   identify one or more nodes and one or more edges of the social graph, by determining one or more nodes and one or more edges of the social graph that match at least a portion of one or more of the character strings, wherein each of the identified nodes is within a threshold degree of separation within the social graph of a node corresponding to the first user;
   generate one or more recommended queries that each comprise the character strings of the text query and references to one or more of the identified nodes and one or more of the identified edges; and
   send, to the client device associated with the first user in response to receiving the text query, one or more of the recommended queries for presentation to the first user.

* * * * *